United States Patent [19]
Amemiya et al.

[11] Patent Number: 6,141,182
[45] Date of Patent: Oct. 31, 2000

[54] MAGNETIC HEAD ASSEMBLY WITH CONTACT-TYPE HEAD CHIP MOUNTING AND ELECTRICALLY CONNECTING ARRANGEMENTS

[75] Inventors: Takuya Amemiya; Yukio Miyazaki; Kazuhiko Harada, all of Kawasaki, Japan

[73] Assignee: Fujitsu Limited, Kawasaki, Japan

[21] Appl. No.: 08/896,729

[22] Filed: Jul. 18, 1997

Related U.S. Application Data

[62] Division of application No. 08/030,365, filed as application No. PCT/JP93/00050, Jan. 18, 1993, abandoned.

[30] Foreign Application Priority Data

| Jan. 20, 1992 | [JP] | Japan | 4-007679 |
| Jun. 18, 1992 | [JP] | Japan | 4-159496 |
| Jul. 10, 1992 | [JP] | Japan | 4-183800 |
| Aug. 17, 1992 | [JP] | Japan | 4-217077 |
| Aug. 31, 1992 | [JP] | Japan | 4-231184 |
| Aug. 31, 1992 | [JP] | Japan | 4-231185 |
| Oct. 19, 1992 | [JP] | Japan | 4-279920 |

[51] Int. Cl.$^7$ .................................................. G11B 5/48
[52] U.S. Cl. ............................................................ 360/104
[58] Field of Search ................... 360/126, 97.01, 360/104, 103, 102, 108

[56] References Cited

U.S. PATENT DOCUMENTS

| 4,546,541 | 10/1985 | Reid | 29/603 |
| 4,731,920 | 3/1988 | Nishijima et al. | 29/603 |
| 4,761,699 | 8/1988 | Ainslie et al. | 360/103 |
| 4,996,623 | 2/1991 | Erpelding et al. | 360/104 |
| 5,001,583 | 3/1991 | Matsuzaki | 360/104 |
| 5,006,946 | 4/1991 | Matsuzaki | 360/104 |
| 5,041,932 | 8/1991 | Hamilton | 360/126 |
| 5,065,271 | 11/1991 | Matsuura et al. | 360/126 |
| 5,111,351 | 5/1992 | Hamilton | 360/104 |
| 5,124,864 | 6/1992 | Matsuzaki | 360/104 |
| 5,126,903 | 6/1992 | Matsuzaki | 360/104 |
| 5,163,218 | 11/1992 | Hamilton | 360/122 |
| 5,187,623 | 2/1993 | Ibaraki | 360/103 |
| 5,200,867 | 4/1993 | Albrecht et al. | 360/103 |
| 5,200,869 | 4/1993 | Matsuzaki | 360/103 |
| 5,296,983 | 3/1994 | Blanc et al. | 360/104 |
| 5,327,310 | 7/1994 | Bischoff et al. | 360/103 |
| 5,367,420 | 11/1994 | Yagi et al. | 360/104 |
| 5,453,315 | 9/1995 | Hamilton et al. | 360/104 |
| 5,490,027 | 2/1996 | Hamilton et al. | 360/104 |
| 5,528,819 | 6/1996 | McKay et al. | 360/103 |

FOREIGN PATENT DOCUMENTS

| 0179653 | 4/1986 | European Pat. Off. . |
| 0265721 | 5/1988 | European Pat. Off. . |
| 0430407 | 6/1991 | European Pat. Off. . |
| 0508565 | 10/1992 | European Pat. Off. . |
| 0538823 | 4/1993 | European Pat. Off. . |
| 58-81719 | 6/1983 | Japan . |
| 59-38920 | 3/1984 | Japan . |
| 2064849 | 6/1981 | United Kingdom . |

OTHER PUBLICATIONS

Patent Abstracts of Japan, vol. 9, No. 24 (P–331) (1747) JP–A–59–168968, Jan. 31, 1985.
Patent Abstracts of Japan, vol. 14, No. 27 (P–992) (3970) JP–A–01–267823, Jan. 19, 1990.

*Primary Examiner*—Craig A. Renner
*Attorney, Agent, or Firm*—Greer, Burns & Crain

[57] ABSTRACT

This invention relates to a magnetic head assembly for information recording and reproduction on and from a magnetic disk using a magnetic head, a method manufacturing the same and a magnetic disk apparatus. A head chip has an insulating layer, a magnetic pole and a coil with a terminal portion. A flexible support body has a lead portion and a terminal portion to be connected to the terminal portion of the head chip. The flexible support body is attached to the arm for supporting the head chip.

3 Claims, 46 Drawing Sheets

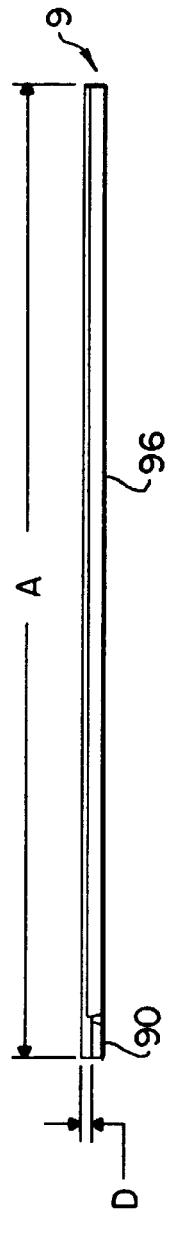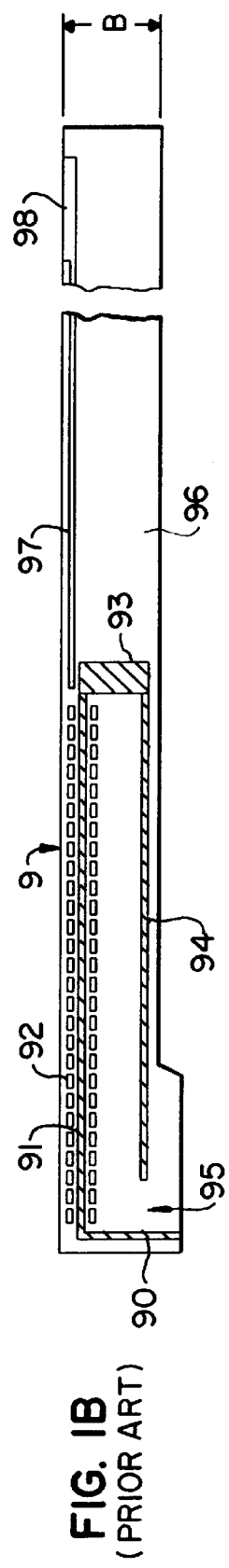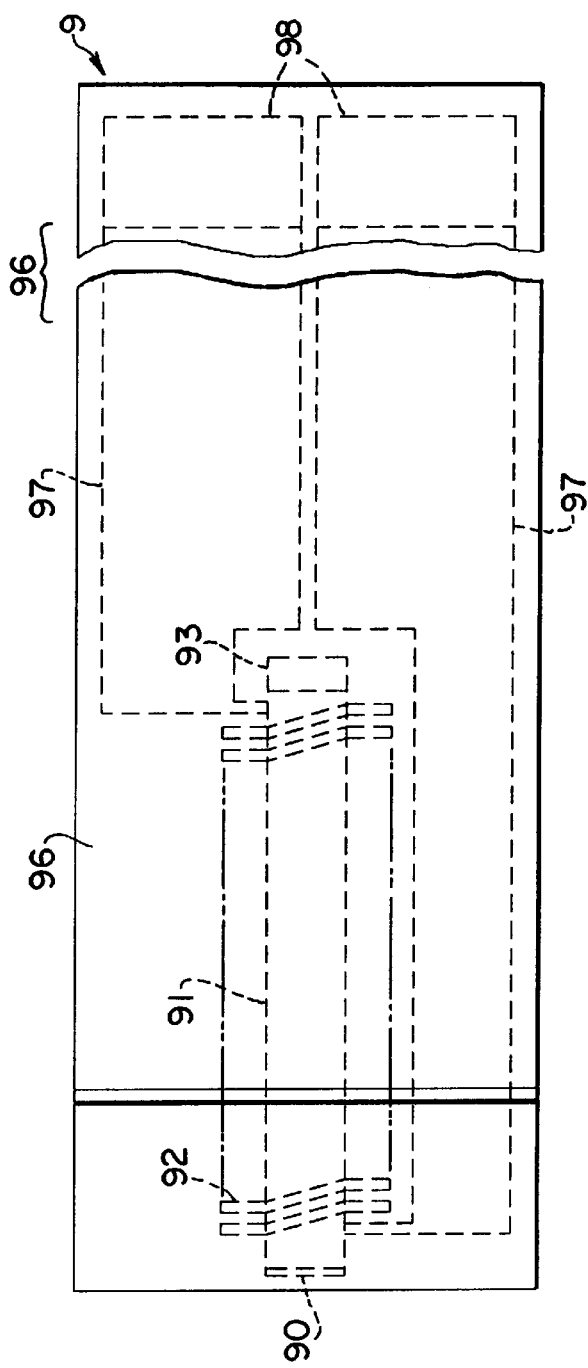
FIG. IA (PRIOR ART)
FIG. IB (PRIOR ART)
FIG. IC (PRIOR ART)

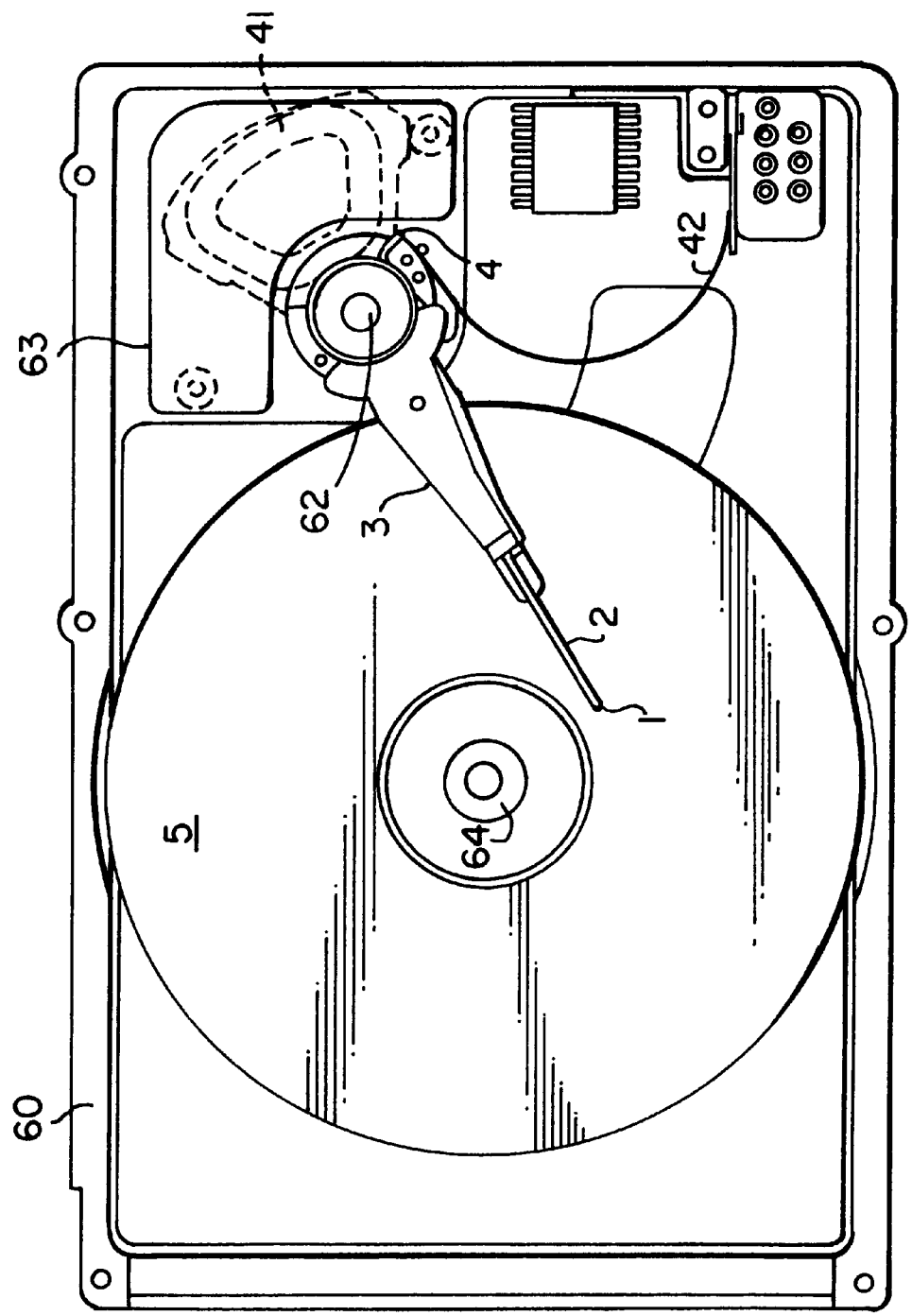

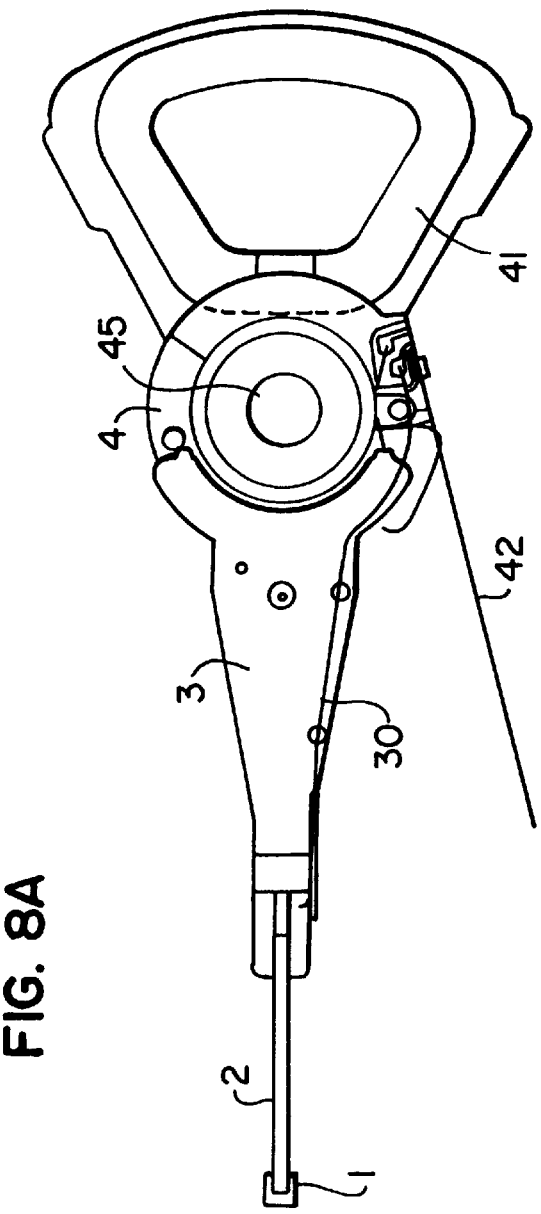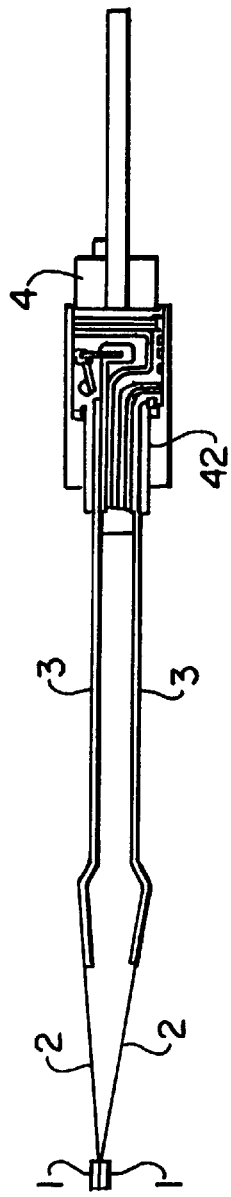

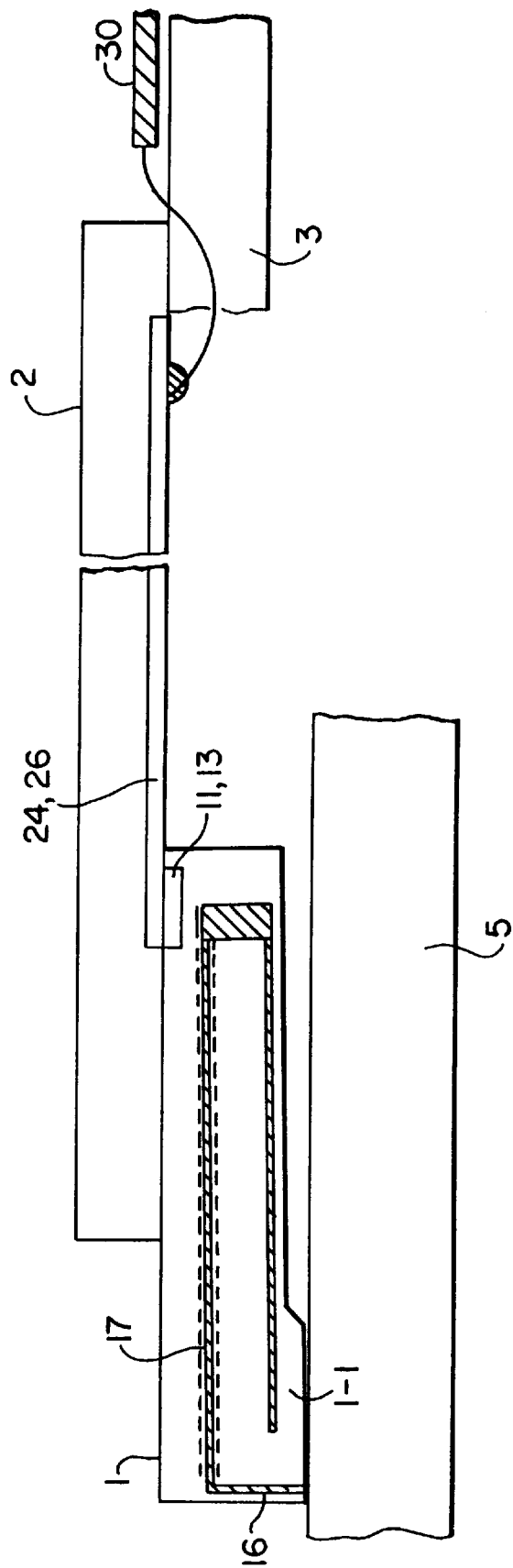

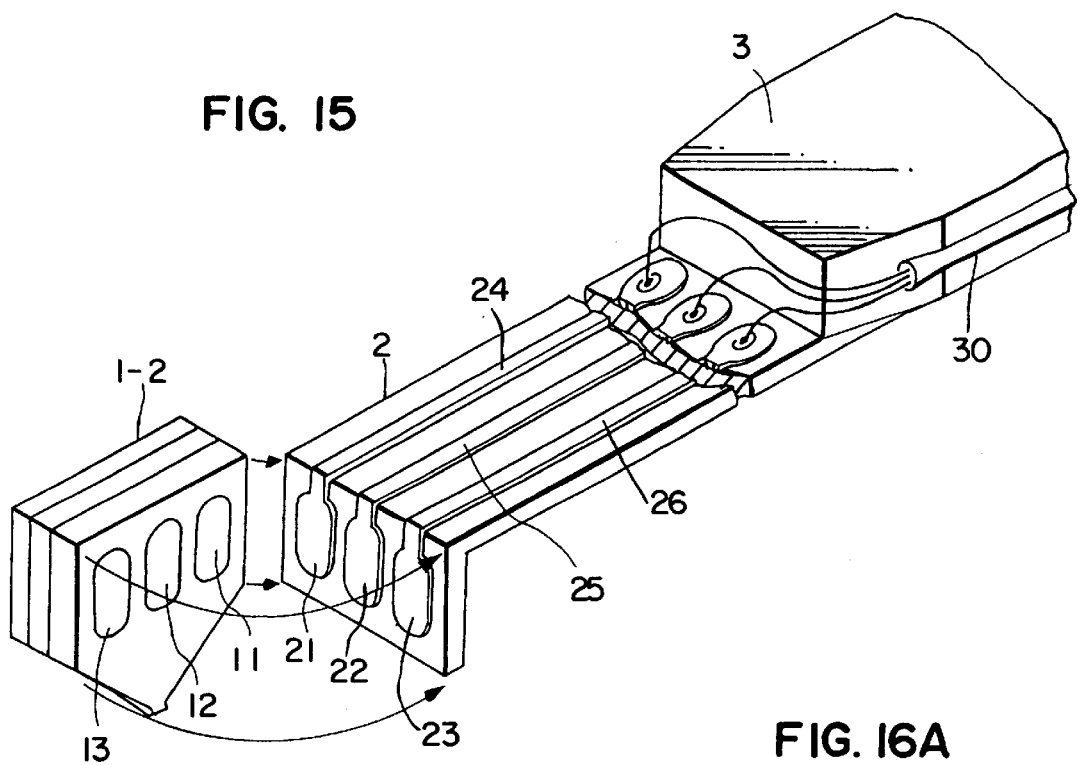
FIG. 15
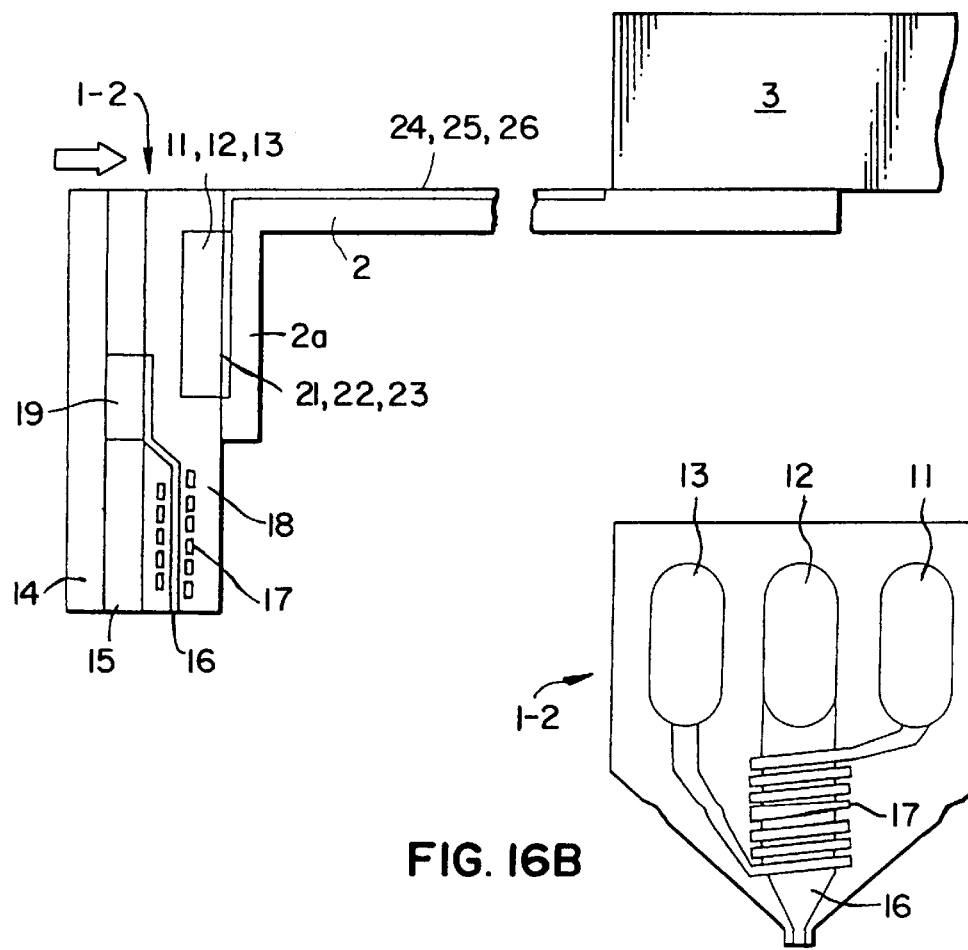
FIG. 16A
FIG. 16B

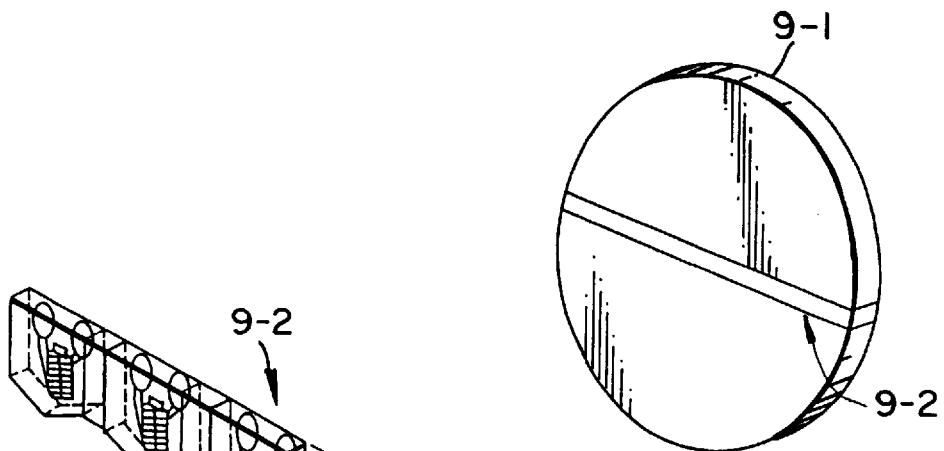
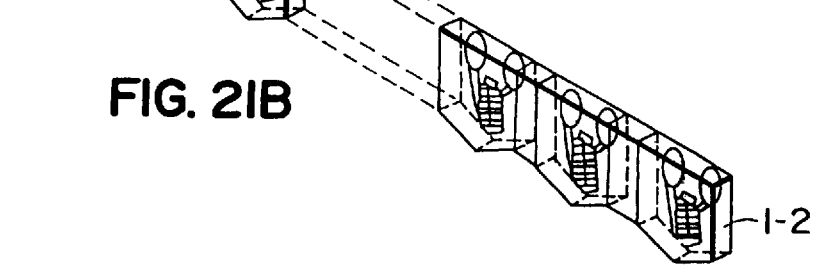
FIG. 21A
FIG. 21B
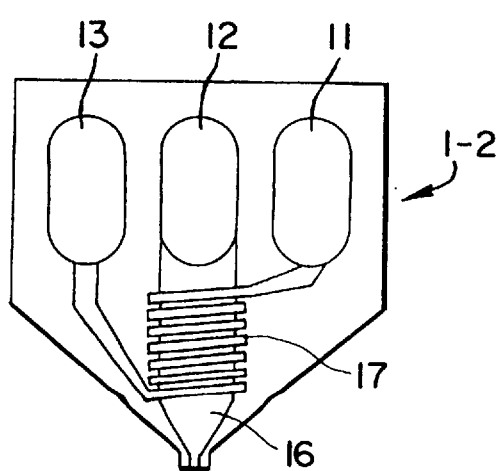
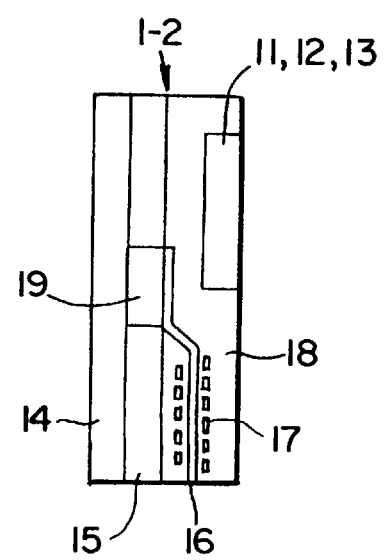
FIG. 21C
FIG. 21D

FIG. 22A
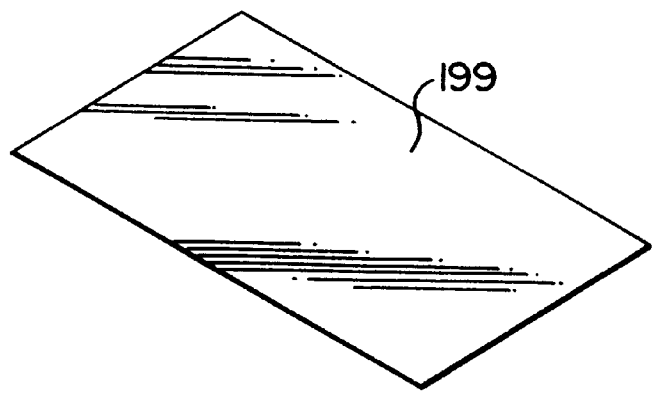
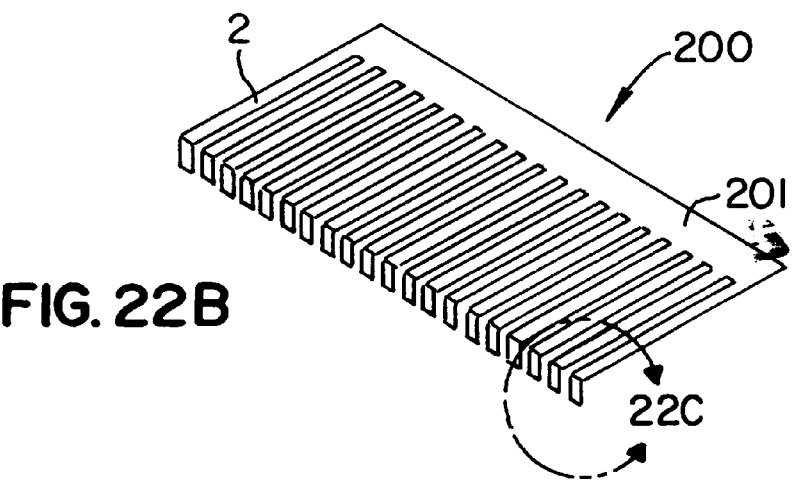
FIG. 22B
FIG. 22C
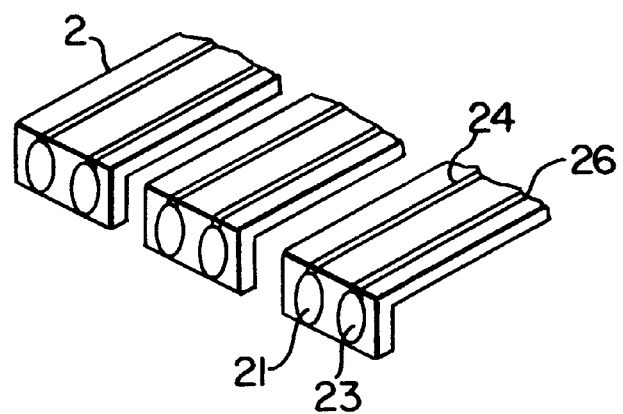

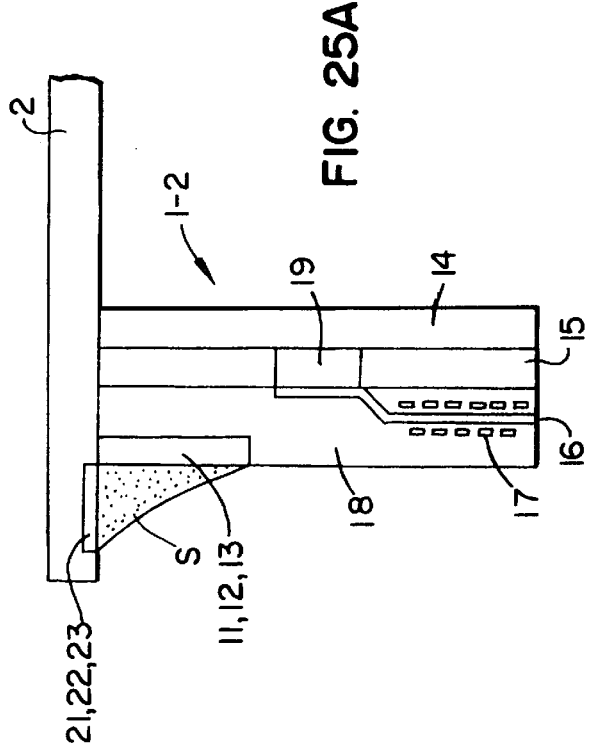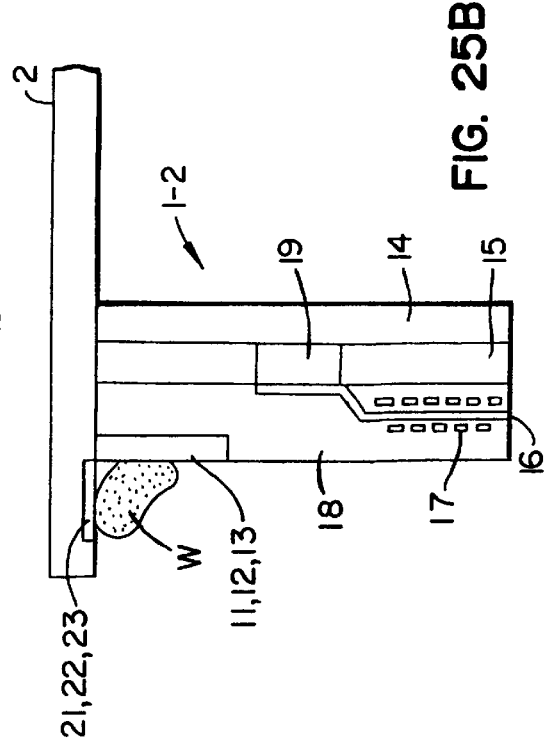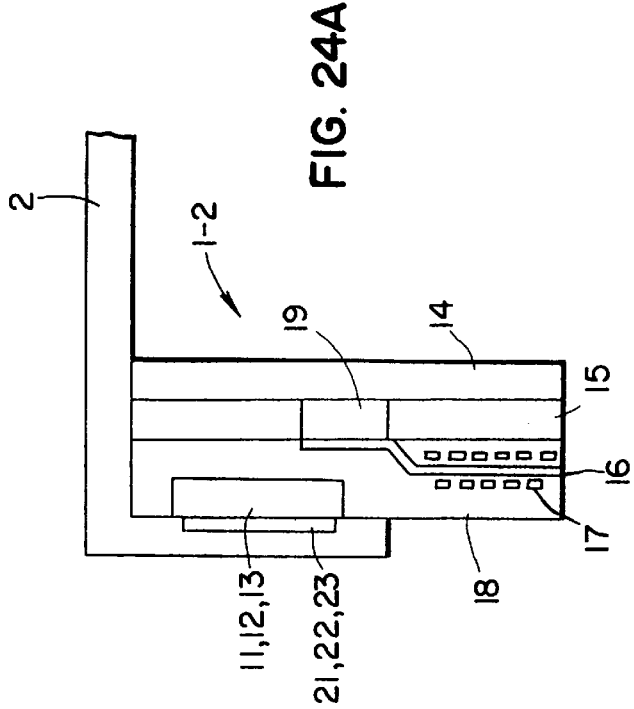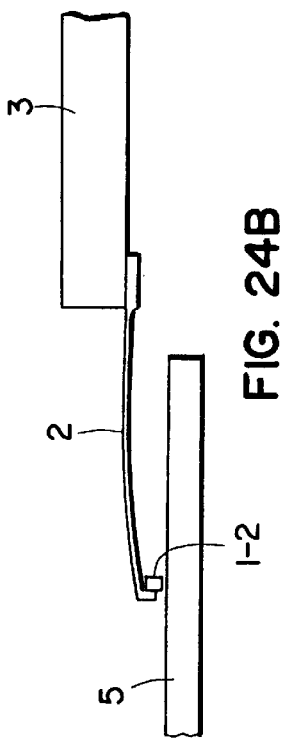

FIG. 28A
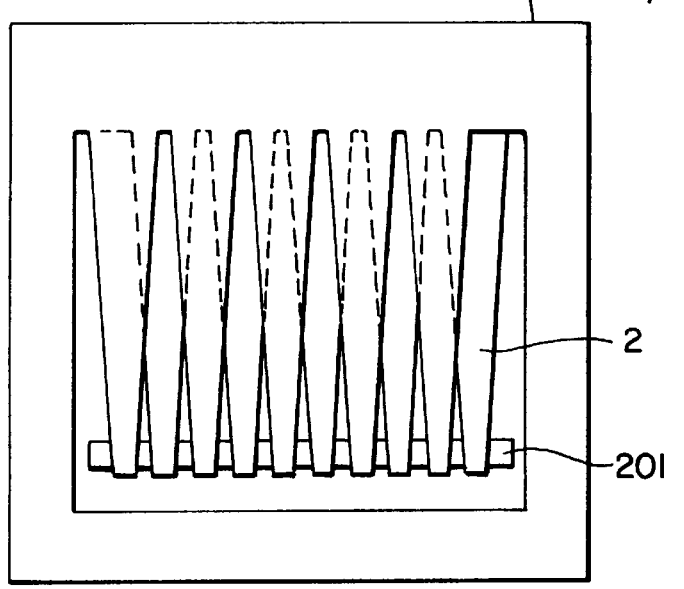
FIG. 28B
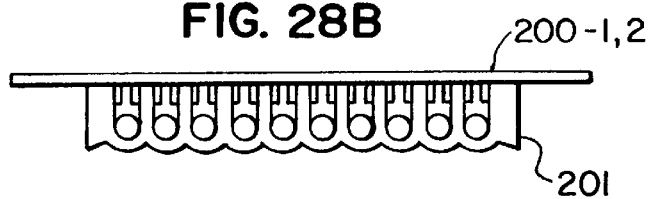
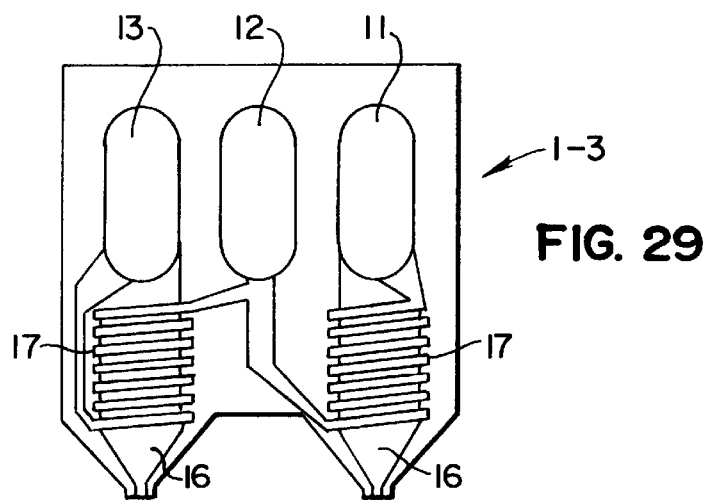
FIG. 29

FIG. 31A
SUBSTRATE
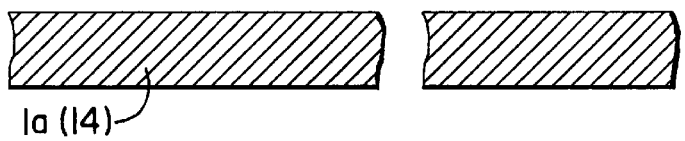
FIG. 31B
FORM COIL AND INSULATING LAYER
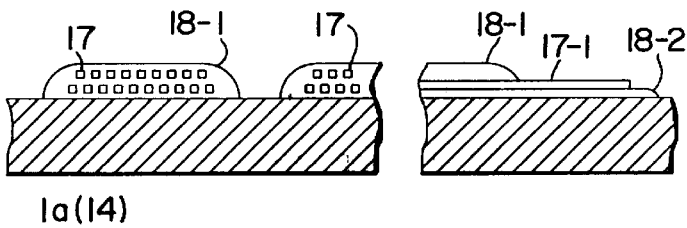
FIG. 31C
FLATTEN
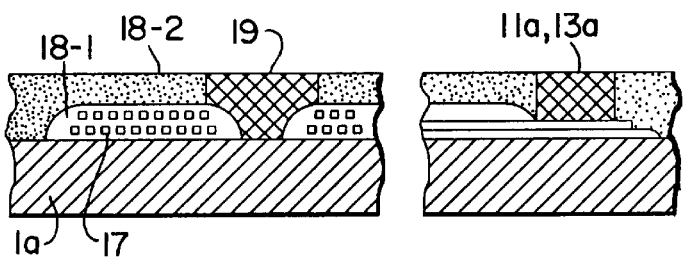
FIG. 31D
FORM MAIN POLE
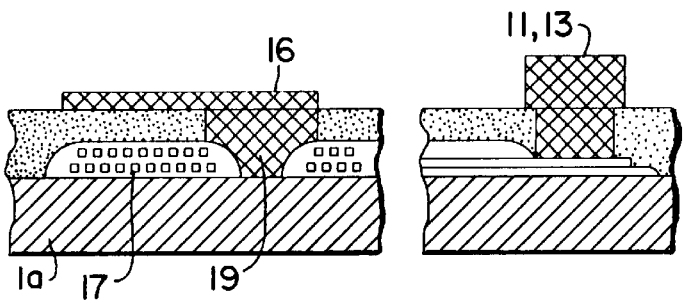
FIG. 31E
FORM PROCESSED PROTECTIVE FILM
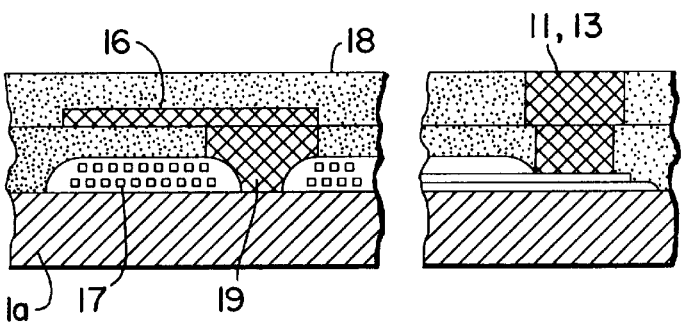
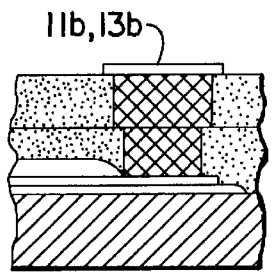
FIG. 31F

FIG. 34
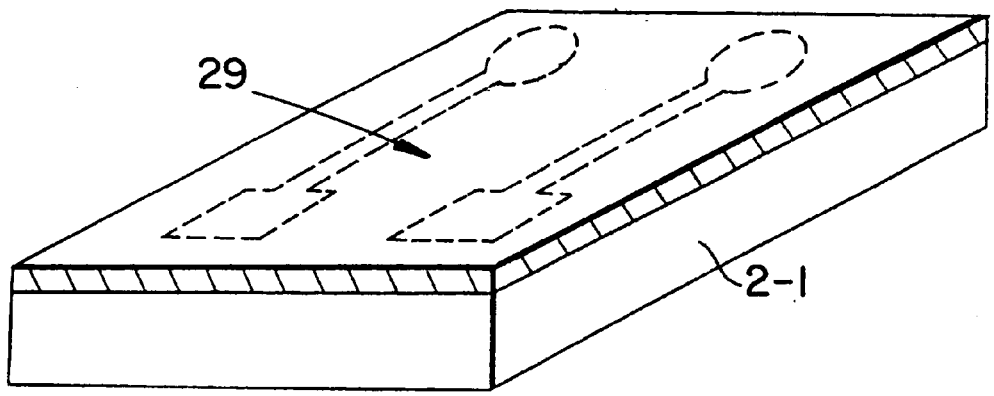
 ETCHING
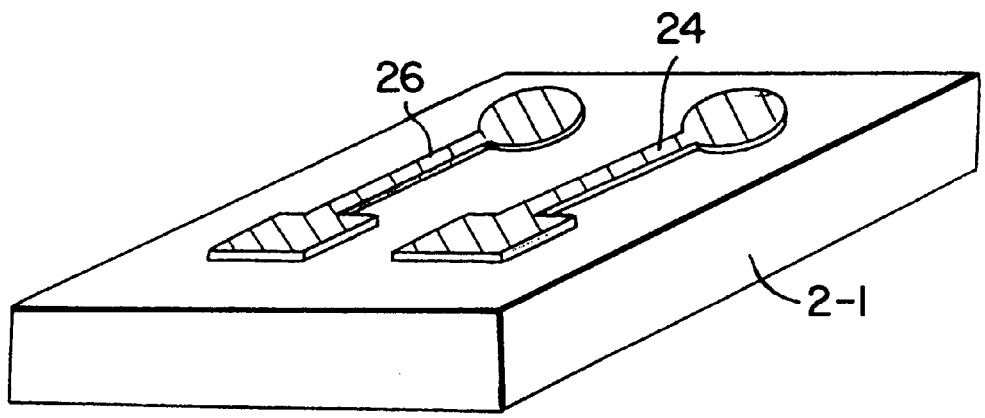

ROLLING DIRECTION

SEEK DIRECTION

FIG. 56A
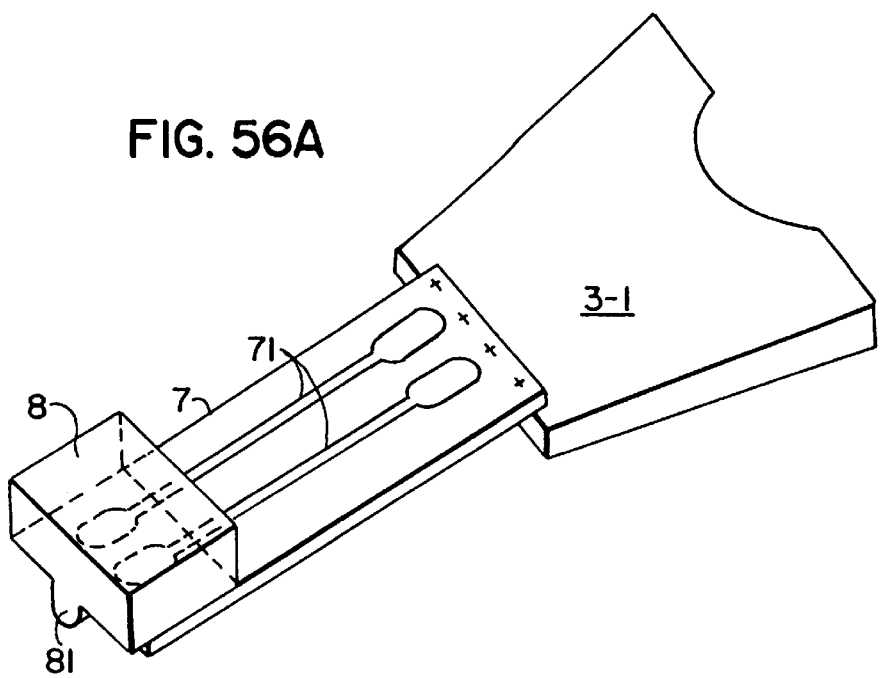
FIG. 56B
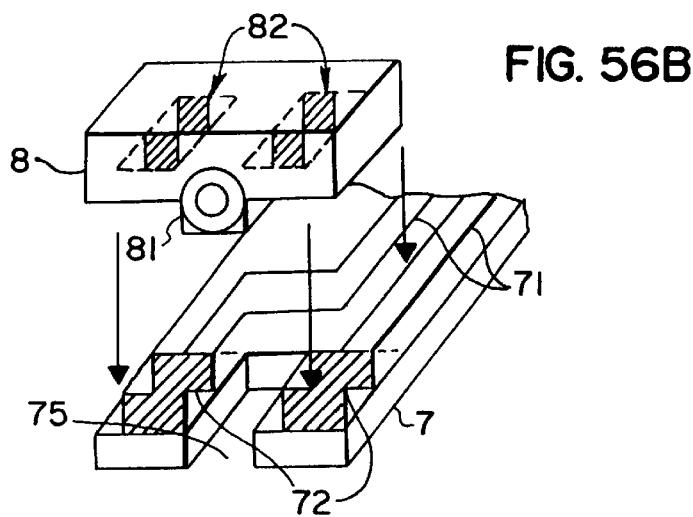
APPLY ULTRASONIC WAVE AND HEAT OR THE LIKE
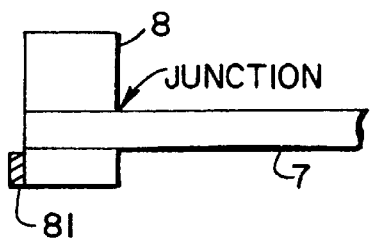
FIG. 56C

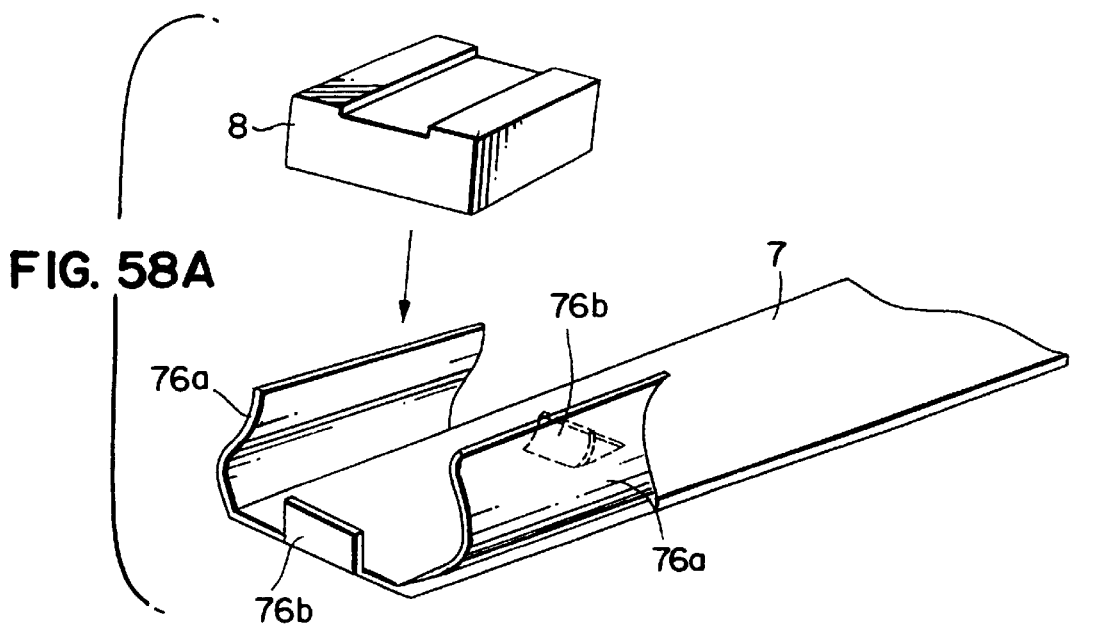
FIG. 58A
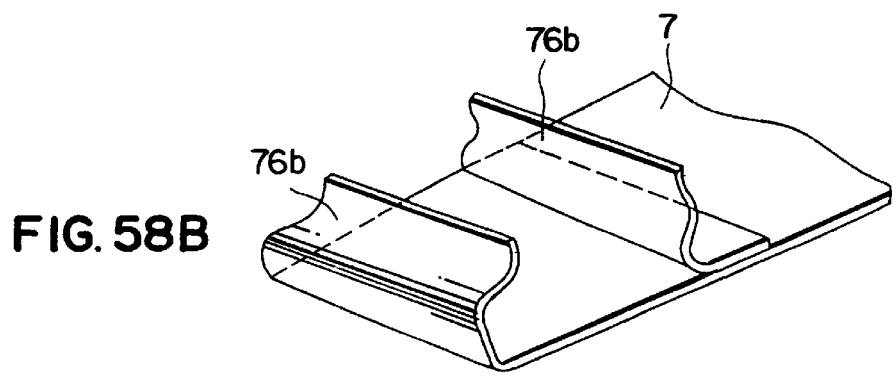
FIG. 58B
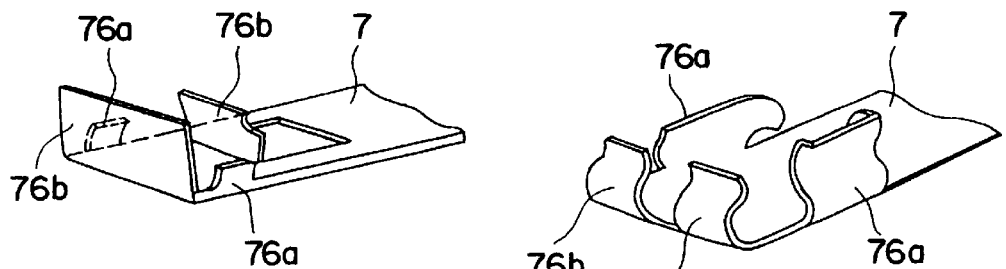
FIG. 58C
FIG. 58D

MAGNETIC HEAD ASSEMBLY WITH CONTACT-TYPE HEAD CHIP MOUNTING AND ELECTRICALLY CONNECTING ARRANGEMENTS

"This is a division of application Ser. No. 08/030,365 filed on Mar. 17, 1993, now abandoned, which is a 371 of PCT/JP93/00050 filed Jan. 18, 1993 and which designated U.S."

TECHNICAL FIELD

The present invention relates to a magnetic head assembly for information recording and reproduction on and from a magnetic disk using a magnetic head, a method of manufacturing the same and a magnetic disk apparatus, and, more particularly, to a magnetic head assembly using a thin-film head chip, a method of manufacturing the same and a magnetic disk apparatus.

BACKGROUND ART

A magnetic disk apparatus is a storage device which allows an actuator to position the magnetic head to a desired track on a rotating magnetic disk to thereby read data from that track or write data on that track by the magnetic head.

This magnetic disk apparatus is widely used as an external storage device. To meet the recent demand of downsizing of computer systems, there is a demand for a small magnetic disk apparatus with a large capacity. The size of magnetic disks tends toward 3.5 inches or 1.8 inches from 5.25 inches.

The size reduction of the magnetic disk apparatus and the large capacity require high-density recording. When high-density recording is performed, however, the magnetic force lines of a magnetic disk medium become short, so that it is preferable that planar recording or perpendicular recording be performed with the floating amount of the head set as small as or below the order of microns, or that perpendicular recording be performed with the head brought in contact with the magnetic disk.

In the case where the floating amount of the head is small or the head is brought in contact with the disk, if the head is heavy, the trackability to undulations or protrusions of the magnetic disk medium decreases on the order of microns.

If the load of the head is increased to improve this trackability, on the other hand, the force of contact with the protrusions of the magnetic disk medium increases, increasing the risk of head crash and medium crash.

Therefore, as the mass of the head decreases and the load of the head decreases, the trackability to a magnetic disk medium increases, so that high-density recording becomes possible with the reduced floating amount of the head or the head brought in contact with the medium.

FIGS. 1(A), 1(B) and 1(C) are diagrams showing the structure of a conventional magnetic head, and FIG. 2 is a diagram illustrating a fabrication process for the head.

As an example of a contact type perpendicular recording head, a flexible magnetic head 9 as shown in FIGS. 1(A–C) has been proposed (see Japanese Unexamined Patent Publication No. 178017/1991, for example).

In this head 9, as shown in FIG. 1(B), a main pole (main magnetic pole) 90 is formed vertically in a dielectric flexure body 96 of aluminum oxide or the like, a yoke 91 connected to this pole is formed horizontally, a back stud 93 connected to this yoke is formed vertically, and a return yoke 94 connected to this stud is formed horizontally, those components constitute a reluctance path. This path ends at a high reluctance gap 95 between the main pole 90 and the return yoke 94.

A spiral coil is inductively coupled to the yoke 91, both ends of the coil 92 connected via lead conductors 97 to bonding pads 98.

This head is called a probe type head, which is fabricated with thin-film forming technology and can be made very small. For instance, as shown in FIG. 1(A), the head 9 has a width D of 0.5 mm, a thickness B of 0.05 mm, a length A of 12.5 mm, and mass of 100 micrograms.

By attaching such a head 9 to an arm, low mass and low load of the head become possible, thus ensuring high-density perpendicular recording in tracking with the undulation of the magnetic disk medium.

This head 9 is formed as an integrated unit using thin film and photolithography technologies. As shown in FIG. 2, many heads are formed on a polished wafer 9-1 of barium titanate or the like in the order of microns through tens of steps by sputtering, vapor deposition, plating, chemical deposition, ion beam deposition and etching, etc., and those heads are scribed to be individual heads.

But, the prior art has the following problems. (1) The greater the number of heads formed on the wafer 9-1 is, the lower the cost becomes. However, since the lead conductor portion is formed integrally in the prior art, the number of heads formable on the wafer 9-1 is limited; for example, only about 270 heads can be formed on a 3-inch wafer. This significantly increases the cost of the heads.

(2) If the heads are large, the number of defects in the heads cut out of the wafer 9-1 increases; for example, even if the lead conductor portion alone is defective, the whole head becomes defective. This further increases the cost of the heads.

DISCLOSURE OF THE INVENTION

It is therefore a primary object of the present invention to provide a magnetic head assembly designed to increase the number of heads formable on a wafer to thereby lower the cost of the heads.

It is another object of the present invention to provide a magnetic disk apparatus designed to increase the number of heads formable on a wafer to thereby lower the cost of the heads, thus reducing the cost of the apparatus.

It is still another object of the present invention to provide a magnetic head assembly designed to increase the number of heads formable on a wafer and to reduce thin-film forming steps, thereby further reducing the cost of the heads.

It is a further object of the present invention to provide a magnetic disk apparatus designed to increase the number of heads formable on a wafer and to reduce thin-film forming steps for further reduction in the cost of the heads, thus further lowering the cost of the apparatus.

It is a still further object of the present invention to provide a method of manufacturing a magnetic head assembly, which facilitates assembling of the assembly even if the number of heads formable on a wafer is increased.

A magnetic head assembly according to the present invention, to be mounted to an arm for recording and reproducing data on and from a magnetic disk, comprises a head chip having a lamination of an insulating layer, a magnetic pole, a coil and a terminal portion of the coil formed of thin films; and a flexible support body having a terminal portion to be connected to the terminal portion of the head chip and attached to the arm, for supporting the head chip.

A magnetic disk apparatus according to the present invention comprises a magnetic disk; a spindle motor for rotating the magnetic disk; an actuator with an arm, for moving the arm in a direction intersecting tracks of the magnetic disk; a magnetic head assembly mounted to the arm for recording and reproducing data on and from the magnetic disk, the magnetic head assembly including a head chip having a lamination of an insulating layer, a magnetic pole, a coil and a terminal portion of the coil formed of thin films, and a flexible support body having a terminal portion to be connected to the terminal portion of the head chip and attached to the arm, for supporting the head chip.

According to the prior art, since the magnetic head assembly is directly mounted to the arm, the magnetic head assembly is given a flexibility and the lead conductor needs a length for that amount, requiring a long head flexure body. However, thin-film lamination is merely necessary for only a low reluctance path primarily including a magnetic pole and the coil, and the lead conductor portion can be formed by another means.

The length of the low reluctance path including the magnetic pole and the coil is merely about 1/20 of the entire length, and it is useless to form the other portion on a wafer in tens of steps.

According to the present invention, therefore, the low reluctance path primarily including a magnetic pole and the coil, which should be formed on a wafer, are provided on the wafer using thin-film lamination technology and the other portion or the lead conductor portion is formed separately by a flexible support body to allow the number of head portions formable on a wafer to be increased, thus ensuring cost reduction.

As this design miniaturizes the head chip portions, making it difficult to provide electrical connection, the head chip portion is provided with a terminal portion for connection with the signal terminal portion of the flexible support body 2 to facilitate the connection.

Further, the present invention is characterized in that the direction of the thin-film lamination of the head chip is horizontal to the surface of the magnetic disk.

According to the prior art, the direction of the thin-film lamination of the head is mainly perpendicular to the magnetic disk surface. The portion, other than the main magnetic pole, is formed in a thin film on a wafer and is then cut out, and then the main magnetic pole is formed in a thin film from the direction horizontal to the magnetic disk surface.

If the direction of the thin-film lamination of the head chip is made horizontal to the magnetic disk surface as in the present invention, the main magnetic pole can be formed in the same thin-film forming direction before the head chip is cut out of a wafer. This can increase the number of head chips on the wafer, and can simplify the steps of fabricating the head chips, thus ensuring that heads can be provided at a lower cost.

Furthermore, a method of manufacturing a magnetic head assembly according to the present invention is characterized in that after a number of head chips are formed on a wafer through a thin-film forming process, a block including a row of head chips is cut out, a support body sheet having a plurality of support bodies is linked by a link bar, the individual head chips of the block are positioned and connected to the respective support bodies of the support body sheet, the head chips of the block are separated, and the bases of the support bodies are separated from the link bar, thereby manufacturing magnetic head assemblies.

This method can allow block-by-block assembly even if the head chips and support bodies are small, and can manufacture a number of magnetic head assemblies at a time.

BRIEF DESCRIPTION OF THE DRAWINGS

FIGS. 1(A–C) are diagrams showing the structure of a conventional flexible magnetic head;

FIG. 6 is a top view of the magnetic disk apparatus in FIG. 3;

FIGS. 8(A–B) are views showing the structure of the actuator and magnetic head assembly of the magnetic disk apparatus in FIG. 3;

FIG. 9 presents a cross section of a magnetic head assembly according to a first embodiment of the present invention;

FIG. 15 presents a perspective view of a magnetic head assembly according to a second embodiment of the present invention;

FIGS. 16(A–B) are cross sections of the magnetic head assembly in FIG. 15;

FIGS. 21(a–d) illustrate a head-chip block forming process in FIG. 20;

FIGS. 22(a–c) illustrate a support-body sheet forming process in FIG. 20;

FIGS. 24(A–B) show the structure of a magnetic head assembly according to a third embodiment of the present invention;

FIGS. 25(A–B) show the structure of a magnetic head assembly according to a fourth embodiment of the present invention;

FIGS. 28(a–b) illustrate a process of manufacturing the magnetic head assembly using the support body sheet in FIGS. 27 (a–b);

FIG. 29 presents a cross section of a head chip of a magnetic head assembly according to a fifth embodiment of the present invention;

FIGS. 31(A–F) are diagrams for explaining a process of fabricating a head chip in FIG. 30;

FIG. 34 illustrates the structure of a further embodiment of the support body of the present invention;

FIGS. 56(A–C) are perspective views of a magnetic head assembly according to a nineteenth embodiment of the present invention;

FIGS. 58(A–D) are perspective views of a magnetic head assembly according to a twentieth embodiment of the present invention.

BEST MODE OF CARRYING OUT THE INVENTION (a) Description of Magnetic Disk Apparatus FIG. 3 is an exploded view of a magnetic disk apparatus according to one embodiment of the present invention, FIG.

4 is a perspective view illustrating the interior of the magnetic disk apparatus in FIG. 3, FIG. 5 is a cross section of the magnetic disk apparatus in FIG. 3, FIG. 6 is a top view of the magnetic disk apparatus in FIG. 3, and FIG. 7 is a perspective view of an actuator of the magnetic disk apparatus in FIG. 3.

The magnetic disk apparatus illustrated in FIGS. 3 through 7 causes a head to come in contact with a 1.8-inch magnetic disk to perform perpendicular magnetic recording.

Figure 2:
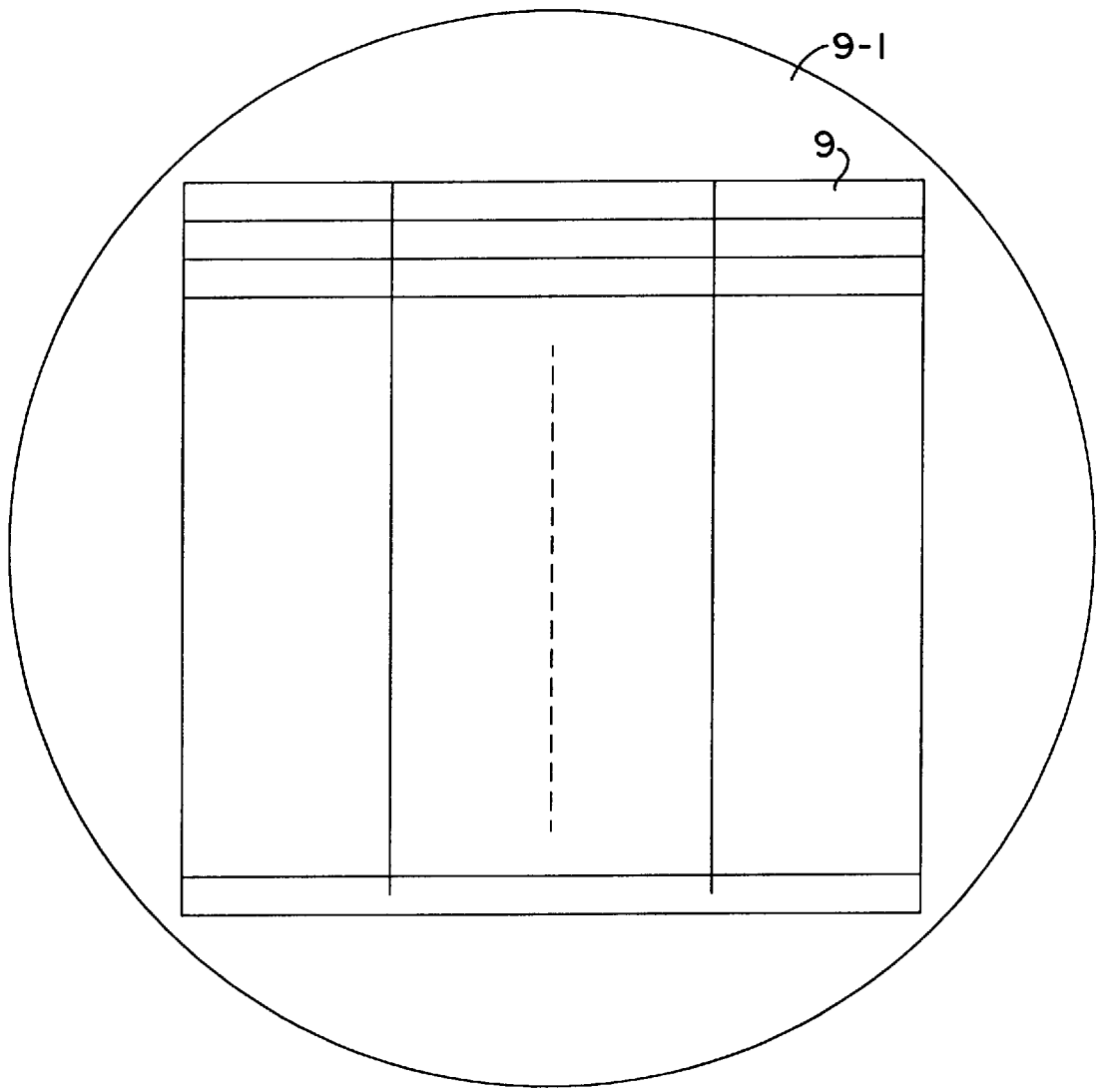
FIG. 2 is an explanatory diagram of a fabrication process of the magnetic head in FIGS. 1(A–C)
Figure 3:
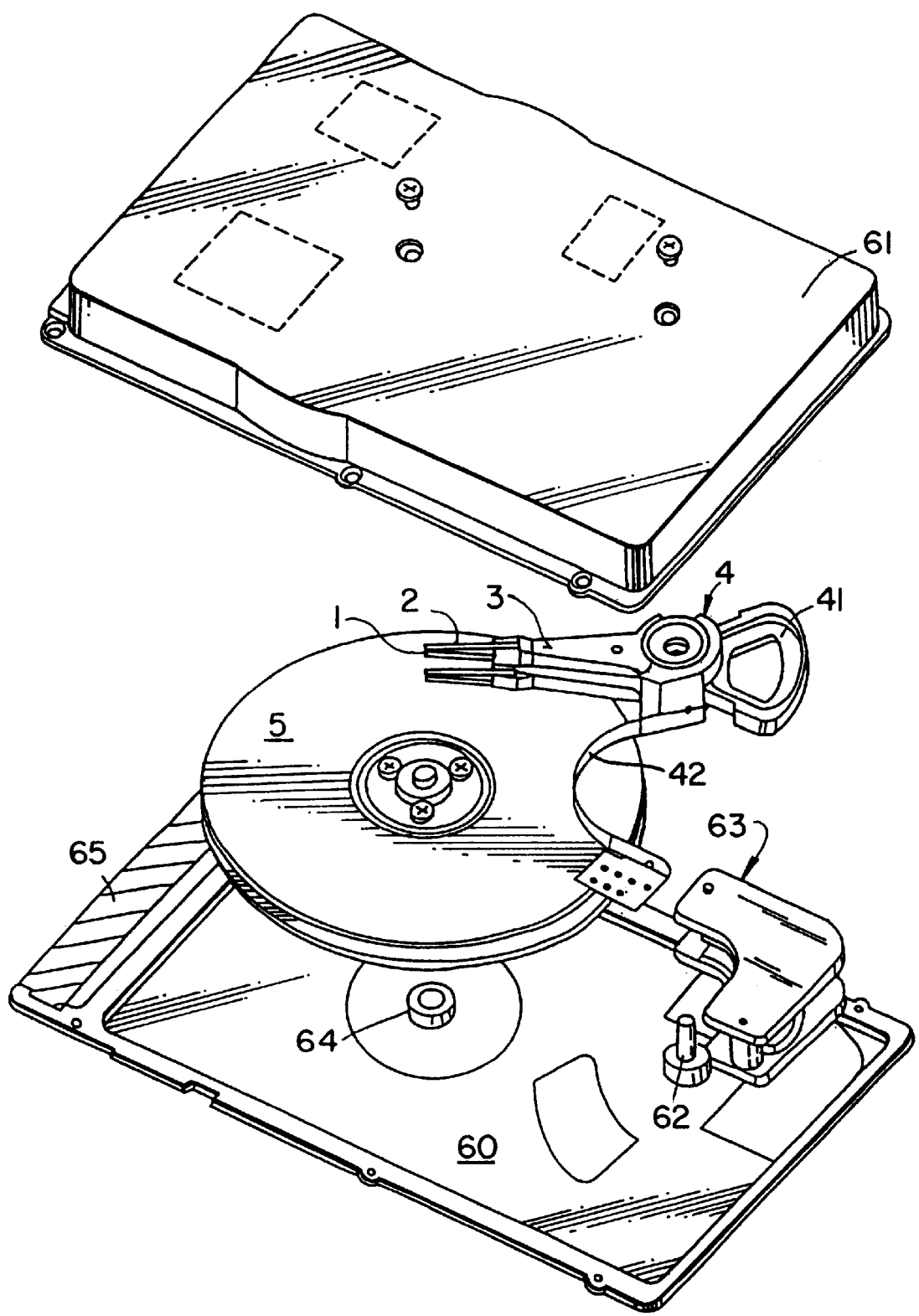
FIG. 3 is an exploded view of a magnetic disk apparatus to which the present invention is applied.
Figure 4:
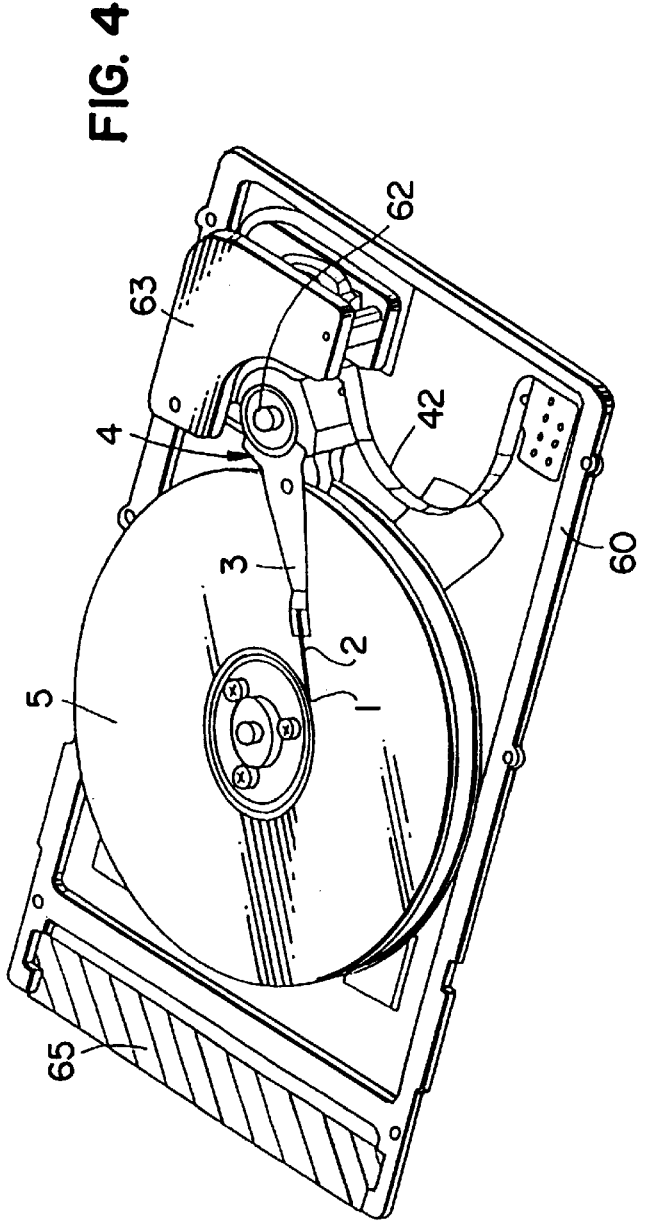
FIG. 4 is a perspective view illustrating the interior of the magnetic disk apparatus in FIG. 3.
Figure 5:
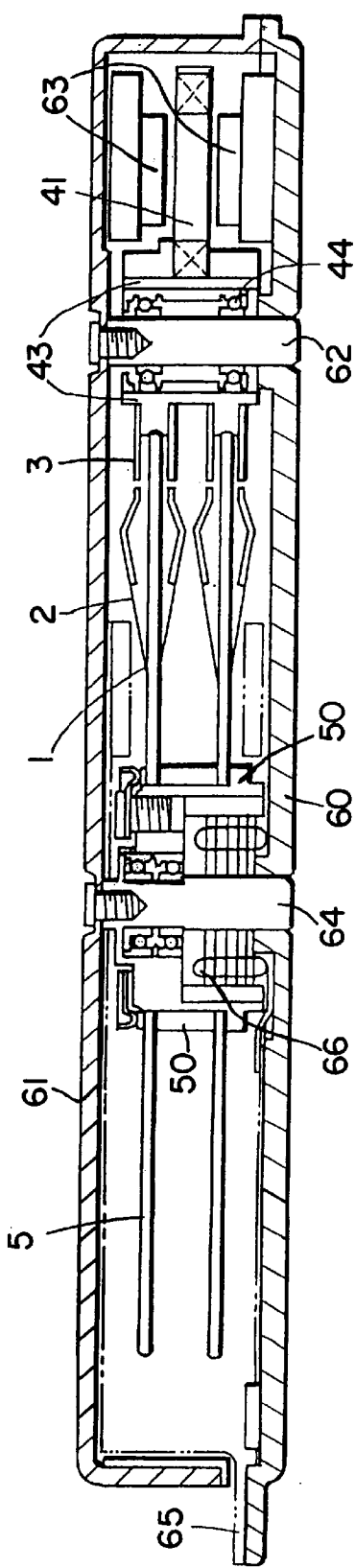
FIG. 5 is a cross section of the magnetic disk apparatus in FIG. 3.

As shown in FIGS. 3 and 4, a base 60 of the magnetic disk apparatus is provided with a rotary shaft 62 of an actuator 4, a magnetic circuit 63 for driving the actuator 4, a fixed center shaft 64 of a magnetic disk 5, and connector portion 65 for external connection. Attached to this center shaft 64 is a stator portion 66 having a drive coil as shown in FIG. 5. A rotor portion 50, which supports the magnetic disk 5 and has a magnet, is rotatably provided via a bearing (not shown) to the center shaft 64.

Accordingly, as the drive coil of the stator portion 66 provided on the center shaft 64 is excited, it cooperates with the magnet of the rotor portion 50 so that the rotor portion 50 rotates around the center shaft 64, rotating the magnetic disk 5.

A rotary hole 45 (see FIG. 8(A)) of a cylinder portion 43 of the actuator 4 is fitted via a bearing 44 on the rotary shaft 62, and a coil 41 at the back of the cylinder portion 43 is located in the magnetic circuit 63. Attached to the cylinder portion 43 of the actuator 4 are arms 3 to which flexible support bodies 2 respectively having head chips 1 at their distal ends are attached.

Here, the rotor portion 50 supports two magnetic disks 5. The actuator 4 is provided with four arms 3, and the cylinder portion 43 is provided with a flat cable 42 (see FIGS. 3 and 4) for connection between the individual head chips 1 and an external circuit. As shown in FIGS. 8(A–B), each head chip 1 is connected to the flexible cable 42 by lead wires 30 provided along the arm 3.

A circuit board of a drive circuit (not shown), etc. is provided on the base 60, a cover 61 in FIG. 3 is fastened by screws to the base 60 in the state shown in FIG. 4 to make the interior airtight.

This magnetic disk apparatus is about 5 mm in height and is of a card size.

Figure 7A:
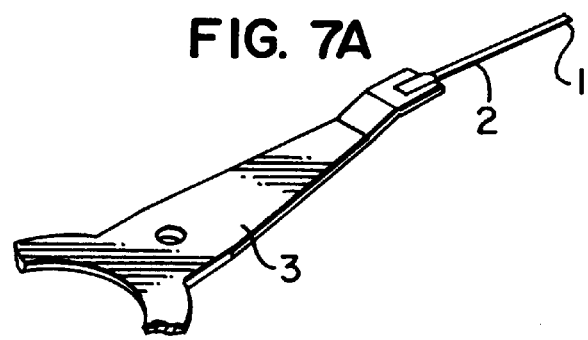
FIG. 7 is an exploded view of an actuator and a magnetic head assembly of the magnetic disk apparatus in FIG. 3.
Figure 7B:
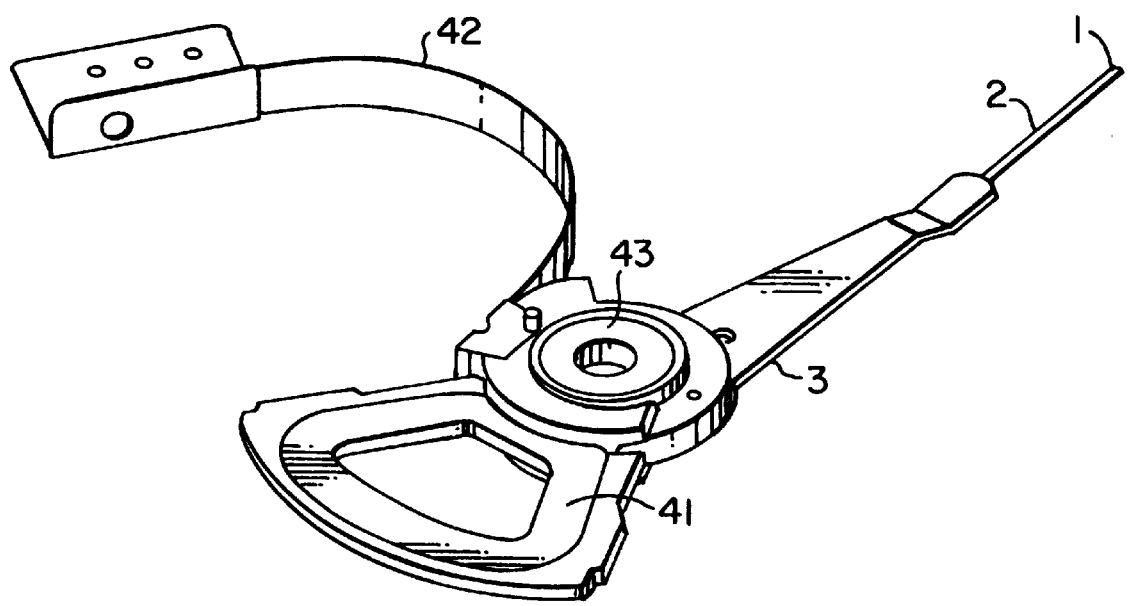

As shown in FIG. 7, the arm 3 has a bent distal end to which the flexible support body 2 provided at the tip with the head chip 1 is attached by laser spot welding or the like. The arm 3 is attached to the cylinder portion 43 by adhesive or a screw.

Thus, the magnetic disk 5 rotates with the rotation of the rotor portion 50 by the stator portion 66, and the head chip 1 is allowed by the actuator 4 to move for seek in the radial direction of the magnetic disk 5 (in a direction crossing the tracks).

(b) Description of First Embodiment

Figure 10:
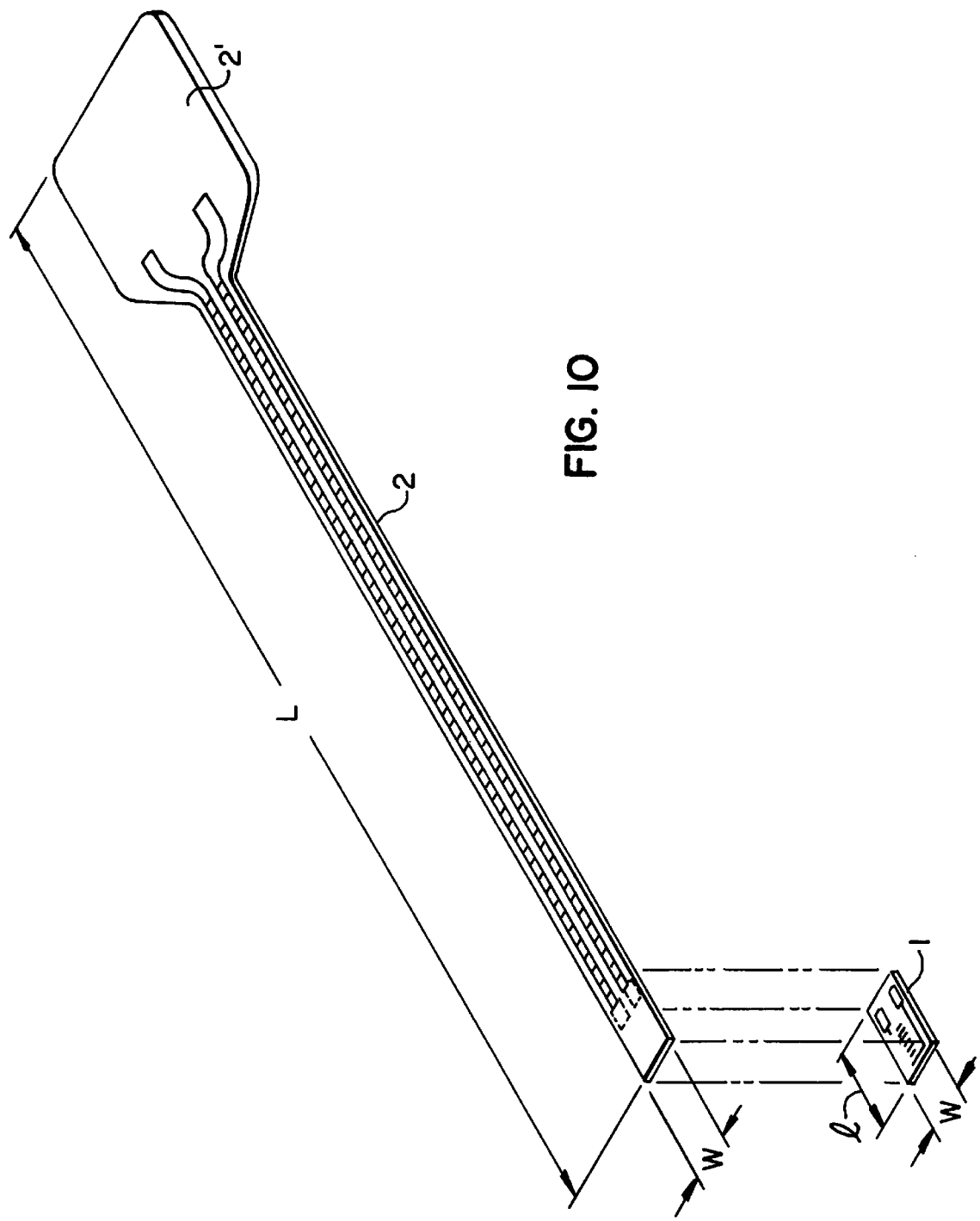
FIG. 10 is an exploded view of the magnetic head assembly in FIG. 9.
Figure 11A:
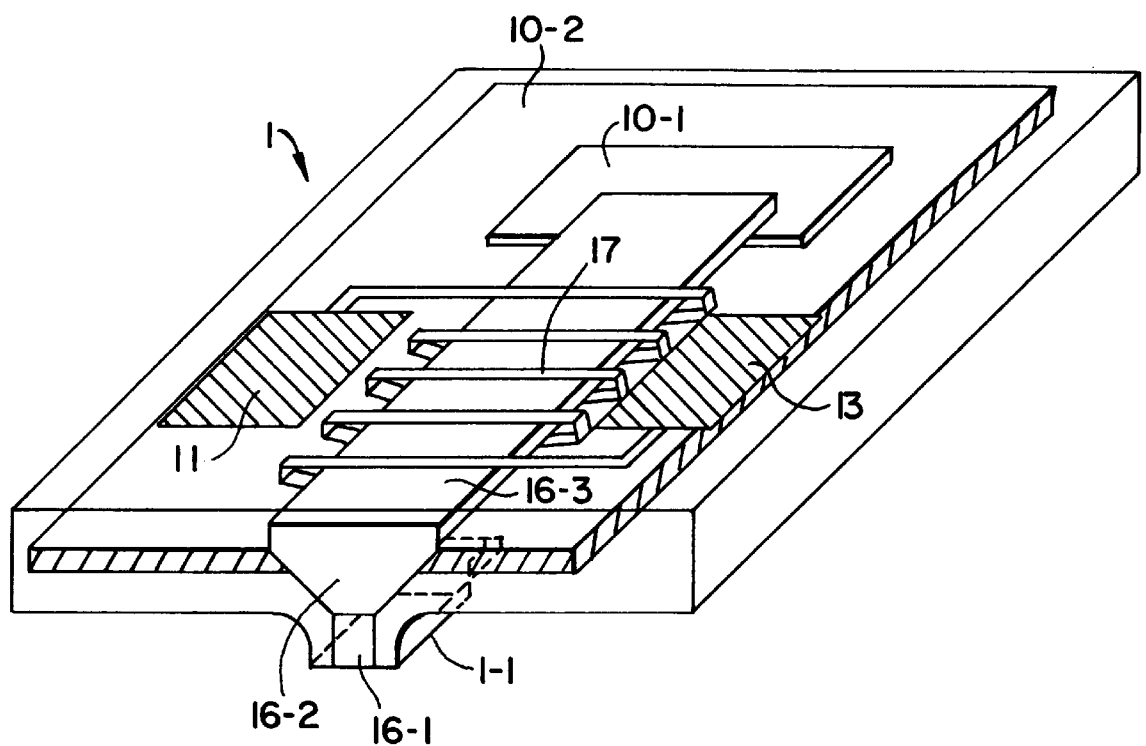
FIGS. 11(A–B) show the structure of a head chip in FIG. 10.
Figure 12:
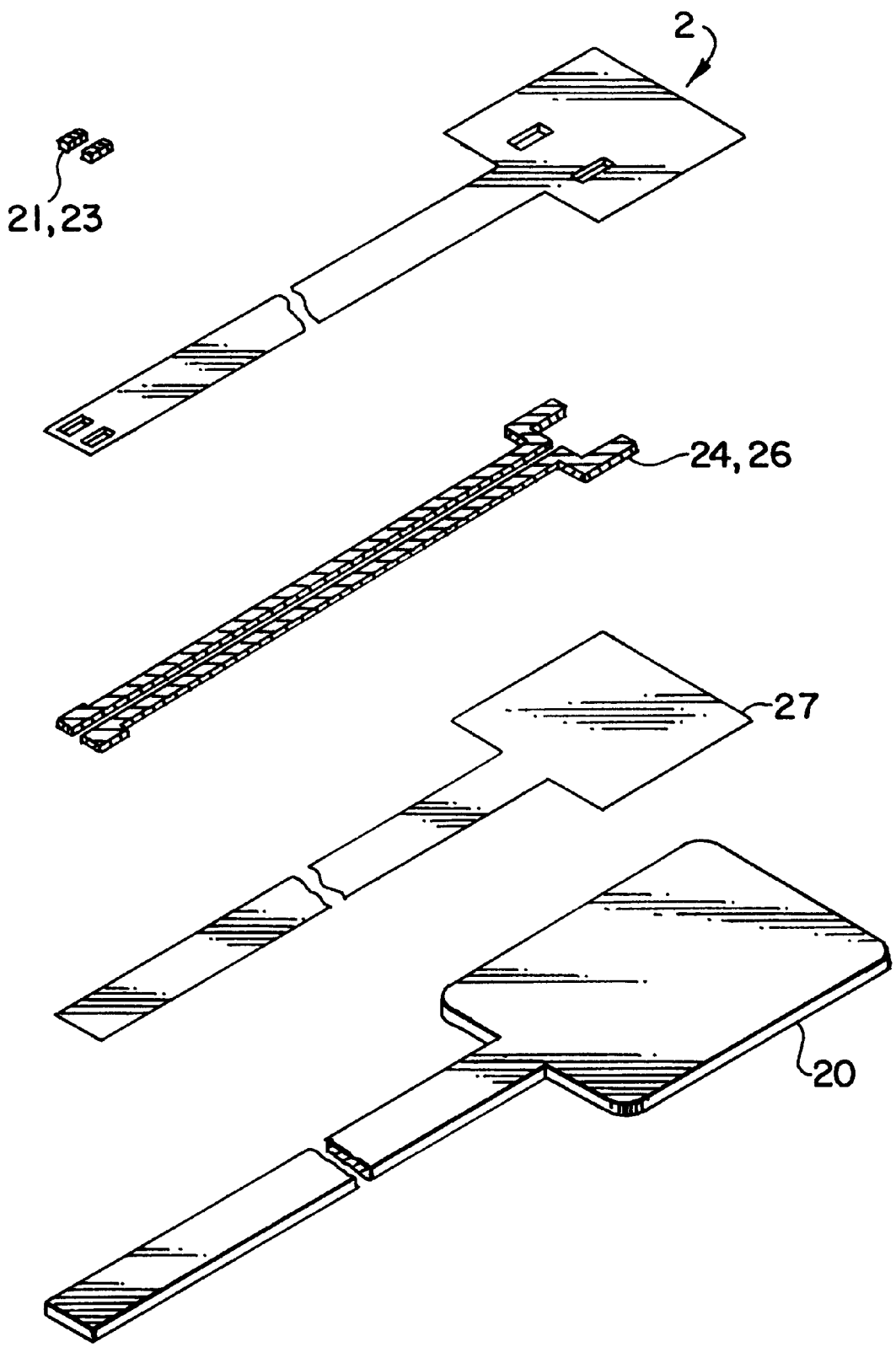
FIG. 12 is an exploded view of a flexible support body in FIG. 10.
Figure 13:
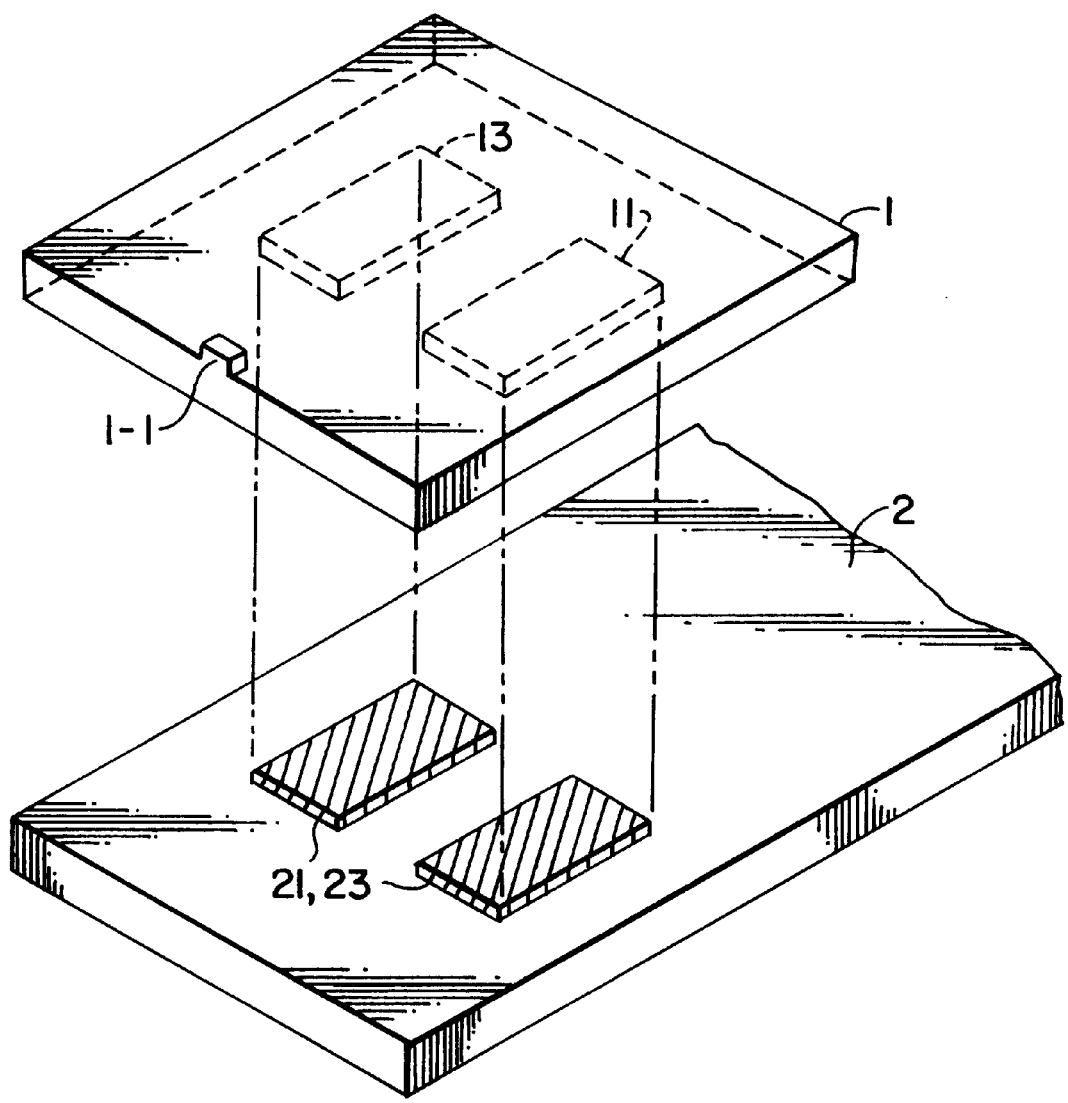
FIG. 13 shows the relationship between the head chip and the flexible support body of the magnetic head assembly in FIG. 9.

FIG. 9 presents a structural diagram of a magnetic head assembly according to a first embodiment of the present invention. FIG. 10 is an exploded view of the magnetic head assembly in FIG. 9. FIGS. 11(A–B) are structural diagrams of a head chip of the magnetic head assembly in FIG. 9. FIG. 12 is a structural diagram of a support body of the magnetic head assembly in FIG. 9. FIG. 13 shows the relationship between the head chip in FIGS. 11(A–B) and the support body in FIG. 12. FIGS. 14(A–B) are diagrams showing the state of connection of FIG. 13.

In FIG. 10, a head chip 1 has a width w of 0.42 mm, a length l of 0.8 mm and a thickness of 0.04 mm, and has a structure which will be described referring to FIGS. 11(A–B), while a flexible support body 2 has a width W of 0.42 mm, a length L of 10.7 mm and a thickness of 0.05 mm, and will be described referring to FIG. 12.

In FIGS. 11(A–B), the head chip 1, a probe type perpendicular magnetic recording head, has a low reluctance path constituted of a pole (main magnetic pole) 16-1, a yoke 16-2, a core 16-3, a return stud 10-1, and a return yoke 10-2. A high reluctance gap is formed between the pole 16-1 and the return stud 10-1, and a contact pad 1-1, made of a rigid material, is provided at the pole 16-1. A spiral coil 17 is provided around the core 16-3, and a pair of connector terminals 11 and 13, made of gold (Au) and connected to the coil 17, are exposed.

Figure 11B:
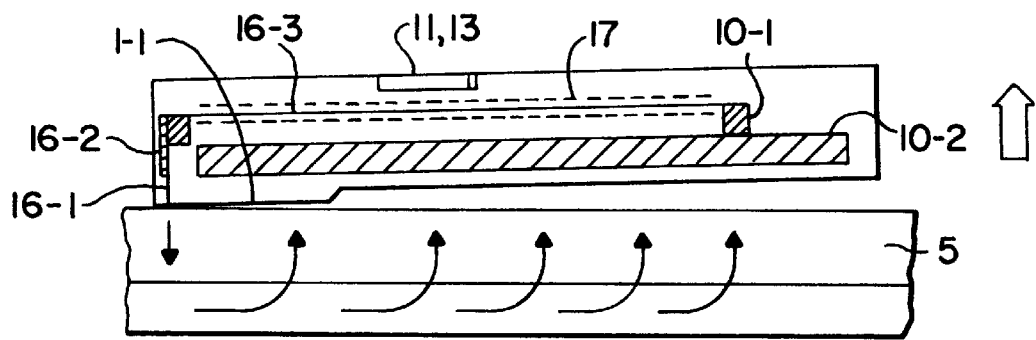

As shown in FIG. 11(B), therefore, the rigid contact pad 1-1 contacts a double-layered magnetic disk 5 for perpendicular magnetic recording. The magnetic force from the pole 16-1 is distributed from the bottom layer of the magnetic disk 5 to the pole 16-1 and the return studs 10-1 and 10-2, and returns, so that only that portion of the magnetic disk 5 which lies directly below the pole 16-1 is magnetized for perpendicular recording. At this time, the contact pad 1-1 of a rigid material in the head chip 1 contacts the magnetic disk 5. Even if contact type recording is used, the head chip 1 has small wear, and carries out stable contact recording to ensure high-density recording.

This head chip 1 is formed by lamination of thin films whose lamination direction is vertical to the surface of the magnetic disk 5. As the head chip 1 is provided with the low reluctance path including the magnetic pole 16-1, the coil 17 and the terminals 11 and 13, and has no lead portion, it can be made very small, 1/20 of the conventional type, as shown in FIG. 10.

Now referring to FIG. 12, the flexible support body 2, which supports this head chip 1, has an insulating layer 27 of an insulating resin or the like formed on a flexible metal plate (base plate) of stainless, with lead patterns 24 and 26 formed of a conductive metal, such as copper, on the insulating layer 27. Further, on the lead patterns 24 and 26 is provided an insulating protective layer 28 having holes so formed to expose both ends of the lead patterns 24 and 26. Lead terminals 21 and 23 are provided at one end (connecting portions to the head chip 1) of the exposed portions of the lead patterns 24 and 26.

The connecting portion (base portion) 2' of the flexible support body 2 to the arm 3 has a large area to increase the strength of connection to the arm 3.

The connection of the head chip 1 to the flexible support body 2 will be described referring to FIGS. 13 and 14.

Figure 14A:
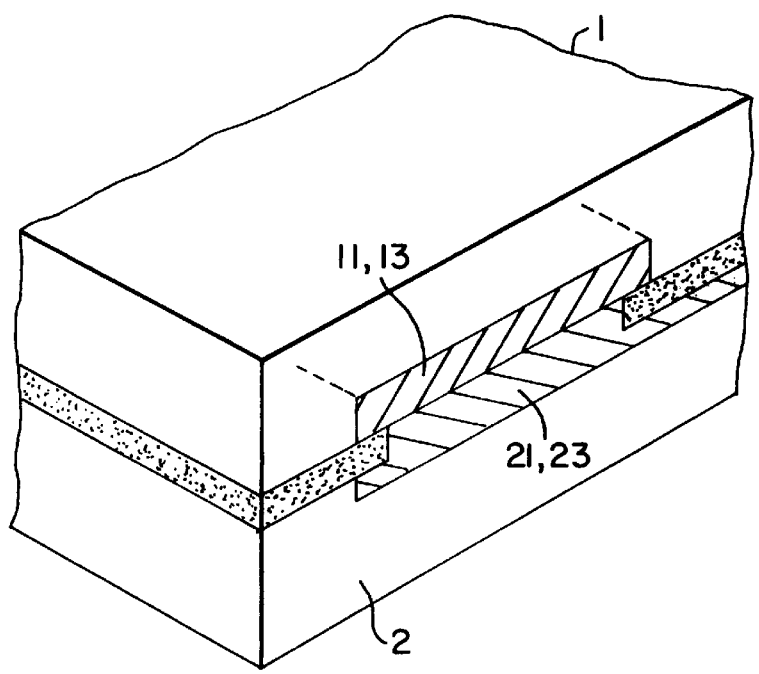
FIGS. 14(A–B) are diagrams showing how the head chip and the flexible support body of the magnetic head assembly in FIG. 9 are connected.

As shown in FIG. 13, an insulating adhesive is coated around the lead terminals 21 and 23 of the flexible support body 2, and the terminals 11 and 13 of the head chip 1 are positioned in alignment with lead terminals 21 and 23 of the flexible support body 2. Then, the terminals 11 and 13 of the head chip 1 are placed on the lead terminals 21 and 23 of the flexible support body 2 and are pressed thereon. Since the lead terminals 21 and 23 of the flexible support body 2 protrude, the lead terminals 21 and 23 are conductively coupled to the terminals 11 and 13 of the head chip 1, and the head chip 1 is fixed to the flexible support body 2 at another portion by means of the adhesive, as shown in FIG. 14(A). The provision of the lead terminals 21 and 23 on the flexible support body 2 can allow the minute head chip 1, about 0.5 mm wide, to be easily fixed to the flexible support body 2 while providing electrical connection thereto.

Figure 14B:
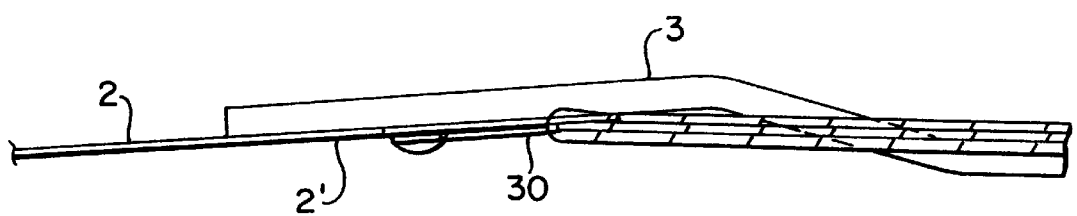

As shown in FIG. 14(B), lead wires 30 are connected to the arm-side end portions of the lead patterns 24 and 26 of the flexible support body 2. The aforementioned large portion 2' of the protective layer 28 of the flexible support body 2 is coated with an adhesive, and is securely attached to the arm 3. These lead wires 30 are to be connected to the flexible cable 42, which was described referring to FIGS. 8(A–B).

While the flexible support body 2 is attached to the bottom of the arm 3 in FIG. 14(B), if it is attached to the top of the arm 3 as shown in FIG. 9, the arm 3 allows the contact pad 1-1 of the head chip 1 to contact the magnetic disk 5 for perpendicular recording and reading.

As the flexible magnetic head, which has been formed integrally in the prior art, is separated into the head chip 1, which has the low reluctance path including the magnetic pole, the coil and the terminals formed of thin films, and the flexible support body 2 having a flexibility and terminals, the number of the head chips 1 formed on a wafer greatly increases; in this example, the number of the head chips 1 obtainable from a single wafer is more than about 10 times the conventionally possible number. Through simple calculation, therefore, head chips become available at about 1/10 of the conventional price.

It is preferable that the head chip 1 be 1.0 mm deep (long), 0.5 mm wide and 0.2 mm or below in thickness.

It is preferable that the flexible support body 2 be 0.5 mm or below in width, 0.1 mm or below in thickness and 11.0 mm or below in length.

(c) Description of Second Embodiment

Figure 17A:
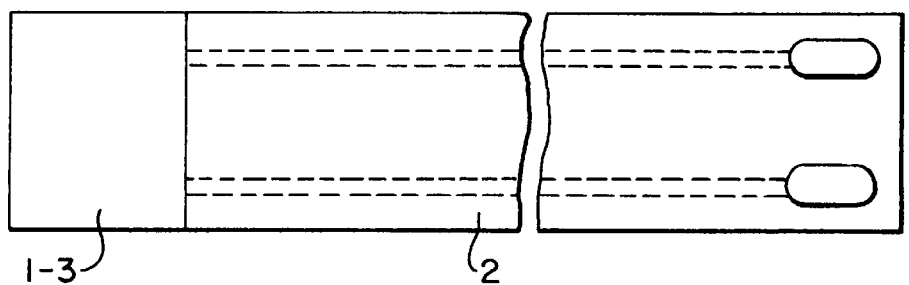
FIGS. 17(A–B) show another example of the magnetic head assembly in FIG. 15.
Figure 17B:
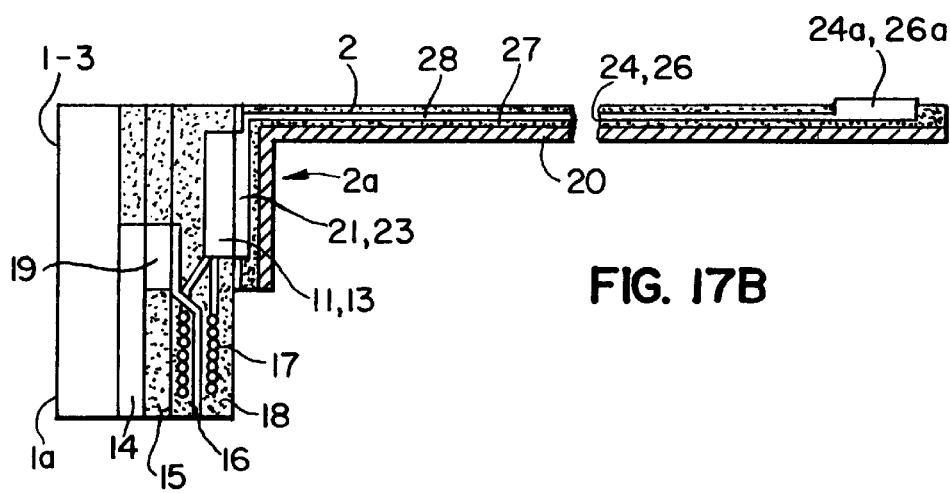
Figure 18A:
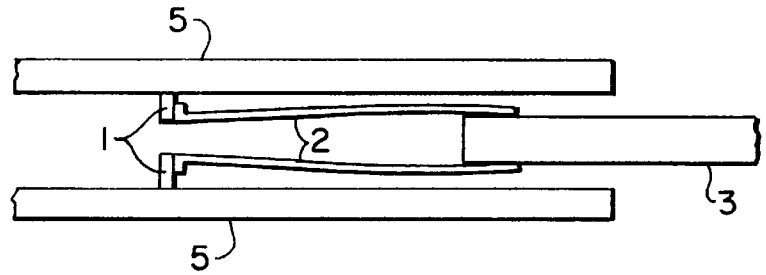
FIG. 18(A–B) are diagrams showing the mounting of the magnetic head assemblies shown in FIGS. 15 and 17(A–B)
Figure 18B:
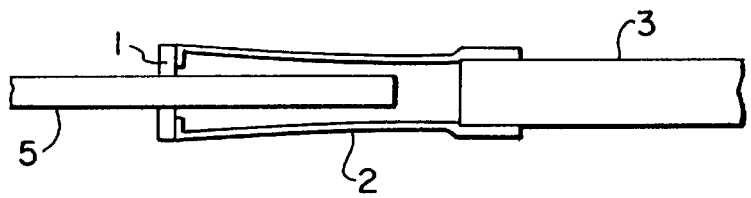

FIG. 15 presents a structural diagram of a magnetic head assembly according to a second embodiment of the present invention, FIGS. 16(A–B) are cross sections of the magnetic head assembly in FIG. 15, FIGS. 17(A–B) are structural diagrams of another magnetic head assembly according to the second embodiment of the present invention, and FIGS. 18(A–B) are explanatory diagrams showing the mounting of the magnetic head assemblies.

FIGS. 15 through 18 show examples of a unipolar head for perpendicular magnetic recording, which have simplified structures.

As shown in FIG. 15, terminals 11, 12 and 13 are exposed at the back of a head chip 1-2, while signal-leading lead patterns 24, 25 and 26 also serving as lead wires are formed on the flexible support body 2.

This flexible support body 2 with the lead patterns can easily be formed by coating an insulating resist on a stainless sheet to form the conductive patterns as described above. But the metal sheet should not necessarily be used, and a thin plate of insulating plastic, ceramic or the like may also be used instead.

In this embodiment, the tip portion of the flexible support body 2 is bent 90 degrees, and lead terminals 21, 22 and 23 corresponding to the aforementioned terminals 11, 12 and 13 are provided at the back of the bent portion 2*a*. Those terminals are respectively connected to the signal lead patterns 24, 25 and 26. Although the illustrated support body 2 is formed into an elongated flat plate having the same width and same thickness, its arm (3) side portion may be formed wider to improve the rigidity in the head seek direction as in the first embodiment.

The head chip 1-2, the flexible support body 2 and the arm 3, which supports them, are coupled by using the pads and lead terminals formed on the individual parts, also providing electrical connection. For instance, in connecting the head chip 1-2 to the flexible support body 2, it is effective to form films of solder on the terminals 11, 12 and 13 and the lead terminals 21, 22 and 23 by vapor deposition, plating or paste coating, forming solder bumps, and connect them by heating after positioning.

To secure the bonding strength, an adhesive may be applied around the soldering portions for reinforcement, and the connection between the flexible support body 2 and the arm 3 may be made in a similar manner.

By bending the tip portion of the flexible support body 2 at the right angle, connection to the head chip 1-2 and connection to the arm 3 can be made using the same pattern surface of the flexible support body 2. Further, as the tip portion of the flexible support body 2 is bent at the right angle, a large area can be secured for connection to the head chip 1-2, thus increasing the bonding strength between the head chip 1-2 and the flexible support body 2.

The lead wires 30 are connected to the end portions of the lead patterns of the flexible support body on the side of the arm 3. Instead of connecting the lead wires 30, a conductive pattern may be provided on the arm 3 to be connected to the end portions of the lead patterns of the flexible support body 2.

Now the structure of the head chip 1-2 will be described referring to FIGS. 16(A–B). In FIGS. 16(A–B), "11" to "13" are terminals, "14" is a return yoke made of NiFe (ferrite), "15" is an insulating layer, "16" is a main magnetic pole, "17" is a coil, "18" is an insulating protective layer, and "19" is a back yoke portion. Those are formed by thin-film forming technology, and the direction of the thin-film lamination is horizontal to the surface of the magnetic disk 5 as shown by the arrow in the diagram.

More specifically, in fabricating the head chip 1, the return yoke 14, insulating layer 15, main magnetic pole 16, coil 17, insulating protective layer 18, back yoke portion 19, etc. are sequentially formed into thin films on a substrate (wafer), not shown, thus providing a head element portion, as will be described referring to FIGS. 19(A–H).

The direction of the thin-film lamination is set horizontal to the surface of the magnetic disk to easily form the main magnetic pole 16 as shown in FIGS. 19(A–H).

For the head chip 1 in which the direction of the thin-film lamination is vertical to the surface of the magnetic disk as shown in FIGS. 11(A–B) (the arrow direction in FIGS. 11(A–B)), the main magnetic pole 16 should be formed perpendicular to the magnetic disk 5, so that after the other portion than the main magnetic pole 16 is formed into a thin film, a chip should be cut out and the main magnetic pole 16 should separately be formed into a thin film.

If the direction of the thin-film lamination is made parallel to the surface of the magnetic disk, on the other hand, the main magnetic pole 16 can also be formed by the thin-film formation in that thin-film laminating direction. This can reduce the steps of fabricating the head chip 1-2 and can improve the yield to provide head chips at a lower cost.

The coil of the thin-film head, if spiral, needs a relatively large coil area. But, the coil in this embodiment is of a helical type tightly wound around the magnetic pole, so that the thin-film forming area can be made smaller.

As illustrated, the thus formed head chip is cut out into the shape of the home plate of baseball from the substrate to be the head chip 1-2, so that the head chip is positioned vertical to the surface of the magnetic disk 5 to contribute to perpendicular recording and reproduction.

In this embodiment, as shown in FIG. 16(B), the terminal 12 is formed from the back yoke portion 19 of the magnetic pole 16 formed on the head chip 1-2 and is ground via the flexible support body 2, thereby preventing noise or damage originating from the electrification of the magnetic pole.

The size of this head chip 1-2 is merely limited by the size of the terminals 11, 12 and 13 necessary for connection to the flexible support body 2, and the size of below several hundreds of microns can easily be achieved. With regard to the thickness, as the wafer portion is removed by polishing or the like to leave only the thin-film forming portion, the chip can be made as thin as several tens of microns and is thus suitable for miniaturization and weight reduction.

When the head chip 1-2 has a head structure such that it is connected to, and supported, by the flexible support body 2 having its tip bent at the right angle, it is easy to mount two magnetic head assemblies on a single arm 3 between the magnetic disks 5 as shown in FIG. 18(A), or mount two magnetic head assemblies on a single arm 3 so as to sandwich the magnetic disk 5 as shown in FIG. 18 (B), while the head chip 1-2 is urged on the surface of the magnetic disk 5 by displacing the flexible support body 2 utilizing the height of the head chip 1-2.

According to this embodiment, as described above, the thin-film integrated head having the entire head chip 1-2 formed into a thin film, has been illustrated. But, a part 1*a* of the substrate (wafer) may be left for the purpose of reinforcement as shown in FIG. 17(B), or a ferrite substrate may be used in place of NiFe to also serve as the return yoke 14. In this case, the thickness would increase slightly.

That is, although after the return yoke 14, insulating layer 15, main magnetic pole 16, coil 17, insulating protective layer 18, back yoke portion 19, etc. are sequentially formed into thin films on the substrate (wafer) in the embodiment, the substrate 1*a* is removed in FIGS. 15 and 16(A–B). However, in the embodiment shown in FIG. 17(B), the substrate 1*a* is left unremoved and is used as a contact member, like the contact pad 1-1 in FIGS. 11(A–B). The contact pad is utilized at the time contact is made with the magnetic disk 5, thereby preventing wear of the main magnetic pole 16.

In this example, the flexible support body 2 is realized by a support body (FIG. 12) which has the insulating layer 27 provided on the metal plate 20, and has the lead patterns 24 and 26 formed on the layer, with the protective layer 28 covering the lead patterns.

In this embodiment, the head chip 1 can also have a size of about 0.5 mm long, 0.5 mm wide and 0.1 mm thick, its mass is 0.1 mg, and the area of the element portion has only to be about 0.25 mm$^2$. Thus, the mass can be reduced and many elements can be fabricated on a wafer.

Perpendicular magnetic recording in a contact fashion was performed using such a magnetic head assembly. With the mass of the head chip 1-2 being 1.0 mg and the load of the head chip 1-2 being 0.5 mN, high-density recording was accomplished with the track density of 17,000 TPI, the maximum recording density of 120,000 BPI and the maximum surface recording density of 2 gigabits per square inch.

Even with the head floating amount of 0.07 micron, the maximum surface recording density of 1 gigabits per square inch was obtained.

It is preferable that the head chip 1 be 1.0 mm deep (long), 0.5 mm wide and 0.2 mm or below in thickness.

It is preferable that the flexible support body 2 be 0.5 mm or below in width, 0.1 mm or below in thickness and 11.0 mm or below in length.

A method of manufacturing this head chip will now be described.

FIGS. 19(A–H) illustrate a process of manufacturing head chip in FIGS. 16(A–B) or 17(A–B).

Figure 19A:
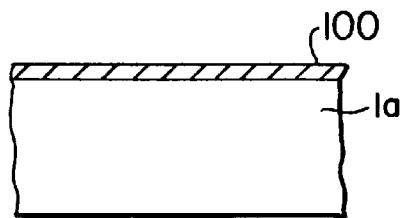
FIG. 19 (A–H) illustrate a process of forming head chips in FIGS. 15 and 17(A–B)

As shown in FIG. 19(A), an insulating protective layer 100 for protecting a head chip assembly on the substrate (wafer) 1a of $Al_2O_3$—TiC or the like. As this protective layer 100, a film of $Al_2O_3$ or the like is formed several microns to several tens of microns thick on the front surface of the substrate 1a by sputtering or vapor deposition.

Figure 19F:
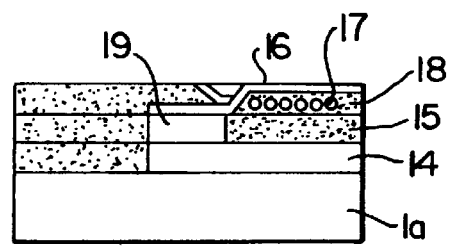
Figure 19B:
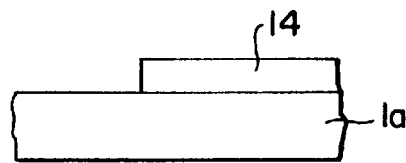

Then, as shown in FIG. 19(B), the return yoke 14 of NiFe or the like is formed several microns to 30 microns thick on the substrate 1a by sputtering or vapor deposition, and is shaped into the desired yoke shape by photolithography technology. At this time, a heat treatment in a magnetic field is added, as needed, to improve the magnetic characteristic of the soft magnetic film.

Figure 19G:
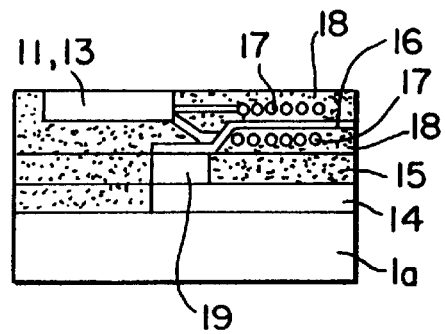
Figure 19C:
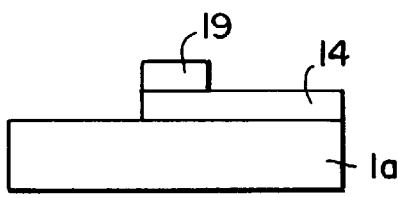

Then, as shown in FIG. 19(C), the back yoke 19 of NiFe or the like is formed several microns thick by frame plating technology. The frame plating technology is to form an electrode layer as thin as about 0.1 micron by vapor deposition or the like to form the plating base, and perform electroplating with a photoresist covering that portion where no film is to be formed. The film forming may be performed by a combination of sputtering and vapor deposition as well as the electroplating.

In this case too, a heat treatment in a magnetic field is added, as needed, to improve the magnetic characteristic of the soft magnetic film.

Figure 19D:
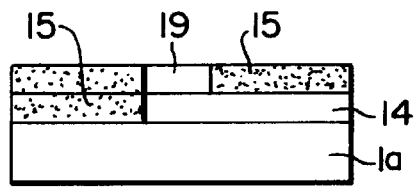

Next, as shown in FIG. 19(D), the insulating layer 15 is formed to ensure the insulation between the return yoke 14 and the coil 17. The insulating layer 15 is formed by forming a film of $Al_2O_3$ or the like with a thickness of about several microns to several tens of microns by sputtering or vapor deposition, and then polishing the top surface to be flat, exposing the back yoke 19.

Figure 19H:
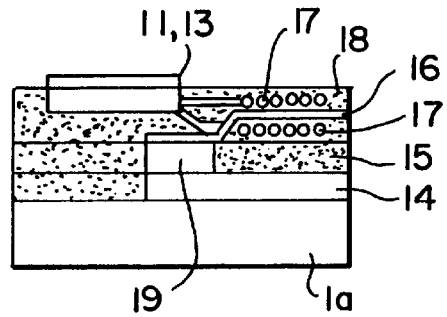
Figure 19E:
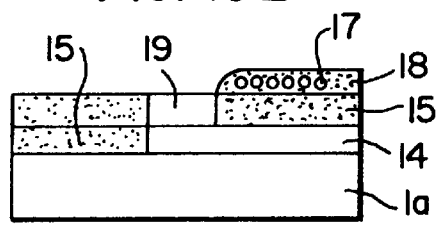

Then, as shown in FIG. 19(E), the coil 17 and the insulating layer 18 are formed on the insulating layer 15.

More specifically, an insulating layer consisting of a photoresist is spin-coated, is developed, and is subjected to annealing, etc. to have the desired shape. A conductive layer of Cu is formed on the insulating layer by vacuum vapor deposition or sputtering and is formed into the desired coil shape using photolithography technology. Further, a photoresist, which will be an insulating layer, is formed on the coil in the same manner as described above, thus completing the first layers of the coil 17 and insulating layer 18.

Then, as shown in FIG. 19(F), the main magnetic pole 16 is formed.

More specifically, a soft magnetic film of a NiFe or CoZr base is formed by sputtering or vapor deposition, and the desired magnetic pole pattern is obtained using photolithography technology. Although the magnetic pole is illustrated to have a uniform thickness in the diagram, it has two layers and only the tip portion which contributes to the recording density, is made thinner to have the necessary submicron thickness. Further, a heat treatment in a magnetic field is added, as needed, to improve the magnetic characteristic of the soft magnetic film.

Then, as shown in FIG. 19(G), the second layers of the coil 17 and insulating layer 18 are formed in the same manner as used to form the first layers of the coil and insulating layer as shown in FIG. 19(E).

Then, as shown in FIG. 19(G), protrusions, which will be the connector terminals 11 and 13 from the coil 17 are formed of Cu by frame plating technology.

Then, an insulating layer of $Al_2O_3$ or the like is formed about several microns to several tens of microns thick by sputtering by the method as described with reference to FIG. 19(D), forming a protective film, and the surface is polished to be flat until the connector terminals 11 and 13 are exposed.

Then, when connection to the lead terminals 21 and 23 is made by gold (Au) bonding or the like, after the formation of the protective layer, a film of gold (Au) is formed by vapor deposition or sputtering and is formed into the desired shape using photolithography technology, as shown in FIG. 19(H).

The wafer process is completed in this manner, and thereafter the head chip is separated by machine working.

As the entire elements including the main magnetic pole 16 can be formed in the same direction of the thinfilm lamination, it is possible to significantly reduce the steps to fabricate the head chip, as compared with the conventional head-chip fabricating method.

Since this head chip 1-2 is very small, the workability becomes significantly low if the head chips are to be mounted individually to the support bodies 2. Thus, a head assembly having the head chip 1-2 attached to the support body 2 is to be assembled in the following manner.

Figure 20:
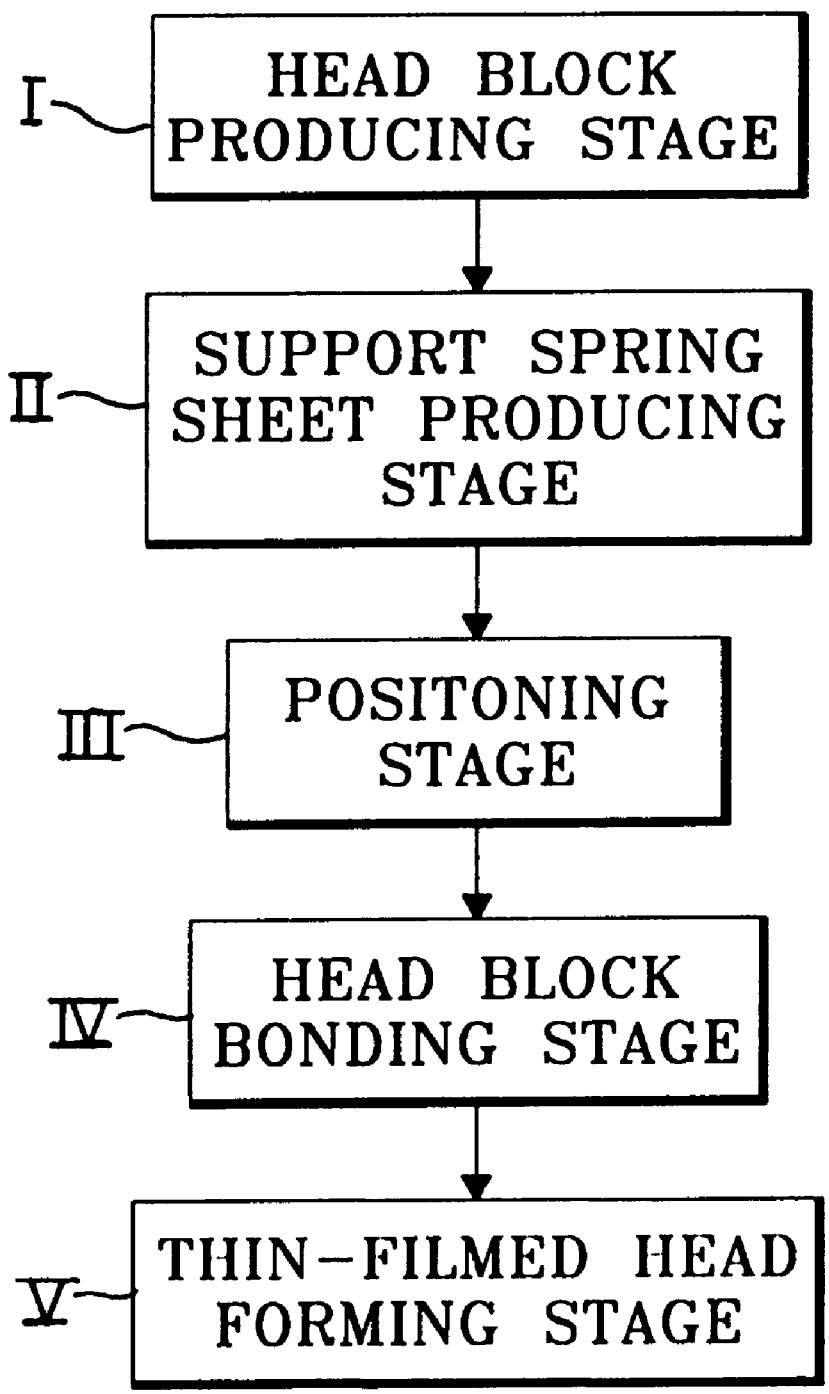
FIG. 20 illustrates a process of manufacturing the magnetic head assemblies in FIGS. 15 and 17(A–B)

FIG. 20 illustrates a process of manufacturing the magnetic head assemblies in FIGS. 15 and 17(A–B), FIGS. 21(a–d) illustrate a head-chip block forming process in FIG. 20, FIGS. 22(a–b) illustrate a support-body sheet forming process in FIG. 20, and FIGS. 23(a–b) illustrate a magnetic-head assembly assembling process in FIG. 20.

(1) As shown in FIG. 21(a), many head chips 1-2 having the structure as shown in FIG. 21(c) and FIG. 21(d) are formed on a substrate (wafer) 9-1 by the thin-film process that has been explained with reference to FIGS. 19(A–H). As the structure of the head chip 1-2 is the same as the one explained referring to FIGS. 16(A–B) and 17(A–B), its description will be omitted.

In a head block producing step I in FIG. 20, a block 9-2 of head chips 1-2 arranged widthwise in a row is cut out from the wafer 9-1, as shown in FIG. 21(a). Then, this block 9-2 is subjected to machine working so that the main magnetic pole of each head chip 1-2 has a tapered tip 15 as shown in FIG. 21(c). Further, the substrate 9-1 is made thinner as needed, yielding the head block 9-2 that has a plurality of head chips 1-2 arranged sideways in a row, as shown in FIG. 21(b).

(2) Next, a support spring (support body) sheet is produced as shown in FIG. 20 STEP II. A plate-like member 199 made from a stainless plate as shown in FIG. 22(a), is subjected to pressing or the like so as to form a support spring sheet 200 which has support springs 2 formed in a comb shape with respect to a link bar 201, as shown in FIG. 22(b). In this embodiment, the tip of each support spring 2 is bent 90 degrees as shown in FIGS. 16(A–B) and 17(A–B).

On the top of the support spring 2 and the polyamide insulating layer 27 are provided the lead patterns 24 and 26, which are obtained by sequentially forming the lead patterns 24 and 26, the lead terminals 21 and 23 of Cu+SnPb, the polyamide protective layer 28, etc., as shown in FIG. 12.

The pitches of the plate-like support springs 2 for supporting the head chips 1-2 are the same as the pitches of the head chips 1-2 arranged in the head block 9-2 in FIG. 21, and the connector terminals 21 and 23 of the support spring 2 are so provided as to overlap the 10 terminals 11 and 13 of the head chip 1-2.

Although two lead patterns 24 and 26 are illustrated in FIG. 22, three lead patterns are provided as shown in FIG. 15 for the head chip 1-2 in FIG. 21(c).

(3) Next, as shown in FIG. 20 STEP III, the positioning of the head block 9-2 and the support spring sheet 200 is performed. As shown in FIGS. 23(a–b), each head chip 1-2 of the head block 9-2 is positioned with respect to the associated support spring 2 of the support spring sheet 200 in such a way that the connector terminals 21 and 23 of that support spring 2 are placed on the connector terminals 11 and 13 of the head chip 1-2.

(4) Then, as shown in FIG. 20 STEP IV, the head block 9-2 is connected to the support spring sheet 200. As shown in FIG. 23, the positioned lead terminals 21 and 23 of the support spring 2 and the connector terminals 11 and 13 of the head chip 1-2 are heated to be soldered together, and are adhered by a resin adhesive for reinforcement, thereby providing electrical and mechanical connection.

Figure 23A:
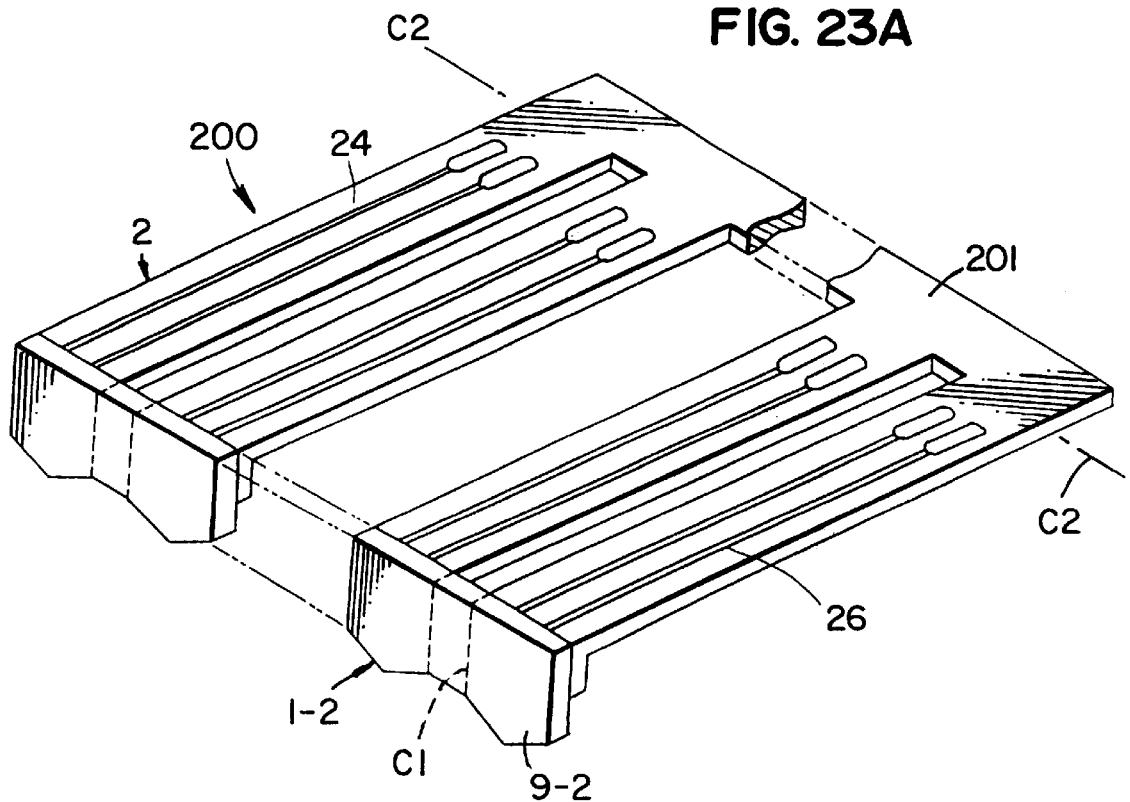
FIGS. 23(a–b) illustrate a magnetic-head assembly assembling process in FIG. 20.
Figure 23B:
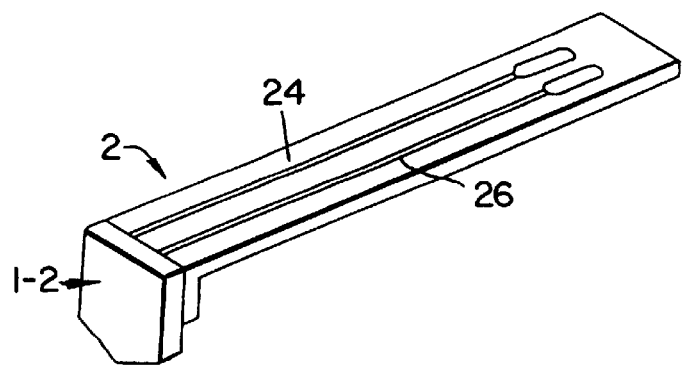

(5) Further, as shown in FIG. 20 STEP V, each magnetic head assembly is formed from the connected body of the head block 9-2 and support spring sheet 200. As shown in FIG. 23(a), each head chip 1-2 is separated by cutting the head block 9-2 of the connected body at the position of the broken line C1 by means of a cutting machine such as a slicer. The base portion of each support spring 2 of the connected body is cut at the position of the broken line C2 by laser irradiation, thus separating each support spring 2 from the link bar 201. Accordingly, a magnetic head assembly is assembled as shown in FIG. 23(b).

As the individual head chips 1-2 of the head block 9-2 are coupled, unseparated, to the individual support springs 2 of the support spring sheet 200, as large components, and are separated therefrom after the connection, even with the very small head chips, it is considerably easy to assemble the magnetic head assemblies and the number of assembly defects decreases.

(d) Description of Third Embodiment

FIGS. 24(A–B) are structural diagrams of a third embodiment of the present invention. In the diagram, those shown in FIGS. 16(A–B) are given the same numerals. In this embodiment, the flexible support body 2 and head chip 1-2 are connected in such a way as to cover the top of the head chip 1-2 (the opposite surface to the magnetic disk 5). As this flexible support body 2 is formed of a soft magnetic material such as NiFe, the magnetic shield effect can be exhibited, reducing the influence of leak noise from the opposing head (not shown) and ensuring a narrower gap between heads.

In particular, if the tip portion of the flexible support body 2 is bent at the right angle and is so connected as to enclose the head chip 1, the shield effect can be further improved.

In this example, as in the second embodiment, mounting is easily performed by urging the head chip 1 on the surface of the magnetic disk 5 by displacing the flexible support body 2 utilizing the height of the head chip 1.

(e) Description of Fourth Embodiment

FIGS. 25(A–B) are structural diagrams of a fourth embodiment of the present invention. In FIGS. 25(A–B), those shown in FIGS. 16(A–B) and 24(A–B) are given the same numerals.

In the embodiment of FIG. 25(A), the terminals 11-13 of the head chip 1 are connected to the lead terminals 21-23 of the flexible support body 2 by solder melts S.

This embodiment differs from the above-described second and third embodiments in that the tip of the flexible support body 2 is not bent but is flat. As the terminals 11, 12 and 13 of the head chip 1 are exposed at the end on the opposite side to the magnetic disk 5 in this embodiment, it is possible to connect the flexible support body 2 without bending it, further facilitating the fabrication of the support spring 2.

In this case, however, the surface of connection to the support body 2 differs by 90 degrees, thus complicating the soldering.

In the example of FIG. 25(B), the terminals 11–13 and the lead terminals 21–23 in the structure of FIG. 25(A) are connected by another method, such as wire bonding that uses pressure bonding of a gold (Au) ball W. This ensures the connection even if the connecting surfaces of the head chip 1-2 and the support body 2 differ by 90 degrees as shown in FIG. 25(A).

In these embodiments, as in the third embodiment, the flexible support body 2 and head chip 1 are connected in such a way as to cover the top of the head chip 1 (the opposite surface to the magnetic disk 5). Therefore, the flexible support body 2 can be formed of a soft magnetic material such as NiFe to show the magnetic shield effect.

Even when the tip of the support spring 2 is not bent, the magnetic head assembly can be assembled by the method which has been described with reference to FIG. 20 and the subsequent diagrams, and the assembling will be described referring to FIGS. 26(a–b).

Figure 26A:
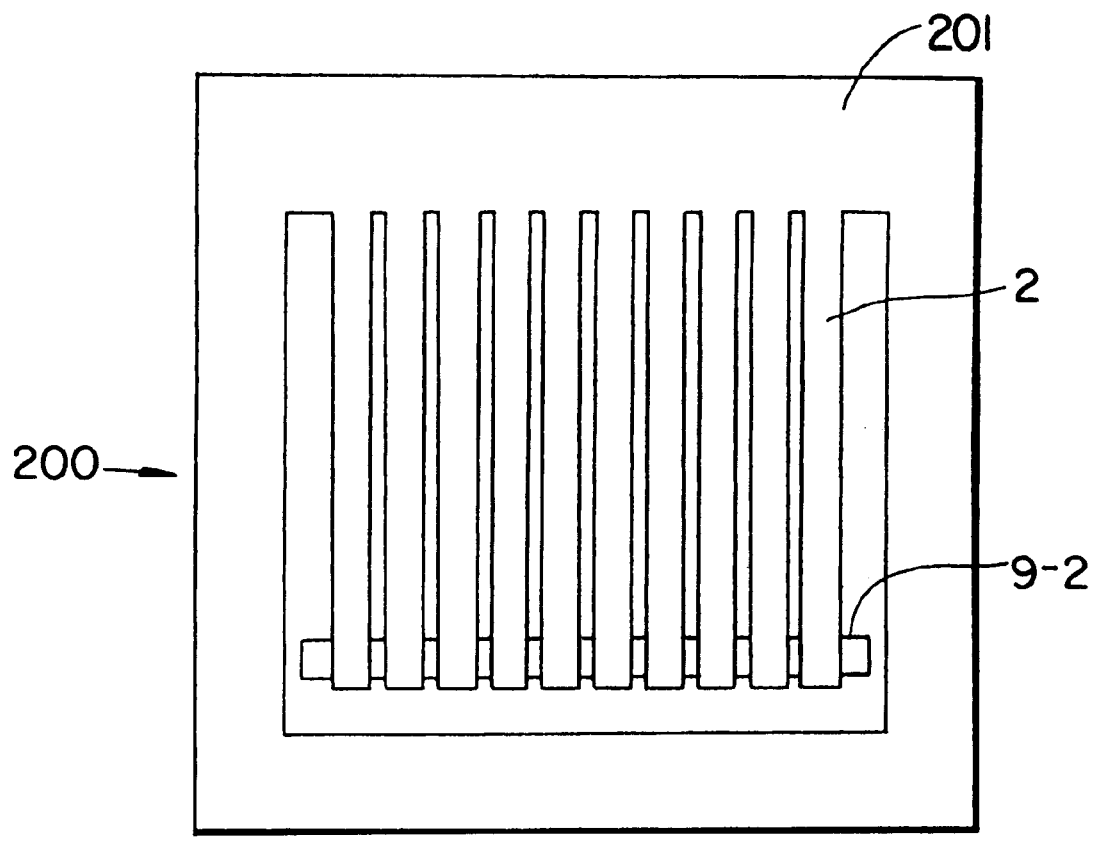
FIGS. 26(a–b) illustrate a process of manufacturing the magnetic head assembly in FIGS. 25(A–B)

As shown in FIG. 26(a), the support spring sheet 200 having the support springs 2 with unbent tips linked by the link bar 201, is formed. Then, the aforementioned head block 9-2 is positioned with respect to the tips of the support springs 2 of the support spring sheet 200, and as shown in FIG. 25(A), the terminals 11–13 of the head chip 1-2 are connected to the lead terminals 21–23 of the support springs 2 by solder melts S.

The magnetic head assembly can be likewise assembled by separating the head chip 1-2 from the head block 9-2 and separating the support spring 2 from the link bar 201.

At this time, since the connecting surfaces of the head chip 1-2 and the support spring 2 differ by 90 degrees as shown in FIG. 25(A) and soldering takes time, it is desirable to employ such a method as wire bonding that uses pressure bonding of a gold ball W, as shown in FIG. 25(B).

To improve the support spring characteristic of a magnetic head assembly, it is effective to make the neck of the support spring 2 wider to provide rigidity balance in the up-and-down direction and the seek direction. With regard to the rigidity of the support spring, it is known that a trapezoidal cantilever having a wider neck is stronger than a simple cantilever, and has a superior mechanical characteristic.

If the neck portion of each support spring 2 of the support spring sheet 200 shown in FIGS. 22(a–b) is made wider, the pitches of arrangement of the support springs 2 decreases, thus reducing the number of the support springs 2 arrangeable on a single support spring sheet 200.

Accordingly, the pitches of the tip portions of the support springs 2 become wider than those of the head chips 1-2 of the head block 9-2, hindering the provision of finer pitches of the head chips 1-2. This reduces the implementation density of the head chips 1-2, and thus stands in the way of cost reduction.

A connecting method to improve the characteristic of the support springs 2 while preventing the reduction in the implementation density of the head chips 1-2 will be described referring to FIGS. 27(a–b) and 28(a–b).

Figures 27A, 27B:
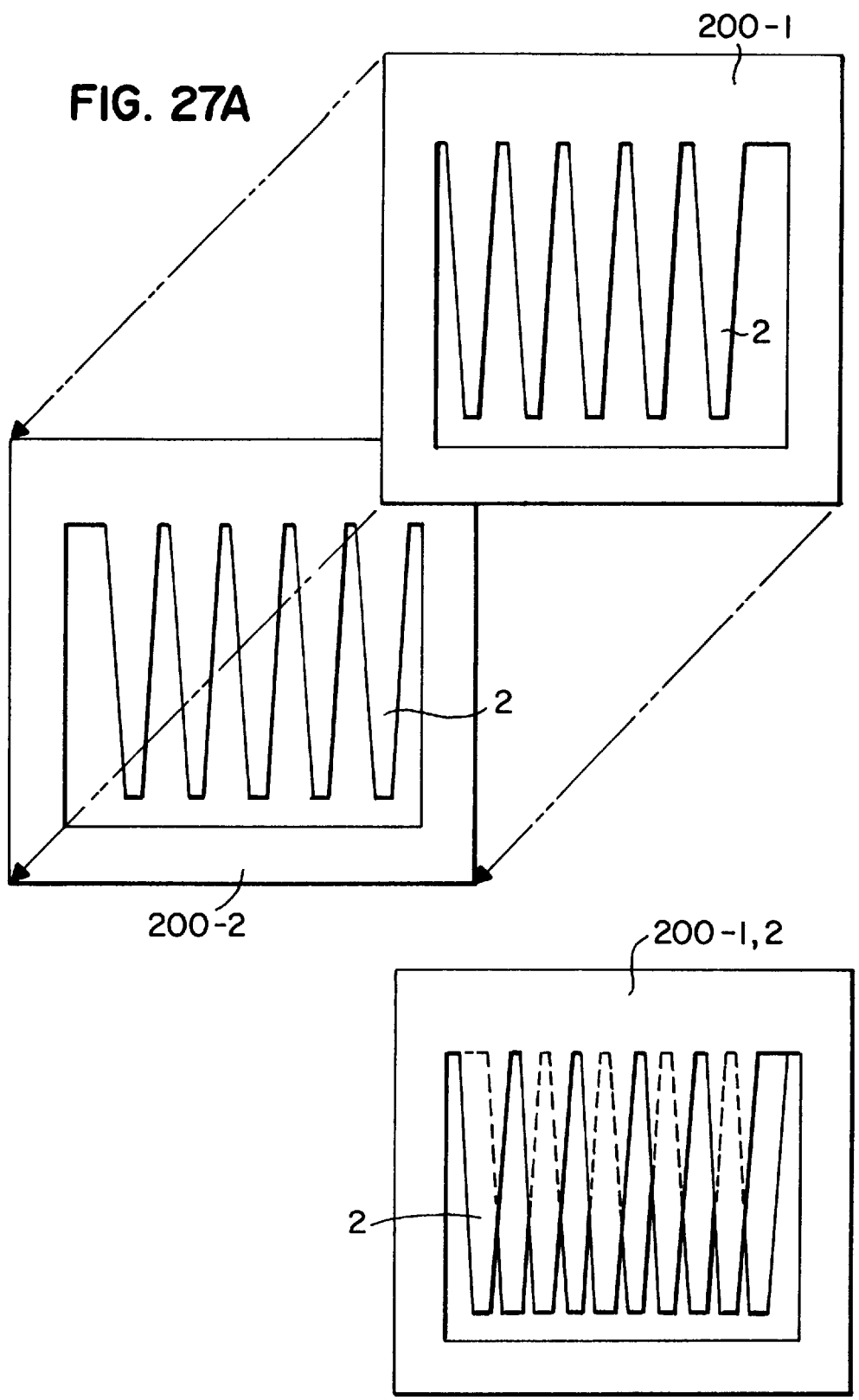
FIGS. 27(a–b) illustrate the structure of another support body sheet that is used in the magnetic head assembly in FIGS. 25(A–B)

As shown in FIG. 27(a), two types of support spring sheets 200-1 and 200-2 are prepared. The support spring sheets 200-1 and 200-2 are designed so that the neck portion of each support spring 2 is made wider and the pitch between the tip portions of the support springs 2 is twice the pitch of the head chips 1-2 arranged in the head block 9-2.

The two types of support spring sheets 200-1 and 200-2 differ in that with their lead patterns facing the same direction, the pitch between the individual support springs 2 of the support spring sheet 200-1 is shifted by a half pitch from that of the support spring sheet 200-2. When the two types of support spring sheets 200-1 and 200-2 are placed one on the other as shown in FIG. 27(b), the pitch between the tip portions of the support springs 2 of the overlapped support spring sheets 200-1 and 200-2 becomes equal to the pitch between the head chips 1-2 arranged in the head block 9-2.

Figure 26B:
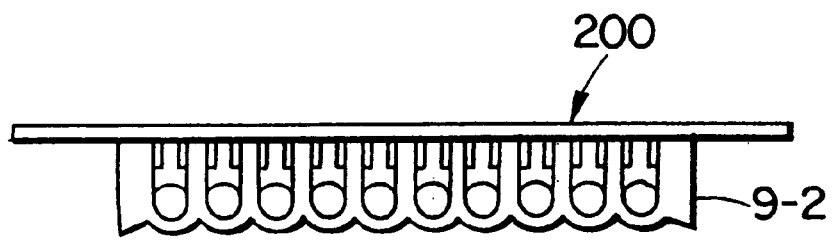

Since the pitch between the tip portions of the support springs 2 of the overlapped support spring sheets 200-1 and 200-2 becomes equal to the pitch between the head chips 1-2 arranged in the head block 9-2, as in FIGS. 26(a–b) the head block 9-2 has only to be connected to the bottoms of the tip portions of the individual support springs as shown in FIGS. 28(a–b).

Similarly, with the head block portion of the connected body being temporarily stopped on a work table, the head chips 1-2 are separated from the head block 9-2 by a slicer or laser irradiation, the two support spring sheets are separated from each other, and then the support springs 2 are separated from the link bars 201, so that magnetic head assemblies can be assembled.

In the embodiment shown in FIGS. 27(a–b) and 28(a–b), two types of support spring sheets 200-1 and 200-2 are prepared in such a way that with their lead patterns facing the same direction, the pitch between the individual support springs 2 of the support spring sheet 200-1 is shifted by a half pitch from that of the support spring sheet 200-2. But, the same can be accomplished by preparing two support spring sheets 200-1 of the same type and shifting one support spring sheet when both sheets are placed one on the other so that the tip portions of the support springs 2 are shifted by a half pitch.

(f) Description of Fifth Embodiment

FIG. 29 is a structural diagram of a fifth embodiment of the present invention.

In this diagram, which merely shows the front cross section of a head chip 1-3, two main magnetic poles 16 are formed closer to both sides to provide two projections on the head chip 1, so that the torsional recovery force of the magnetic head assembly in the rolling direction is increased.

In this case, two main magnetic poles 16 should not necessarily be implemented, and one of them may be a dummy.

(g) Description of Sixth Embodiment

Figure 30:
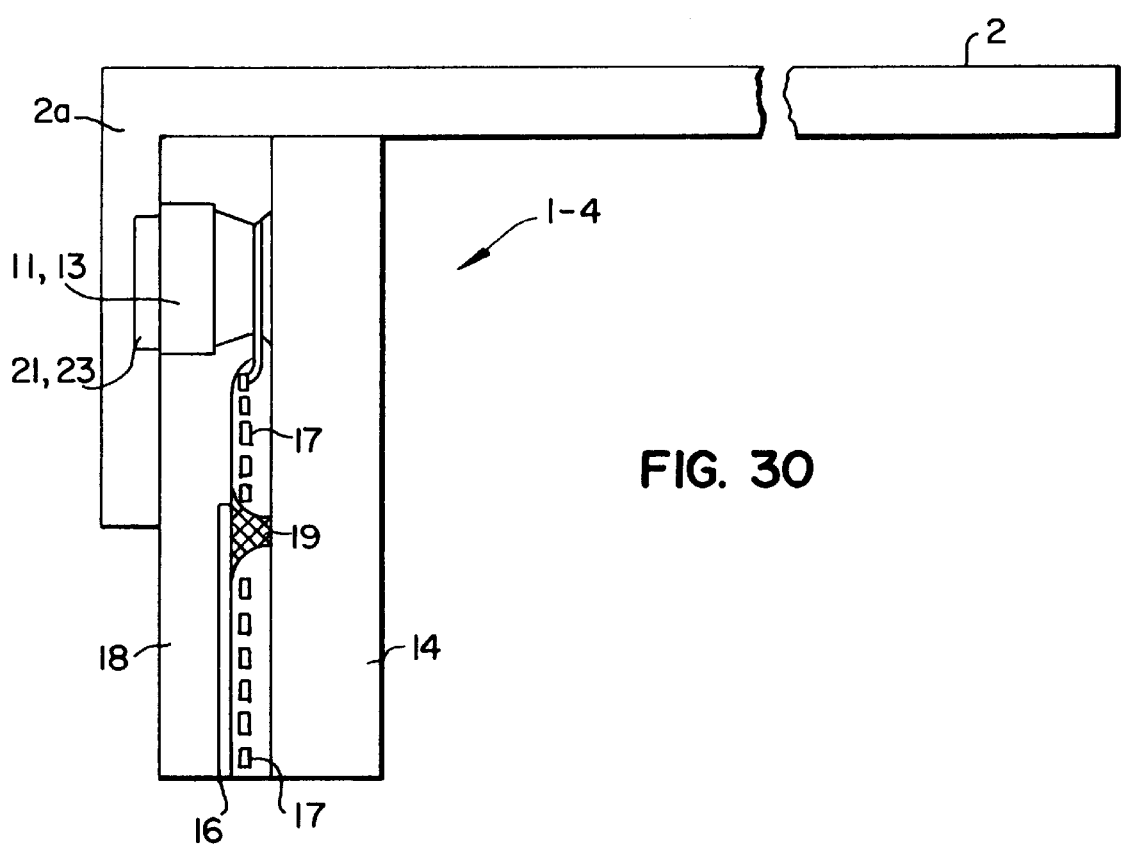
FIG. 30 is a cross section of a magnetic head assembly according to a sixth embodiment of the present invention.

FIG. 30 is a structural diagram of a sixth embodiment of the present invention. In the diagram, those shown in FIGS. 15, 16(A–B), 17(A–B) and 24(A–B) are given the same numerals.

The structure of FIG. 30 differs from that of FIGS. 24(A–B) in that in a head chip 1-4, a spiral coil 17 is formed around the back yoke 19 located above in the direction of the thin-film lamination of the substrate 1a and return yoke 14, and the main magnetic pole 16 is connected to this back yoke 19.

With this structure, since the coil 17 lies on the same surface, the number of the thin-film forming steps for the head chip 1-4 can be reduced. This will be described referring to FIGS. 31(A–F), which are explanatory diagrams showing the processes of forming the head chip in FIG. 30.

As shown in FIG. 31(A), a ferrite substrate (wafer) 1a which will serve as the return yoke 14 is used.

Then, as shown in FIG. 31(B), the coil 17 and an insulating layer 18-1 are formed on the substrate 1a.

More specifically, an insulating layer consisting of a photoresist is spin-coated, is developed, and is subjected to annealing, etc. to have the desired shape. A conductive layer of Cu is formed on the insulating layer by vacuum vapor deposition or sputtering and is formed into the desired spiral coil shape using photolithography technology. Further, a photoresist, which will be an insulating layer, is formed on the coil, thus completing the spiral coil 17 and the insulating layer 18. At this time, a part 17-1 of the coil 17 is exposed from an insulating layer 18-2.

Then, as shown in FIG. 31(C), the back yoke 19 (link portion) of NiFe or the like is formed several microns thick by frame plating technology. The frame plating technology is to form an electrode layer as thin as about 0.1 micron by vapor deposition or the like to form the plating base, and perform electroplating with a photoresist covering that portion where no film is to be formed. After the electroplating, the resist is removed, completing the process. The film forming may be performed by a combination of sputtering and vapor deposition as well as the electroplating.

Then, the protective layer 18-2 for the coil 17 is formed. The insulating layer 15 is formed by forming a film of $Al_2O_3$ or the like, about several microns to several tens of microns thick, by sputtering or vapor deposition, and then polishing the surface to be flat, thereby exposing the back yoke 19.

At the same time, protrusions 11a and 13a, which will be parts of the connector terminals 11 and 13 are formed on the part 17-1 of the coil by frame plating of Cu or the like.

Then, the main magnetic pole 16 which is to be connected to the back yoke 19 is formed on the protective layer 18-2 as shown in FIG. 31(D).

More specifically, a soft magnetic film of a NiFe or CoZr base is formed by sputtering or vapor deposition, and the desired magnetic pole pattern is obtained using photolithography technology. Although the magnetic pole is illustrated to have a uniform thickness in the diagram, it has two layers and only the tip portion which contributes to the recording density, is made thinner to have the necessary submicron thickness. Further, a heat treatment in a magnetic field is added, as needed, to improve the magnetic characteristic of the soft magnetic film.

At the same time, the connector terminals 11 and 13 are formed on the protrusion 11a and 13a by frame plating of Cu or the like.

Then, as shown in FIG. 31(E), an insulating layer of $Al_2O_3$ or the like is formed about several microns to several tens of microns thick by sputtering by the method as described with reference to FIG. 31(C), forming a protective film, and the surface is polished to be flat until the connector terminals 11 and 13 are exposed.

Then, when connection to the lead terminals 21 and 23 is made by gold (Au) bonding or the like, after the formation of the protective layer, bump portions 11b and 13b are formed by vapor deposition or sputtering of gold (Au), and are formed into the desired shapes using photolithography technology, as shown in FIG. 31(F).

The wafer process is completed in this manner, and thereafter the head chip is separated by machine working.

This process can significantly reduce the steps as compared with the process of FIGS. 19(A–H), thus contributing to cost reduction.

(g) Description of Other Embodiments of Support Body

Figure 32:
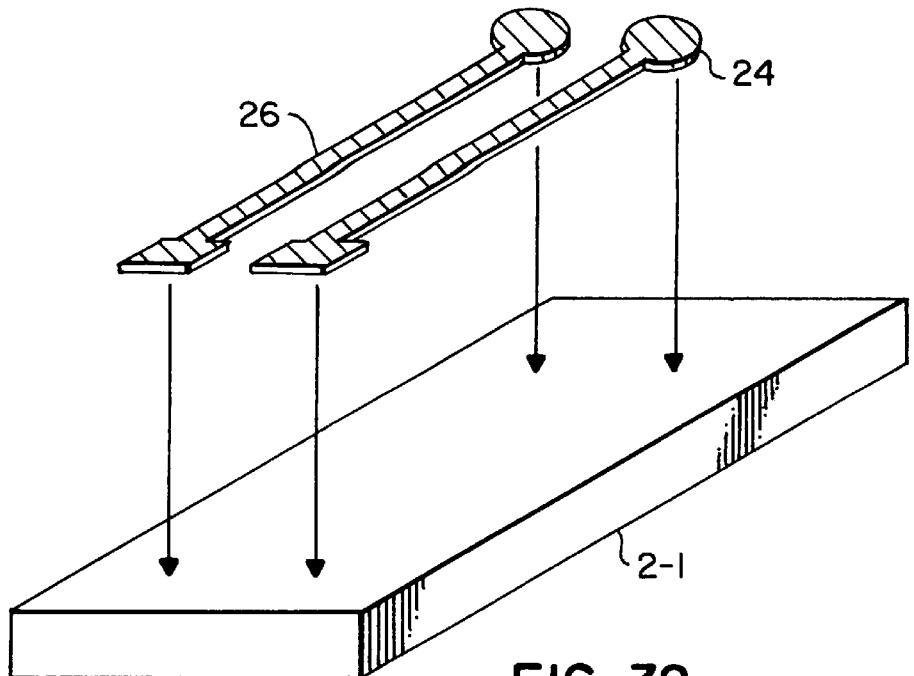
FIG. 32 illustrates the structure of another embodiment of the support body of the present invention.

FIG. 32 is a structural diagram of another embodiment of the support body according to the present invention, and shows a modification of the flexible support body.

In this embodiment, a flexible insulating plate 2-1 of an insulating resin or the like is provided with lead patterns 24 and 26.

The lead patterns 24 and 26 may be connected by an adhesive or pressure bonding, may have a plate shape or a wire shape, and may be coated conductors or uncoated conductors.

Figure 33:
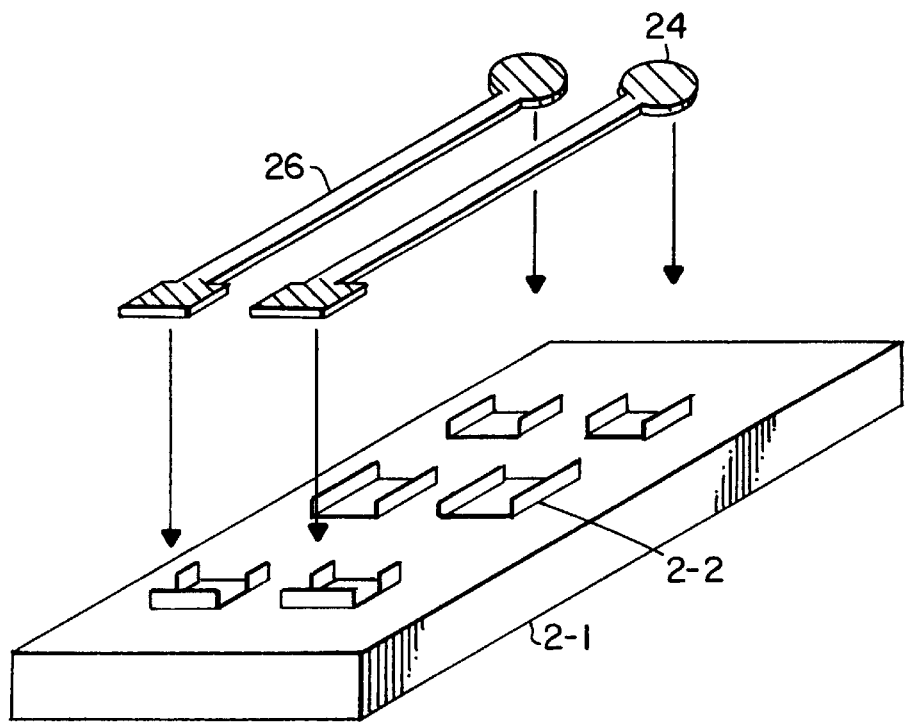
FIG. 33 illustrates the structure of a still another embodiment of the support body of the present invention.

FIG. 33 is a structural diagram of another embodiment of the support body according to the present invention, and shows a modification of the flexible support body.

In this embodiment, the flexible insulating plate 2-1 of an insulating resin or the like is provided with mechanical support portions 2-2 for the lead patterns 24 and 26, and after the lead patterns 24 and 26 are placed in the mechanical support portions 2-2 of the flexible insulating plate 2-1, the protrusions are caulked to secure them. Thereafter, a resin or the like may be coated for reinforcement, and the lead patterns 24 and 26 may have a plate shape or a wire shape, and may be coated conductors or uncoated conductors.

FIG. 34 is a structural diagram of still another embodiment of the support body according to the present invention, and shows a modification of the flexible support body.

In this embodiment, a conductive foil 29 of copper is formed in advance on the flexible insulating plate 2-1 of an insulating resin or the like by an adhesive, pressure bonding, plating or the like, and the conductive foil 29 is then etched to yield the conductors 24 and 26 with a predetermined shape.

Figure 35:
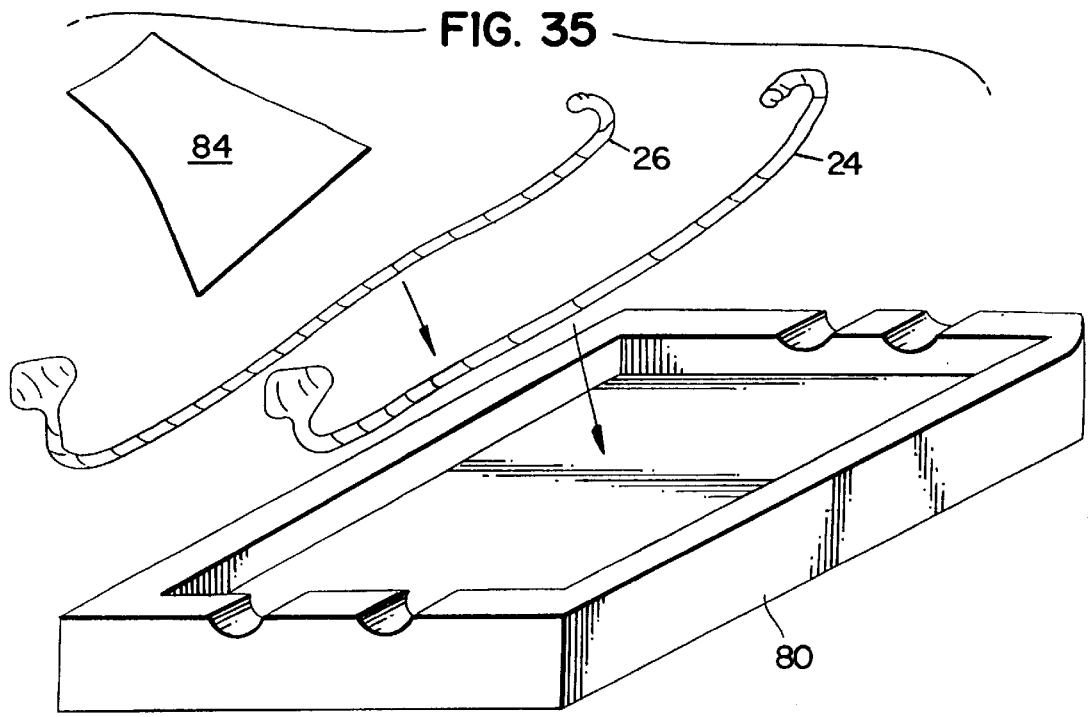
FIG. 35 illustrates the structure of a still further embodiment of the support body of the present invention.

FIG. 35 is a structural diagram of still another embodiment of the support body according to the present invention, and shows a modification of the flexible support body.

In this embodiment, a mold 80 for the flexible insulating plate 2-1 is prepared, the conductors 24 and 26 are set in the mold 80, and resin is injected into the mold 80 by an injection molding machine 84 to form the flexible insulating plate 2-1 of an insulating resin or the like, which is provided with the lead patterns 24 and 26.

Figure 36:
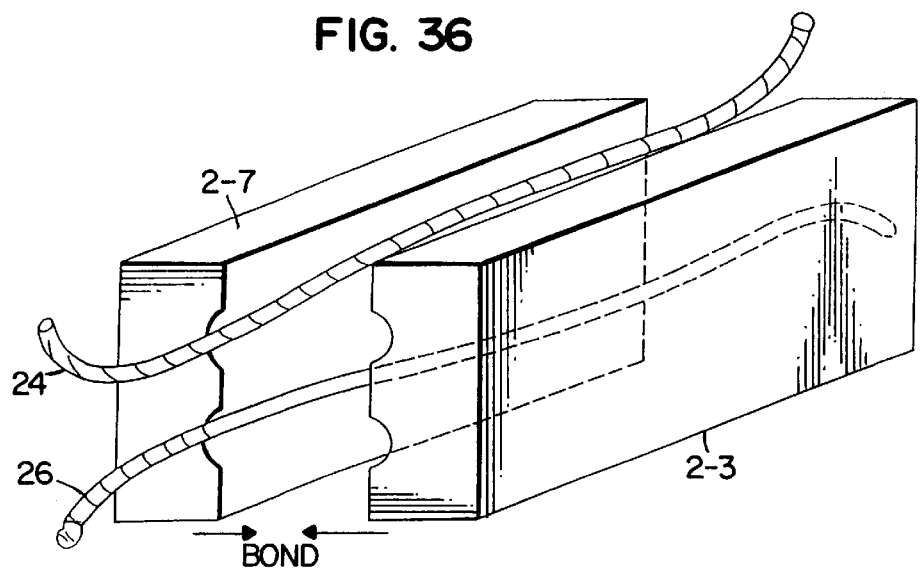
FIG. 36 illustrates the structure of a still further embodiment of the support body of the present invention.

FIG. 36 is a structural diagram of still another embodiment of the support body according to the present invention, and shows a modification of the flexible support body.

In this embodiment, two lead patterns 24 and 26 are sandwiched by two insulators 2-3 and 2-7 to yield the flexible insulating plate 2-1 of an insulating resin or the like, which is provided with the lead patterns 24 and 26. The insulators 2-3 and 2-7 may be connected together by an adhesive or mechanical friction.

In either case, the flexible insulating plate 2-1 may be backed with a conductive metal, or may have three or more conductors as in the second embodiment, etc.

Although the above-described embodiments have been explained with reference to a contact type magnetic head, they can also be adapted to a floating type magnetic head.

Although the description has been given with reference to a plurality of magnetic disks of a magnetic disk apparatus, a single-disk type may also be used.

(h) Description of Seventh Embodiment

Figure 37:
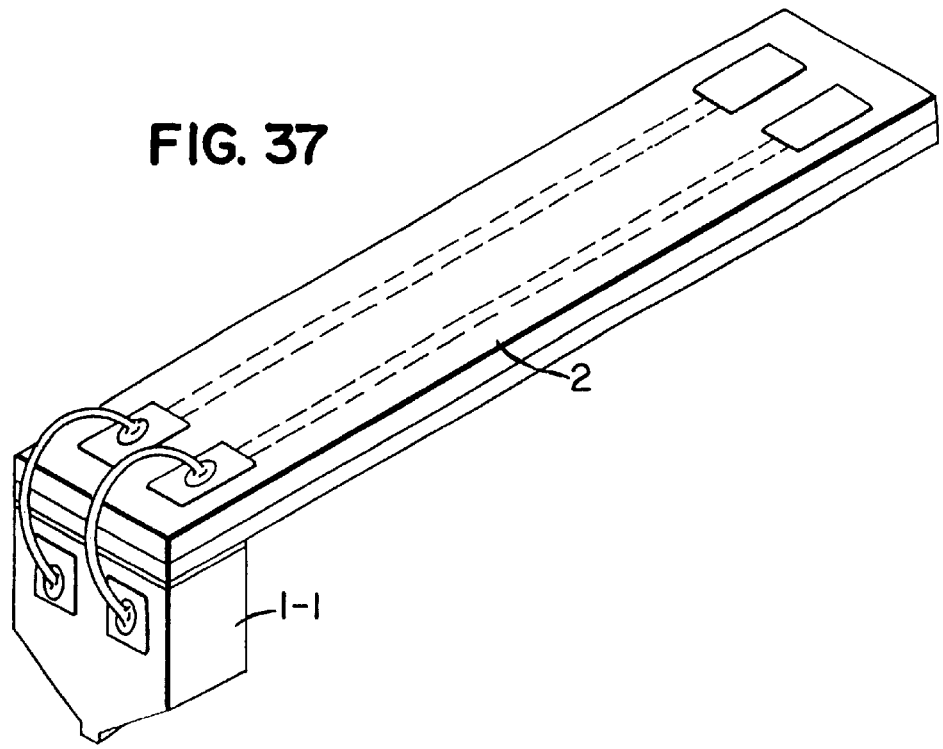
FIG. 37 is a perspective view of a magnetic head assembly according to a seventh embodiment of the present invention.
Figure 38:
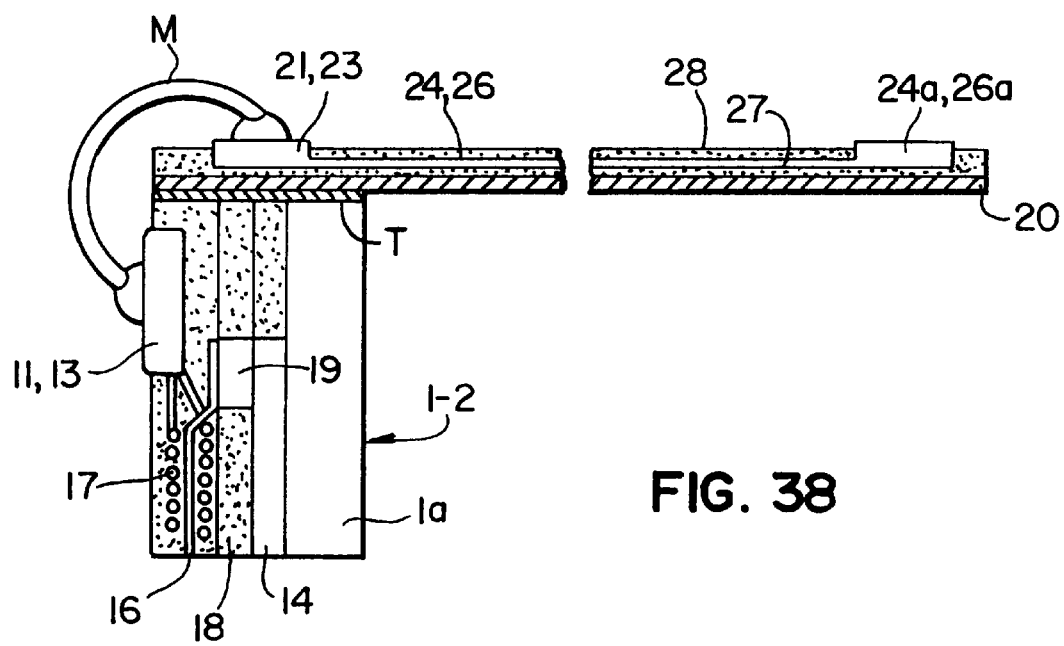
FIG. 38 is a cross section of the magnetic head assembly in FIG. 37.

FIG. 37 is a perspective view of a seventh embodiment of the present invention, and FIG. 38 is a cross section of the structure of FIG. 37, both showing another example of the connection between the head chip 1-2 and the support body 2.

The structure of the head chip 1-2 is the same as shown in FIGS. 16(A–B); "11" and "13" are terminals, "14" is a return yoke made of NiFe (ferrite), "15" is an insulating layer, "16" is a main magnetic pole, "17" is a coil, "18" is an insulating protective layer, and "19" is a back yoke portion. Those are formed on the wafer 1a by thin-film forming technology, and the direction of the thin-film lamination is parallel to the surface of the magnetic disk 5.

The flexible support body 2, different from the one shown in FIGS. 16(A–B), is provided with no portion bent at the right angle, and has a flat shape. As shown in FIG. 12, the insulating layer 27 is coated on the metal base 20, the signal lead patterns 24 and 26 are provided on the layer, and the protective layer 28 is provided on the signal lead wires. The signal lead patterns 24 and 26 are provided with lead terminals 21 and 23, and connection terminals 24a and 26a. As this flexible support body 2 is designed not to have the tip bent at the right angle, insulating plastic or ceramic or the like may be used.

With the connector terminals 11 and 13 of the head chip 1-2 facing frontward of the flexible support body 2 (leftward in the diagram), that surface (top surface) which is parallel to the surface facing a magnetic disk is set to abut on the mounting surface (bottom surface) of the tip portion of the flexible support body 2.

An ultraviolet-ray hardening adhesive T is coating of about 5 microns thick is applied on to this abutting surface, and the abutting surfaces are irradiated with ultraviolet rays (UV light) for instantaneous hardening so that they are mechanically secured.

The connector terminals 11 and 13 of the head chip 1-2 are connected to the lead terminals 21 and 23 of the flexible support body 2 by bonding wires M of gold or the like.

In this embodiment, as that surface of the head chip 1-2 which is opposite to the one that faces the magnetic disk is adhered to the flat support body 2, the parallelism with the surface of the magnetic disk is obtained accurately. Further, because the attachment uses an ultraviolet-ray hardening adhesive that does not involve heating, the attachment is easily accomplished without adverse thermal influence such as thermal deformation.

(i) Description of Eighth Embodiment

Figure 39:
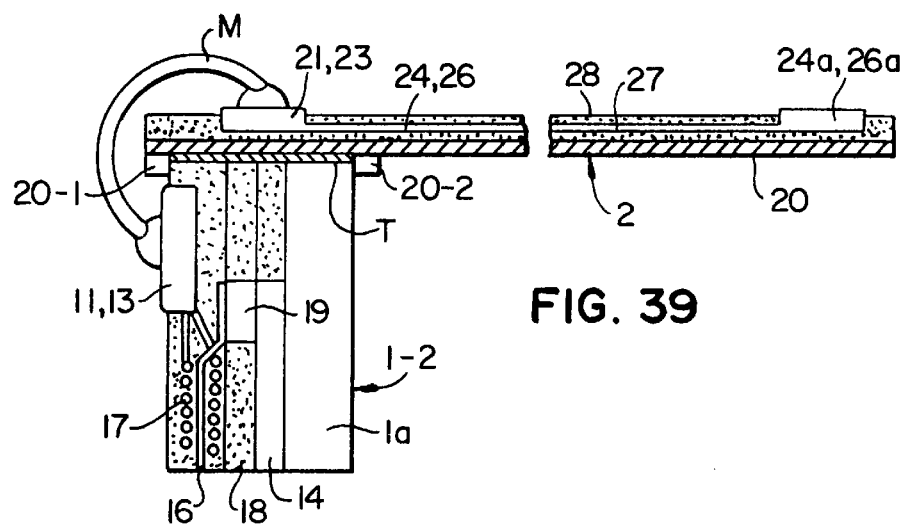
FIG. 39 presents a cross section of a magnetic head assembly according to an eighth embodiment of the present invention.

FIG. 39 is a cross section of an eigth embodiment of the present invention, illustrating another example of the connection between the head chip 1-2 and the support body 2.

The structure of the head chip 1-2 is the same as shown in FIG. 38; "11" and "13" are terminals, "14" is a return yoke made of NiFe (ferrite), "15" is an insulating layer, "16" is a main magnetic pole, "17" is a coil, "18", is an insulating protective layer, and "19" is a back yoke portion. Those are formed on the wafer 1a by thin-film forming technology, and the direction of the thin-film lamination is parallel to the surface of the magnetic disk 5.

The flexible support body 2, almost identical to the one shown in FIG. 38, is provided with no portion bent at the right angle, and has a flat shape. The insulating layer 27 is coated on the metal base 20, the signal lead patterns 24 and 26 are provided on the layer, and the protective layer 28 is provided on the signal lead wires. The signal lead wires 24 and 26 are provided with the lead terminals 21 and 23, and connection terminals 24a and 26a. This flexible support body 2 is further provided, at the attaching surface at its tip portion, with a pair of protrusions 20-1 and 20-2, which are formed by thin films of $Al_2O_3$ or the like for positioning and holds the outer surface of the head chip 1-2.

With the connector terminals 11 and 13 of the head chip 1-2 facing frontward of the flexible support body 2 (leftward in the diagram), that surface (top surface) which is parallel to the surface facing a magnetic disk is set to abut on the mounting surface (bottom surface) of the tip portion of the flexible support body 2 while being positioned by the protrusions 20-1 and 20-2. An ultraviolet-ray hardening adhesive T coating of about 5 microns thick is applied onto this abutting surface, and the that surfaces are irradiated with ultraviolet rays (UV light) for instantaneous hardening so that they are mechanically secured.

The connector terminals 11 and 13 of the head chip 1-2 are connected to the lead terminals 21 and 23 of the flexible support body 2 by bonding wires M of gold or the like.

As the flexible support body 2 is provided with the positioning protrusions 20-1 and 20-2, the positioning of the head chip 1-2 becomes easier and the right angle of the magnetic pole with respect to the advancing direction of the magnetic disk can be obtained accurately, thus reducing the azimuth loss.

Figure 40:
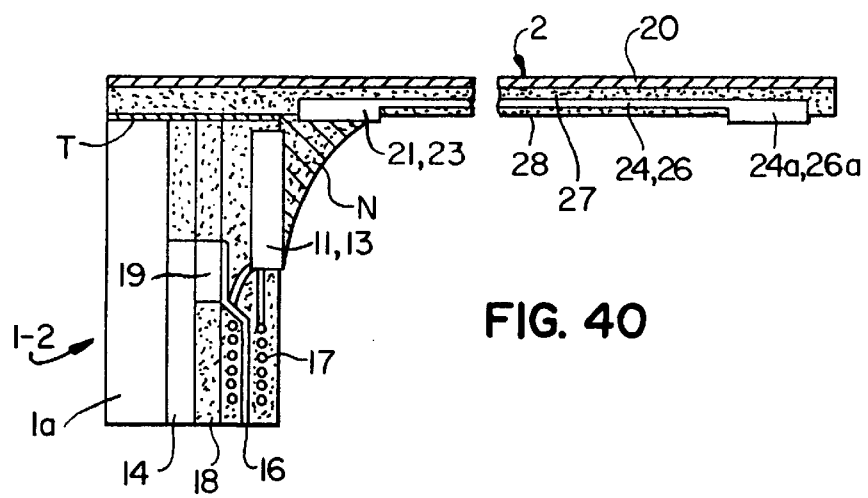
FIG. 40 presents a cross section of a magnetic head assembly according to a ninth embodiment of the present invention.

(j) Description of Ninth Embodiment FIG. 40 is a cross section of a ninth embodiment of the present invention, illustrating another example of the connection between the head chip 1-2 and the support body 2.

The structure of the head chip 1-2 is the same as shown in FIG. 38. The flexible support body 2, almost identical to the one shown in FIG. 38, is provided with no right-angled bent portion, and has a flat shape.

With the connector terminals 11 and 13 of the head chip 1-2 facing backward of the flexible support body 2 (rightward in the diagram), that surface (top surface) which is parallel to the surface facing a magnetic disk is set to abut on the mounting surface (bottom surface) of the tip portion of the flexible support body 2. An ultraviolet-ray hardening adhesive T coating about 5 microns thick is applied onto this abutting surface, and the surfaces are irradiated with ultraviolet rays (UV light) for instantaneous hardening so that they are mechanically secured.

The connector terminals 11 and 13 of the head chip 1-2 are fillet-bonded to the lead terminals 21 and 23 of the flexible support body 2 by a solder N of a low melting point, such as Bi-Pb base alloy, so as to form solder fillets.

As the head chip 1-2 is fillet-bonded to the support body 2 by a low melting-point solder, the mechanical strength at the adhered portion by an adhesive can be reinforced while providing electrical connection. Particularly, even when the wafer substrate is formed of the return yoke 14, the head chip 1-2 becomes thinner, making the abutting surface smaller and the adhering area smaller, the mechanical strength can be maintained by the fillet-bonding. Further, as a low melting-point solder is used, the adhered ultraviolet-ray hardening adhesive hardly has thermal degradation.

(k) Description of Tenth Embodiment

Figure 41:
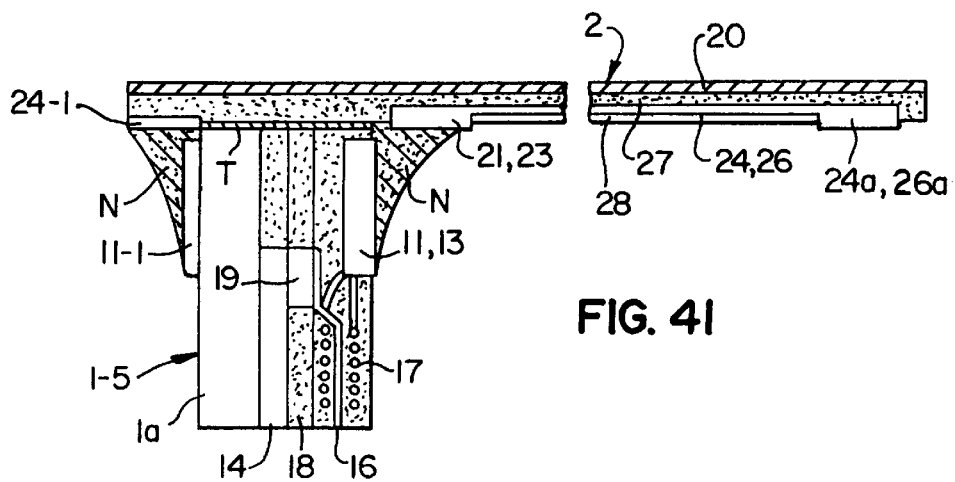
FIG. 41 presents a cross section of a magnetic head assembly according to a tenth embodiment of the present invention.

FIG. 41 is a cross section of a tenth embodiment of the present invention, illustrating another example of the connection between the head chip and flexible support body.

In FIG. 41, the structure of a head chip 1-5 is such that in addition to the structure of the embodiment in FIG. 40, the substrate 1a of the return yoke 14 is provided with a connection pad 11-1 by solder plating, vapor deposition of gold or the like. The flexible support body 2, which has almost the same structure as that of the embodiment shown in FIG. 40, is provided, at the tip of the mounting surface, with a mounting pad 24-1 by solder plating, vapor deposition of gold or the like.

In this embodiment, the top of the head chip 1-5 and the mounting surface of the support body 2 are adhered by an ultraviolet-ray hardening adhesive T. The connector terminals 11 and 13 of the head chip 1-5 are fillet-bonded to the lead terminals 21 and 23 of the flexible support body 2 by a low melting-point solder N. The connection pad 11-1 of the head chip 1-5 is also fillet-bonded to the mounting pad 24-1 of the support body 2 by a low melting-point solder N.

Since this structure has the front, back and both sides fillet-bonded by a low melting-point solder N, the mechanical bonding becomes stronger.

(1) Description of Eleventh Embodiment

Figure 42:
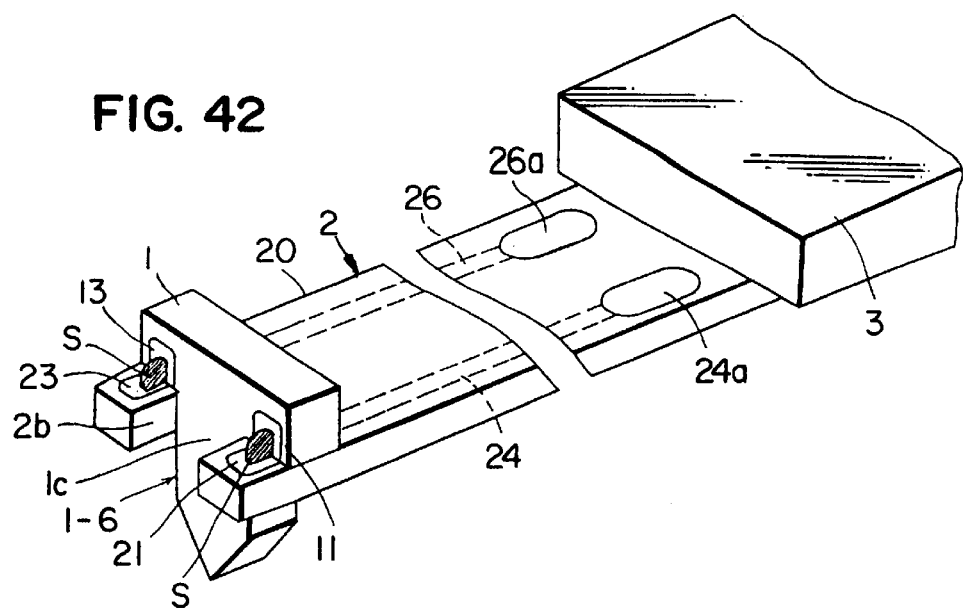
FIG. 42 is a perspective view of a magnetic head assembly according to an eleventh embodiment of the present invention.

FIG. 42 is a perspective view of an eleventh embodiment of the present invention, and FIGS. 43(A–B) are cross sections of FIG. 42, both showing another example of the connection between the head chip and the support body.

A head chip 1-6 has the same structure as shown in FIGS. 24(A–B) in the provision of the main magnetic pole 16, the coil 17 wound around the magnetic pole 16, the insulating layers 15 and 18, which insulatively protects the magnetic pole 16 and coil 17, the back yoke 19, the return yoke 14 and the connector terminal 11.

Figure 43A:
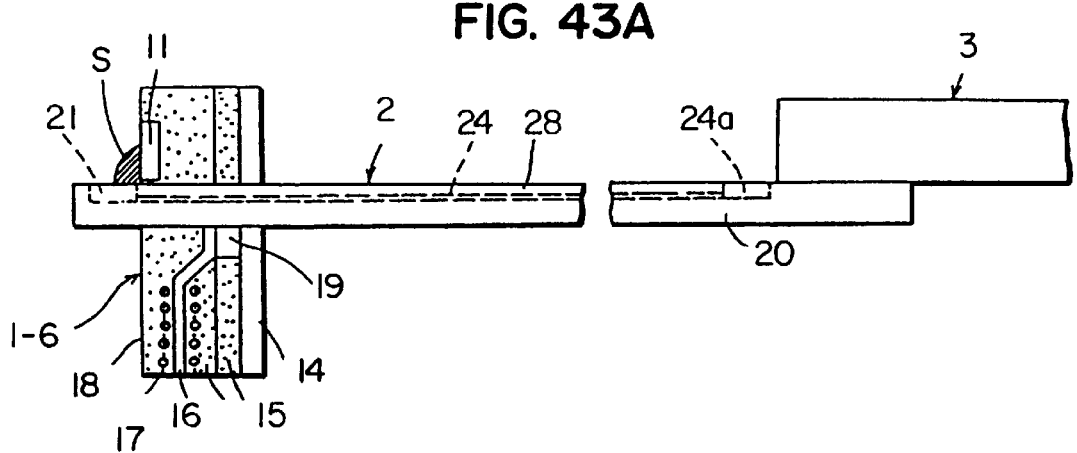
FIGS. 43(A–B) are cross sections of the magnetic head assembly in FIG. 42.
Figure 43B:
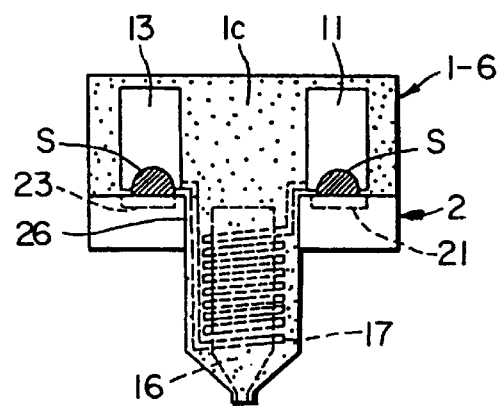

The difference of this embodiment lies in that, as shown in FIGS. 42 and 43(B), the head chip 1-6 is designed into a T shape as viewed from the thin-film forming surface of the head chip 1-6. On a T-shaped vertical portion 1c are formed the main magnetic pole 16, the coil 17 wound around the magnetic pole 16, the insulating layers 15 and 18, which insulatively protects the magnetic pole 16 and coil 17, the back yoke 19 and the return yoke 14. The connector terminals 11 and 13 of the coil 17 are formed on both sides of the upper horizontal portion of the T shape.

This head chip 1-6, as described above, is prepared by cutting out many head chips, formed on the wafer substrate of, for example, NiFe, as viewed from the thin film forming surface. While the size of the head chip 1-6 is restricted by the number of turns of the coil 17 incorporated in the chip, the size of several hundred microns or below can be achieved and the chip can be made as thin as several tens of microns because it simply requires the thin-film forming portion.

When a number of head chips 1-6 on the wafer substrate of NiFe are cut out into a T shape, part of the NiFe wafer substrate becomes the return yoke 14. A ferrite wafer substrate may be used in place of the NiFe wafer substrate, providing a ferrite return yoke 14. In this case, the head chip 1-6 becomes slightly thicker.

The flexible support body 2 for supporting this head chip 1-6, as described above, has the metal plate 20 of a stainless sheet or the like which is coated with an insulating resist, the signal lead patterns 24 and 26 formed on the plate, the insulating protective layer 28 provided on the signal lead patterns, the lead terminals 21 and 23, and connection terminals 24a and 26a through which both ends of the signal lead patterns 24 and 26 are exposed.

The support body 2 has a recess 2b formed at the tip to hold the vertical portion 1c of the T-shaped head chip 1-6. As shown in FIG. 43(A), the rear end of the support body 2 is attached to the front end of the arm 3.

The connector terminals 11 and 13 are so formed that when the vertical portion 1c of the T-shaped head chip 1-6 is held in the recess 2b formed at the tip of the support body 2, the connector terminals 11 and 13 of the coil 17 provided at the upper horizontal portion of the T-shaped head chip 1-6 come close to the connector terminals 21 and 23 of the signal lead patterns 24 and 26 provided on both sides of the recess 2b at the tip of the flexible support body 2.

In assembling the head chip 1-6 and the support body 2, the vertical portion 1c of the T-shaped head chip 1-6 is held in the recess 2b formed at the tip portion of the support 2, and is adhered thereto by an insulating adhesive to provide mechanical fixation.

Then, by applying a low melting-point metal or conductive paint S, the connector terminals 11 and 13 of the coil 17 provided at the upper horizontal portion of the T-shaped head chip 1-6 are electrically connected to the lead terminals 21 and 23 of the signal lead patterns 24 and 26 provided on both sides of the recess 2b at the tip of the flexible support body 2.

At this time, the connector terminals 11 and 13 may be connected to the lead terminals 21 and 23 by gold ball bonding as described above. This method is to press a gold ball W of about several tens of microns, formed at the tip of a gold wire by electronic sparking, between the connector terminals 11 and 13 and the lead terminals 21 and 23 to connect them. Since this coupling method can connect the connector terminals by simply pressure-bonding a gold ball W between the connector terminals, it can make connection between the connector terminals, which have an angle of 90 degrees therebetween, more quickly and easily than the aforementioned method of using a low melting-point metal or conductive paint.

Further, since the vertical portion 1c of the T-shaped head chip 1-6 is held in the recess 2b formed at the tip portion of the support 2 and is connected thereto, firm coupling is possible and the connecting work can be executed easily.

Furthermore, as the vertical portion 1e of the T-shaped head chip 1-6 is held in the recess 2-b formed at the tip portion of the support 2, the gap between the tip of the magnetic pole 16 of the head chip 1-6 and the support body 2 can be made smaller, thus shortening the distance between the support body 2 and the magnetic disk 5. This can reduce the inclination of the head chip 1-6 in the rolling direction. For instance, if the gap between the magnetic disk and the support body 2 for the head chip 1-6 is set to ½ of the conventional gap, the inclination of the head chip 1-6 in the rolling direction 15 can be suppressed to ½, thus ensuring stable recording and reproduction.

(i) Description of Twelfth Embodiment

Figure 44A:
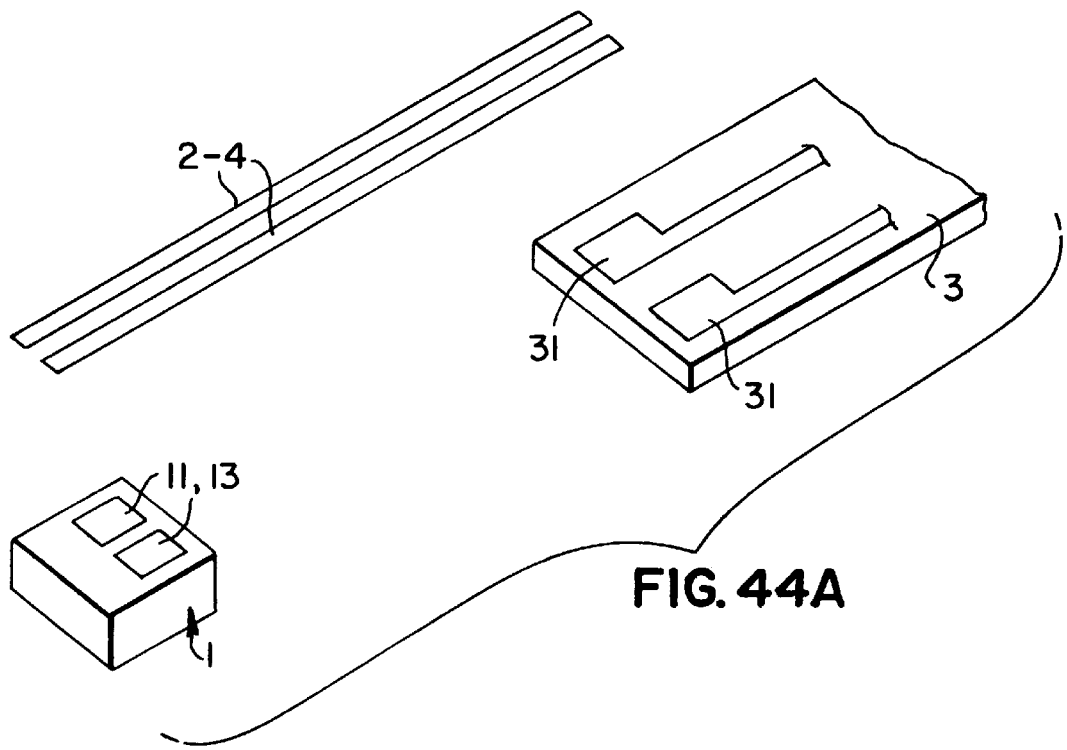
FIGS. 44(A–B) are perspective views of a magnetic head assembly according to a twelfth embodiment of the present invention.
Figure 44B:
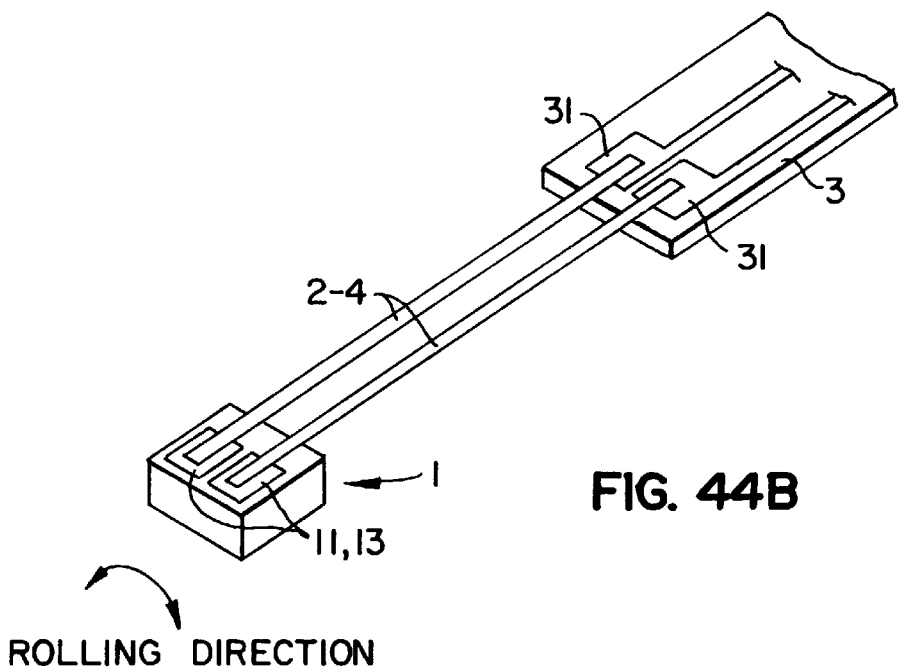
Figure 45:
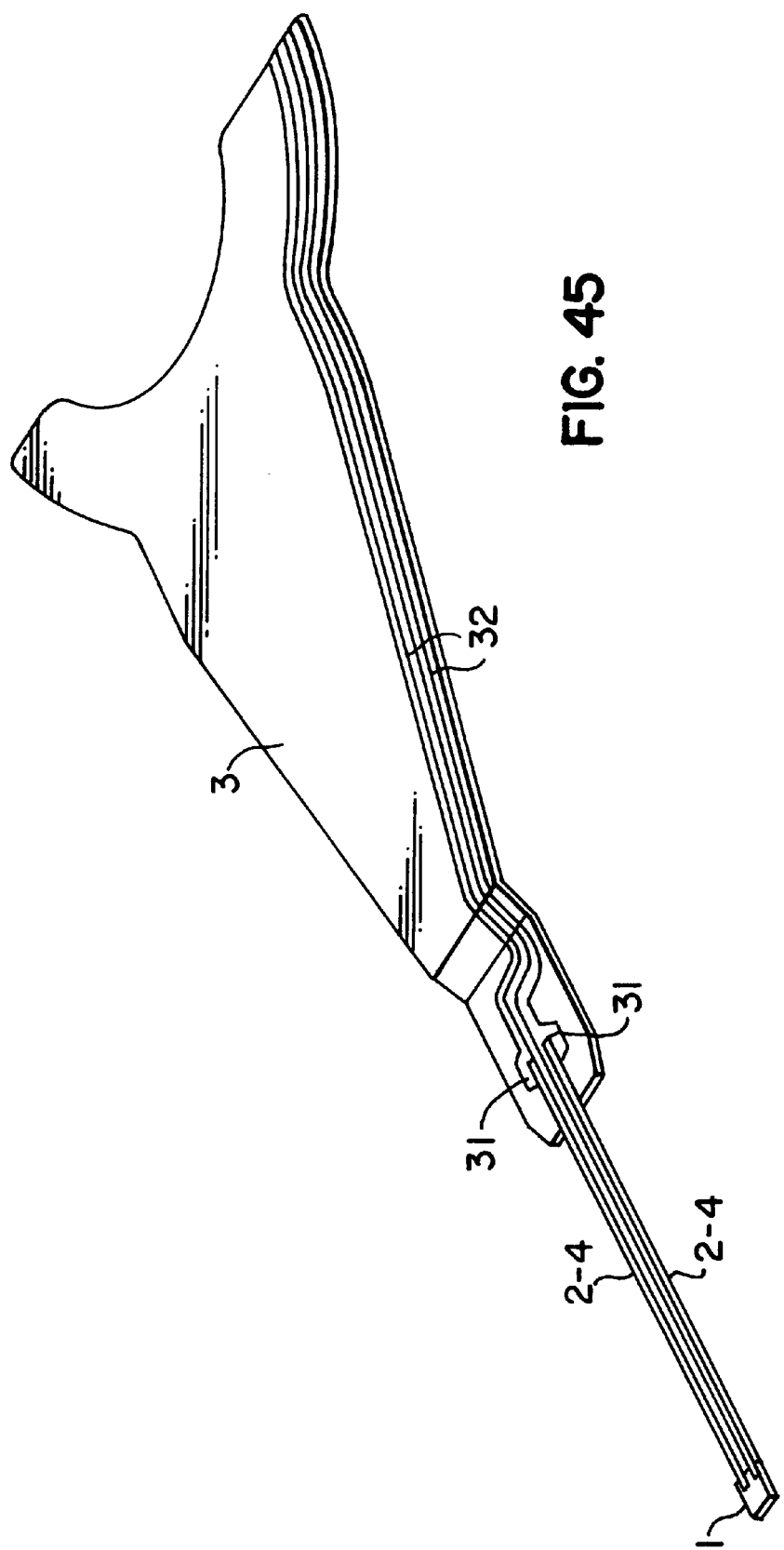
FIG. 45 presents a structural diagram for the magnetic head assembly in FIGS. 44(A–B) mounted to an arm.

FIGS. 44(A–B) are structural diagrams of a twelfth embodiment of the present invention, and FIG. 45 illustrates the implementation state of the structure of FIGS. 44(A–B).

As shown in FIG. 45, the arm 3 is provided with a pair of lead pattern wires 32, with a pair of arm terminal portions 31 provided at the distal ends of the lead pattern wires 32.

This arm 3 is made of metal, such as stainless, and an insulating layer is coated thereon. Those lead pattern wires 32 and arm terminal portions 31 are formed from a copper pattern, and the lead pattern wires 32 are coated with a protective layer.

Attached to the terminal portions 31 of the arm 3 are gimbal wires 2 4 whose distal ends are connected to the head chip 1.

As shown in FIG. 44(A), the head chip 1 has the terminals 11 and 13 shown in FIG. 11 provided on its top. The pair of gimbal wires 2–4 are formed from a phosphor bronze wire 0.1 mm in diameter, and has the spring property and conductivity.

As shown in FIG. 44(B), the pair of parallel gimbal wires 24 have their one ends connected to the terminal portions 11 and 13 of the head chip 1 by heat, ultrasonic welding or the like, and have the other ends likewise connected to the arm terminal portions 31 of the arm 3 by heat, ultrasonic welding or the like. Consequently, the arm 3 and the head chip 1 are electrically and mechanically connected together by the parallel gimbal wires 2–4.

Due to their spring characteristic, the gimbal wires 2–4 elastically support the head chip 1 and connect the terminals 11 and 13 to the terminal portions 31, so that the head chip 1 is connected to the lead pattern wires 32 of the arm 3, thus ensuring transfer of recording/reproducing signals.

The magnetic head assembly is completed by simply connecting the terminals 11 and 13 of the head chip 1 to the arm terminal portions 31 of the arm 3 using the gimbal wires 2–4. Even when the head chip 1 is very small, it can easily be connected to the arm 3 by the gimbal wires 2–4, facilitating the assembling of a small magnetic head assembly.

Further, since the required step is to connect the terminals 11 and 13 to the terminal portions 31 by the gimbal wires 2–4, the number of the steps of assembling fine components is reduced, facilitating the assembling of a small magnetic head assembly.

Furthermore, as the number of components is reduced, a very small magnetic head assembly can be provided at a low cost by combining the parts reduction with easier assembling.

In addition, because the arm 3 is provided with the lead pattern wires 32 in this example, it is unnecessary to use lead wires as wire materials and the need to form the lead wires in minute space can be eliminated, thus further facilitating the assembling.

As two gimbal wires 2–4 are provided in parallel, the strength in the rolling direction of the head chip 1 can be enhanced.

(n) Description of Thirteenth Embodiment FIGS. 46(A–C) present structural diagrams of a thirteenth embodiment of the present invention.

Figure 46A:
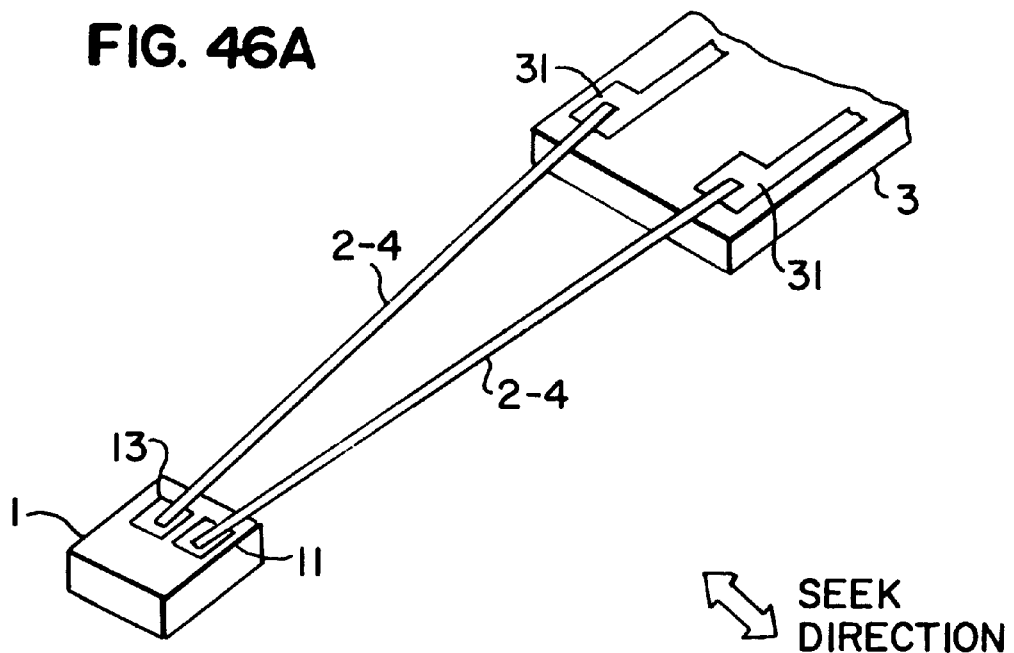
FIGS. 46(A–C) are perspective views of a magnetic head assembly according to a thirteenth embodiment of the present invention.
Figure 46B:
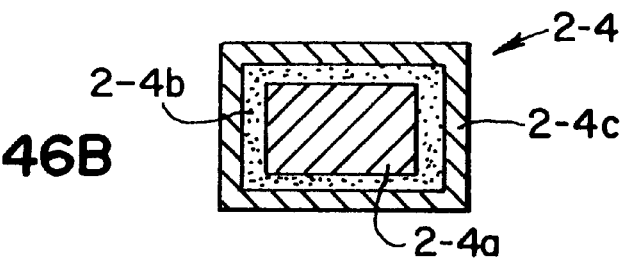
Figure 46C:
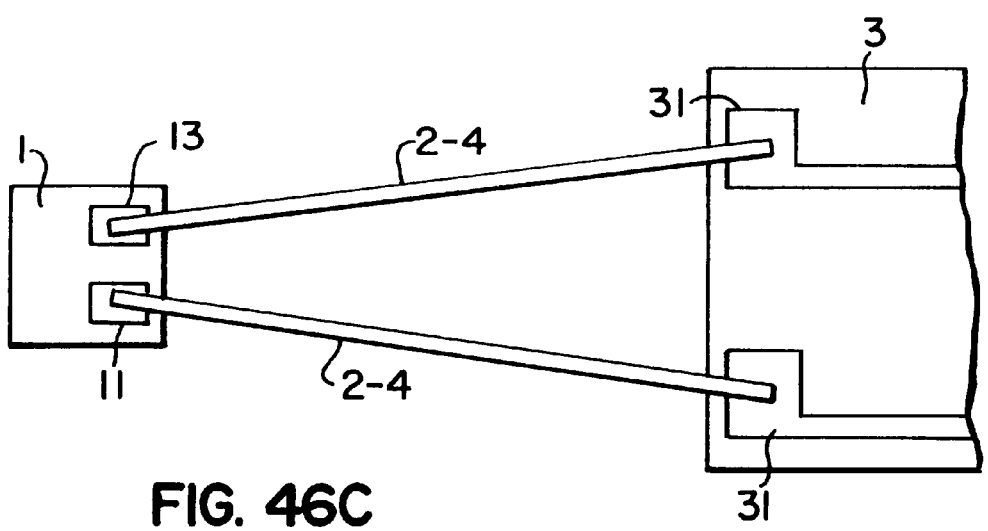

In this embodiment, as shown in FIGS. FIG. 46(A) and 46(C), two arm terminal portions 31 of the arm 3 are arranged on both side portions of the arm 3 to widen the gap between the terminals 11 and 13 of the head chip 1.

With this arrangement, when one ends of a pair of gimbal wires 2–4 are connected to the terminals 11 and 13 of the head chip 1, and the other ends to the arm terminal portions 31 of the arm 3, that pair of gimbal wires 2–4 are not in parallel, but have a truss shape.

It is therefore possible to enhance the rigidity to the seek direction of the magnetic head assembly, so that even fine wire materials can give high rigidity. This is particularly effective for a contact type head which makes contact for recording and reproduction, because force in the seek direction is applied to the head chip 1 at the time the seek operation is carried out.

As shown in FIG. 46(B), when the gimbal wires 2–4 are designed in such a way that a gold-plated layer 2-4b is provided around a phosphor bronze wire 2-4a of a rectangular shape, and a Permalloy layer 2-4c is plated around the gold-plated layer, the Permalloy layer 2-4c can provide a shielding effect.

When the head chip 1 becomes smaller, the recording/reproducing signal becomes weaker and is likely to be affected by noise. This shield effect is thus very effective to improve the recording/reproducing functions.

(o) Description of Fourteenth Embodiment

FIGS. 47(A–B) present explanatory diagrams of a fourteenth embodiment of the present invention.

Figure 47A:
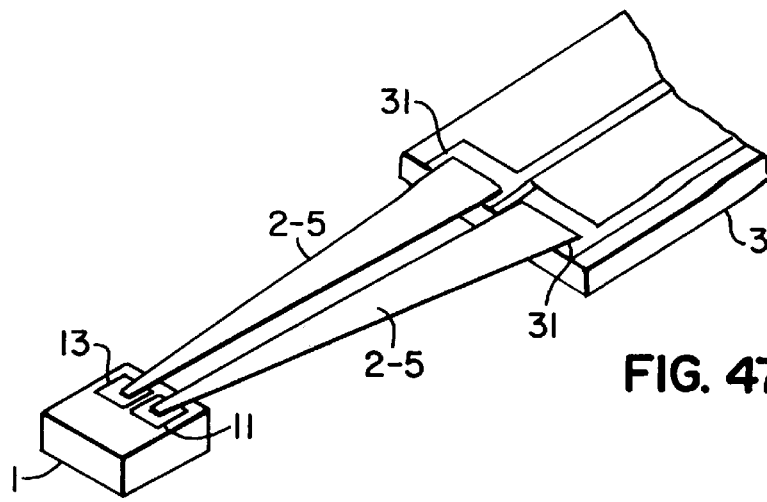
FIGS. 47(A–B) are perspective views of a magnetic head assembly according to a fourteenth embodiment of the present invention.
Figure 47B:
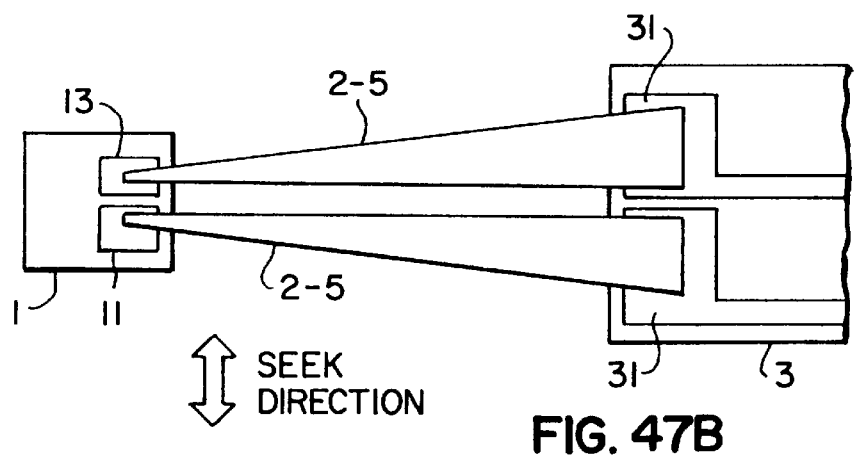

In this embodiment, as shown in FIGS. 47(A) and 47(B), those portions of gimbal wires 2–5 which lie on the side of the arm terminal portions 31 are made wider than those on the side of the head chip 1, while the arm terminal portions 31 are made wider.

With this arrangement, when one set of ends of that pair of gimbal wires 2–5 are connected to the terminal portions 11 and 13 of the head chip 1, and the other set of ends to the arm terminal portions 31 of the arm 3, that pair of gimbal wires 2–5 have a truss shape having different widths between the head chip 1 side and the arm 3 side, though in parallel to each other, thus ensuring the rigidity with respect to the seek direction.

In this structure, the connecting areas of the gimbal wires 2–5 on the side of the arm 3 become larger, increasing the rigidity with respect to the seek direction, and the bonding strength increases as well.

(p) Description of Fifteenth Embodiment

Figure 48:
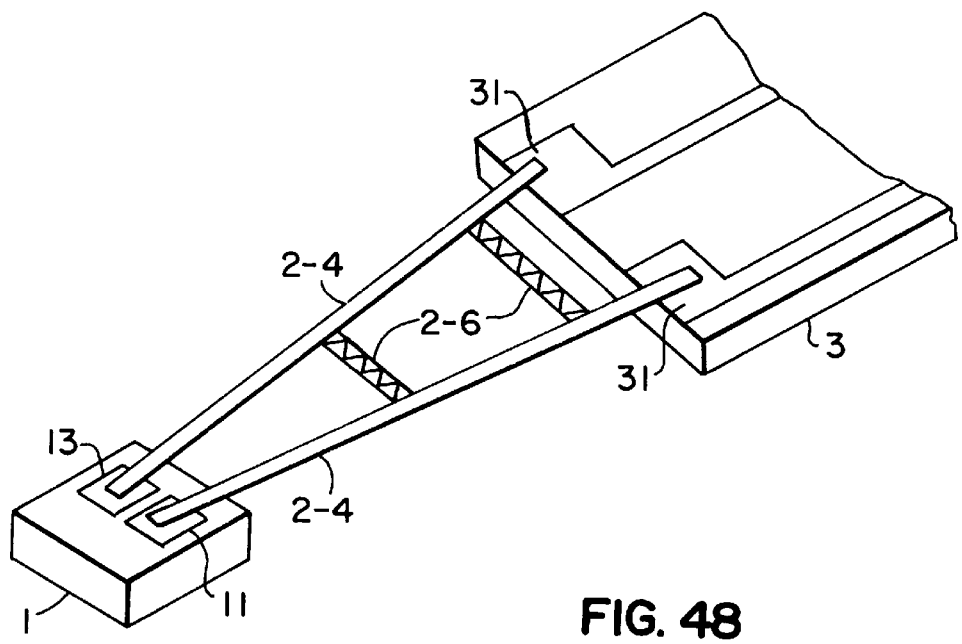
FIG. 48 is a perspective view of a magnetic head assembly according to a fifteenth embodiment of the present invention.

FIG. 48 presents a structural diagram of a fifteenth embodiment of the present invention.

In this embodiment, as shown in FIG. 48, two arm terminal portions 31 of the arm 3 are arranged on both side portions of the arm 3 to widen the gap between the terminals 11 and 13 of the head chip 1, as per the embodiment of FIGS. 46(A–C).

Accordingly, when one set of ends of a pair of gimbal wires 2–4 are connected to the terminals 11 and 13 of the head chip 1, and the other set of ends are connected to the arm terminal portions 31 of the arm 3, that pair of gimbal wires 2–4 are not in parallel, but have a truss shape. This can improve the rigidity with respect to the seek direction.

Further, reinforcing plates 2–6 of an insulating material are formed between the gimbal wires 2–4, to provide a ladder shape, thus further increasing the rigidity with respect to the seek direction.

(q) Description of Sixteenth Embodiment

FIGS. 49(A–D) present structural diagrams of a sixteenth embodiment of the present invention, and FIGS. 50(A–C) are diagrams illustrating another example of the sixteenth embodiment of the present invention.

According to those embodiments, holding plates 29*a* and 29*b* for mechanically holding the head chip 1 and the support plate 2 when both are connected.

Figure 49A:
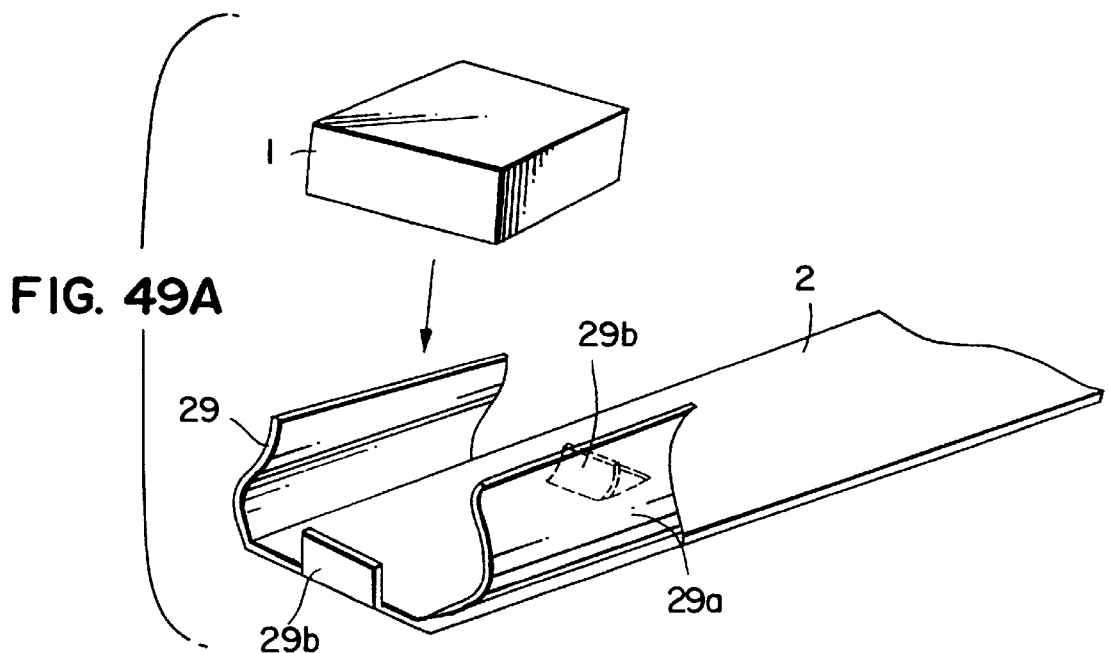
FIGS. 49(A–D) are perspective views of a magnetic head assembly according to a sixteenth embodiment of the present invention.

In FIG. 49(A), holding plates 29*a* and 29*b* for holding the head chip 1 from four directions are provided at the distal end of the support plate 2 to hold the head chip 1 like a socket.

Figure 49B:
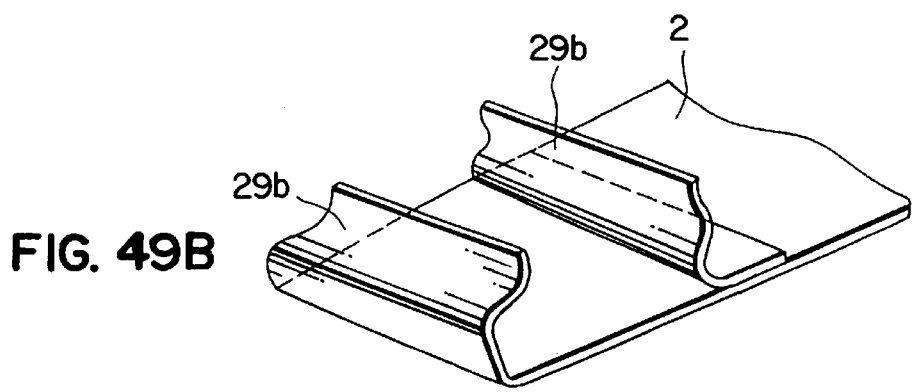

In FIG. 49(B), holding plates 29*b* for holding the head chip 1 from both sides are provided at the distal end of the support plate 2 to hold the head chip 1.

Figure 49C:
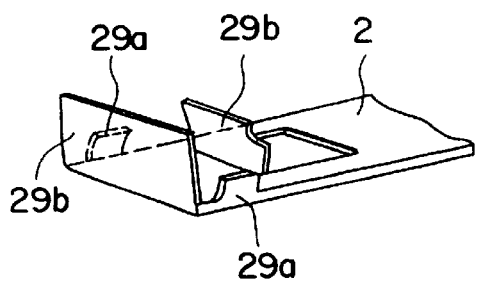
Figure 49D:
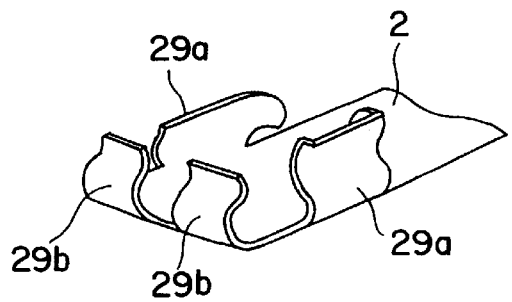

In FIGS. 49(C) and 49(D), both being modifications of FIG. 49(A), holding plates 29*a* and 29*b* for holding the head chip 1 from four directions are provided at the distal end of the support plate 2 to hold a magnetic head core 8 like a socket.

Those holding plates 29*a* and 29*b* can be formed through plate working on the support plate 2 or vapor deposition of aluminum oxide or the like, allow the head chip to be fixed and positioned and eliminate the need for adhesion of the head chip 1, ensuring easier replacement.

Figure 50B:
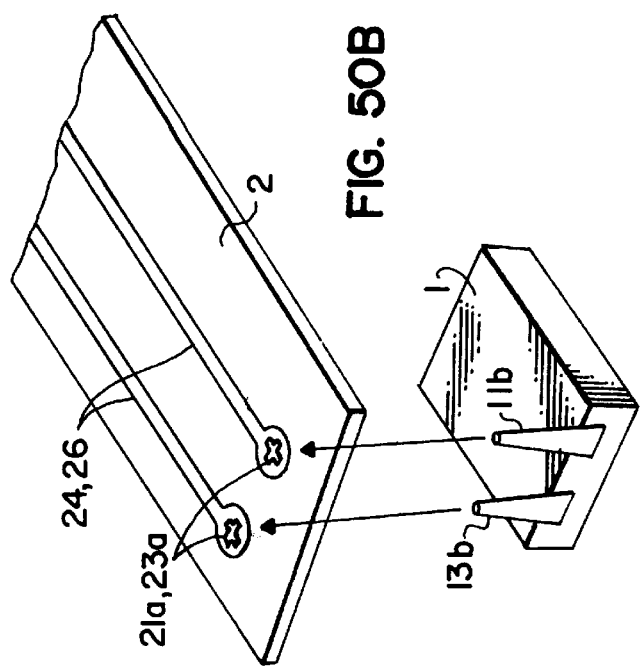
FIGS. 50(A–C) are perspective views of a magnetic head assembly according to a seventeenth embodiment of the present invention.
Figure 50C:
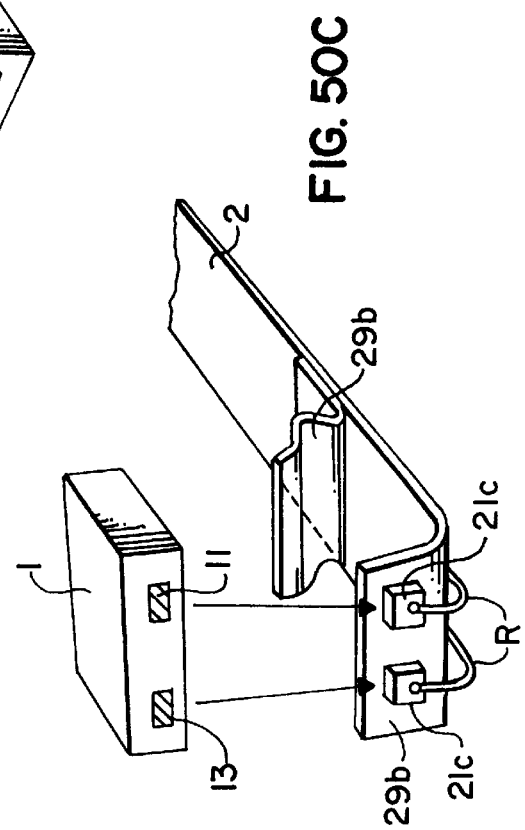
Figure 50A:
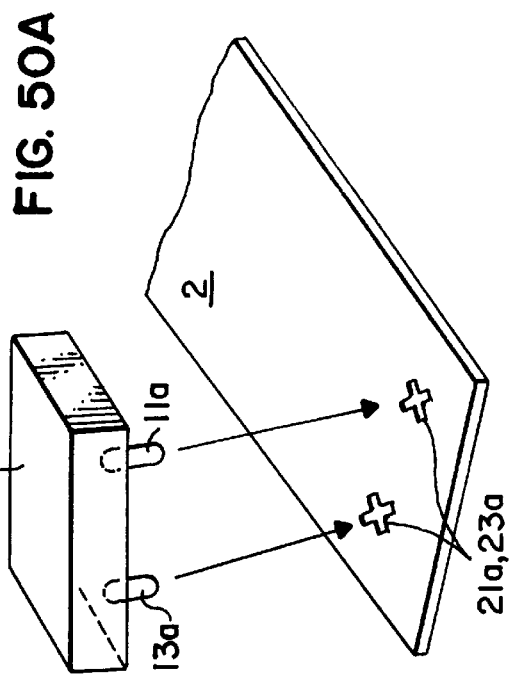

In the examples of FIGS. 50(A) and 50(B), the head chip 1 is provided with protrusions 11*a*, 11*b*, 13*a* and 13*b*, which are to be fitted in caulking terminal portions 21*a* and 23*a* provided on lead patterns 24 and 26 of the support plate 2, thus ensuring mechanical support and electrical connection.

Further, in the example of FIG. 50(C), one of a pair of holding plates 29*b* of the support plate 2 is provided with connector terminals 21c that are connected to wiring patterns R. In addition, the connector terminals 11 and 13 are provided on one side of the head chip 1. When the head chip 1 is inserted into the holding plate pair 29*b* to be secured, the connector terminals 11 and 13 of the head chip 1 come in contact with the connector terminals 21c of the holding plates 29*b*, providing electrical connection.

(r) Description of Seventeenth Embodiment

Figure 51:
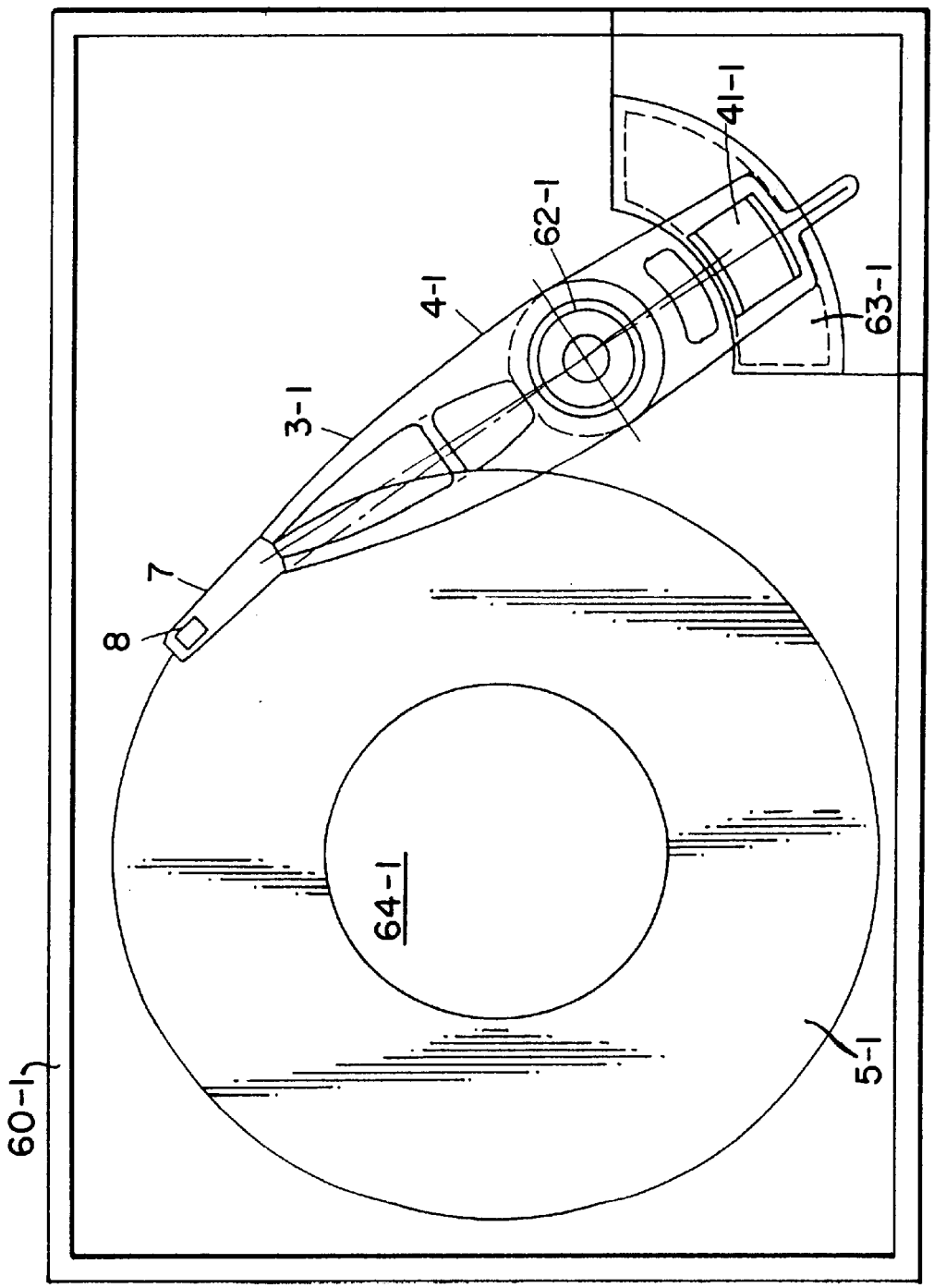
FIG. 51 is a top view of another embodiment of a magnetic disk apparatus of the present invention.
Figure 52:
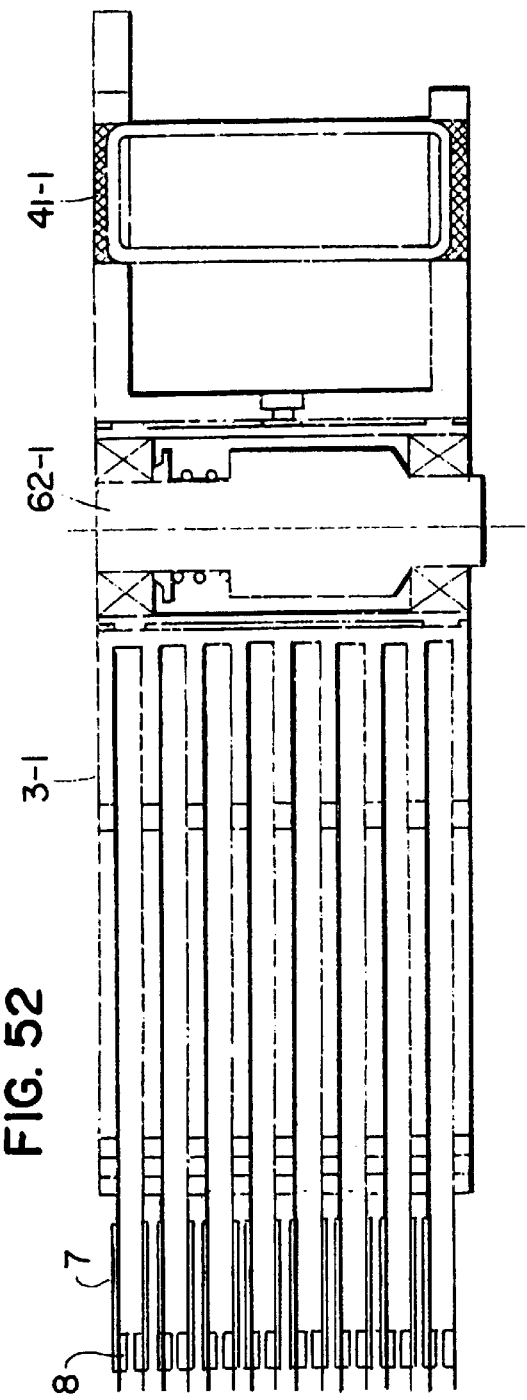
FIG. 52 is a cross section of the magnetic disk apparatus in FIG. 51.
Figure 53:
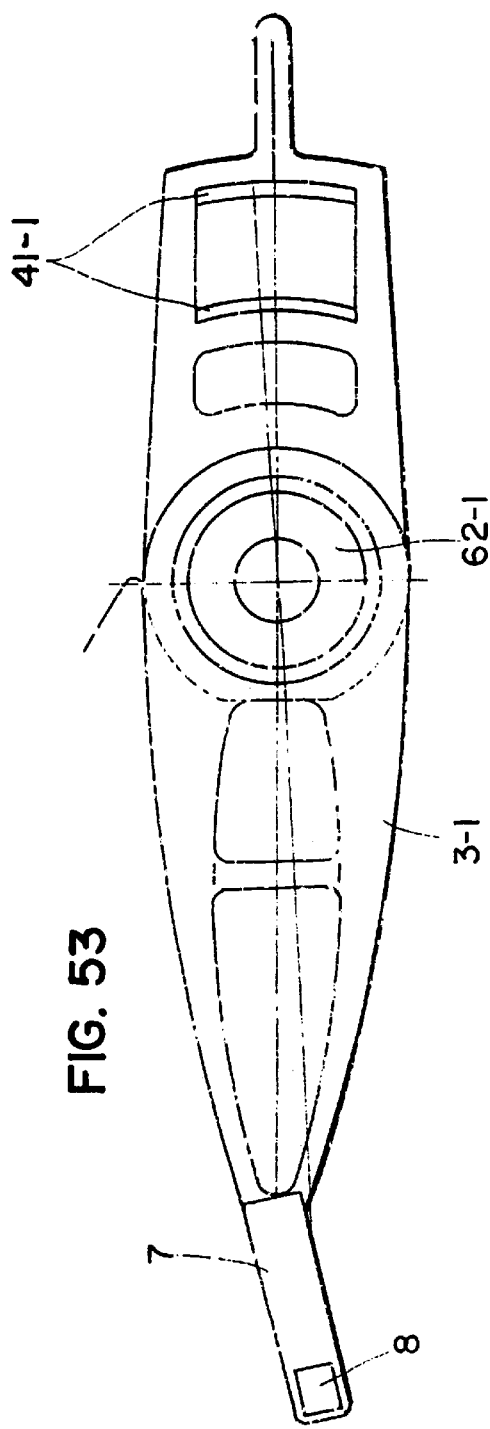
FIG. 53 is a top view of an actuator in FIG. 51.

FIG. 51 is a structural diagram of a magnetic disk apparatus to which a seventeenth embodiment of the present invention is adapted, FIG. 52 is a cross section of the structure in FIG. 51, FIG. 53 is a front view of an actuator in FIG. 51, FIGS. 54(A–B) are explanatory diagrams of the seventeenth embodiment of this invention, and FIGS. 55(A–B) are diagrams for explaining how to connect the embodiment.

FIG. 51 illustrates a magnetic disk apparatus which allows a head to float onto a magnetic disk to execute magnetic recording.

Provided on a base 60-1 of the apparatus is a 3.5-in. magnetic disk 5-1, which rotates around a spindle shaft 64-1, and a magnetic circuit 63-1. An actuator 4-1 is mounted rotatable around a rotary shaft 62-1.

A coil 41-1 is provided at the rear portion of this actuator 4-1, as shown in FIGS. 51, 52 and 53, and the coil 41-1 is located in the magnetic circuit 63-1.

As shown in FIG. 52, nine arms 3-1 are formed at the front portion of the actuator 4-1, each arm 3-1 provided with a support plate (suspension) 7 which has a magnetic head core (core slider) 8 provided at the distal end.

This actuator 4-1, together with the coil 41-1 and magnetic circuit 63-1, form a linear actuator. When current flows through the coil 41-1, the actuator 4-1 rotates around the rotary shaft 62-1 to move the magnetic head core 8 for a seek operation in a direction perpendicular to the tracks of the magnetic disk 5-1 (radial direction).

In FIGS. 54(A–B), "7" is a support plate (suspension) made of metal having a spring property, such as stainless. An insulating layer is coated on the support plate, and a pair of wiring patterns 71 and suspension connector terminals 72 are formed thereon by a copper pattern. The support plate 7 has its one end fixed to the arm 3-1 by laser spot welding or the like.

"8" is a magnetic head core (core slider) which has a pair of core slider connector terminals 82 and a thin-film magnetic head 81 provided on the sides.

Figure 54A:
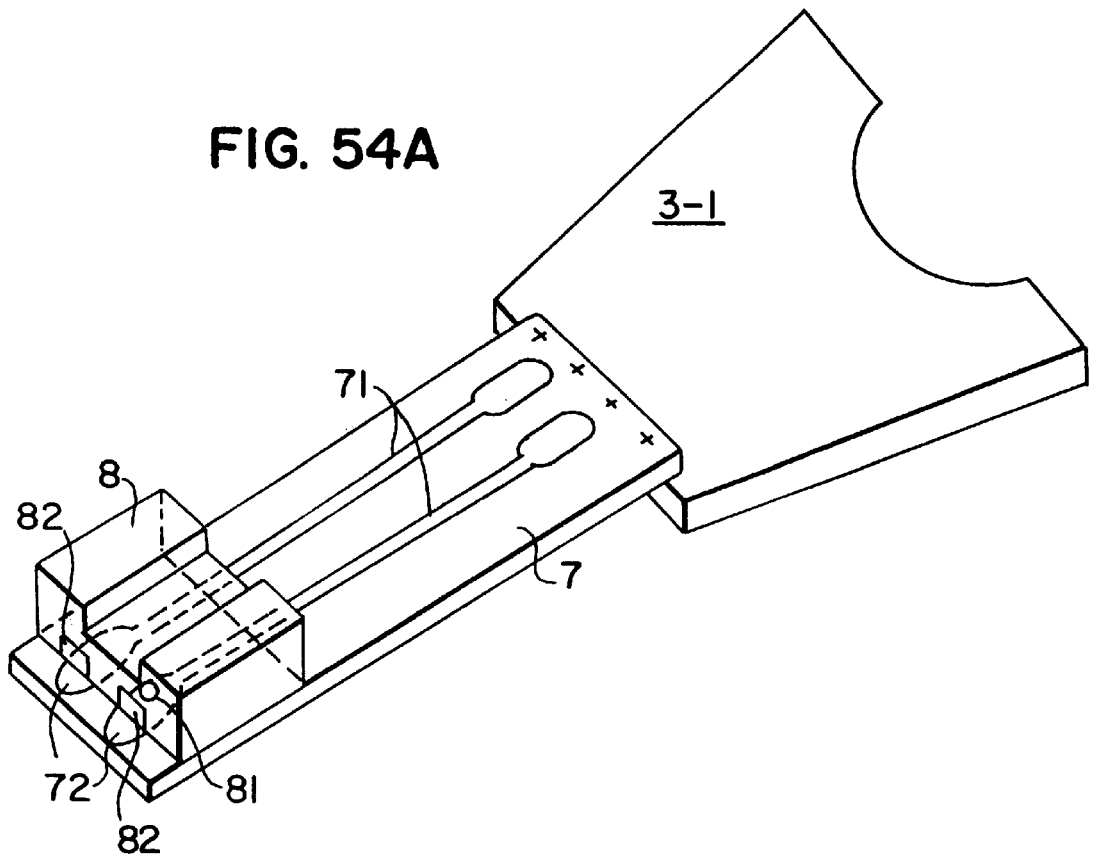
FIGS. 54(A–B) are perspective views of a magnetic head assembly according to an eighteenth embodiment of the present invention.
Figure 54B:
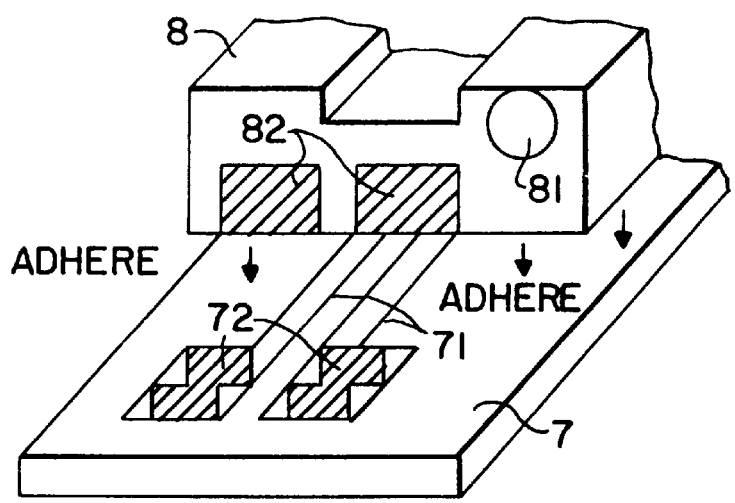
Figure 55A:
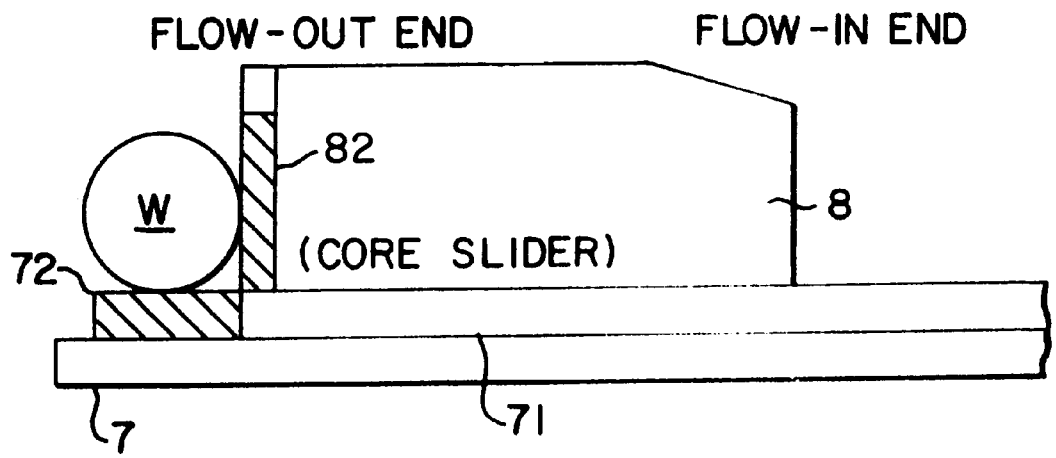
FIGS. 55(A–B) illustrate another connecting mechanism for the magnetic head assembly in FIGS. 54(A–B)

When the magnetic head core 8 is mounted on the support plate 7, the connector terminals 72 of the support plate 7 and the connector terminals 82 of the magnetic head core 8 are fixed with the positional relationship as shown in FIG. 54(B) and 55(A), and gold balls W about 0.1 mm in diameter are made to contact both gold-plated connector terminals 82 and 72 and are subjected to pressure bonding and ultrasonic bonding by a ball bonder, the connector terminals 82 and 72 are electrically and mechanically connected via the gold balls W due to intermetal bonding. In this example, the magnetic disk 51 is located upward of the diagram.

When the support plate 7 is provided with the wiring patterns 71 and connector terminals 72 while the magnetic head core 8 is provided with the connector terminals 82, they can be connected by gold ball bonding. Therefore, even the minute magnetic head core 8 can easily be connected, thus accomplishing the miniaturization of the magnetic head assembly.

Further, unlike lead wires, wiring is not necessary, so that difficult wiring at the minute suspension is unnecessary, further facilitating the assembling.

Furthermore, the number of components is reduced to make the assembling easier and accomplish a small magnetic head assembly.

Figure 55B:
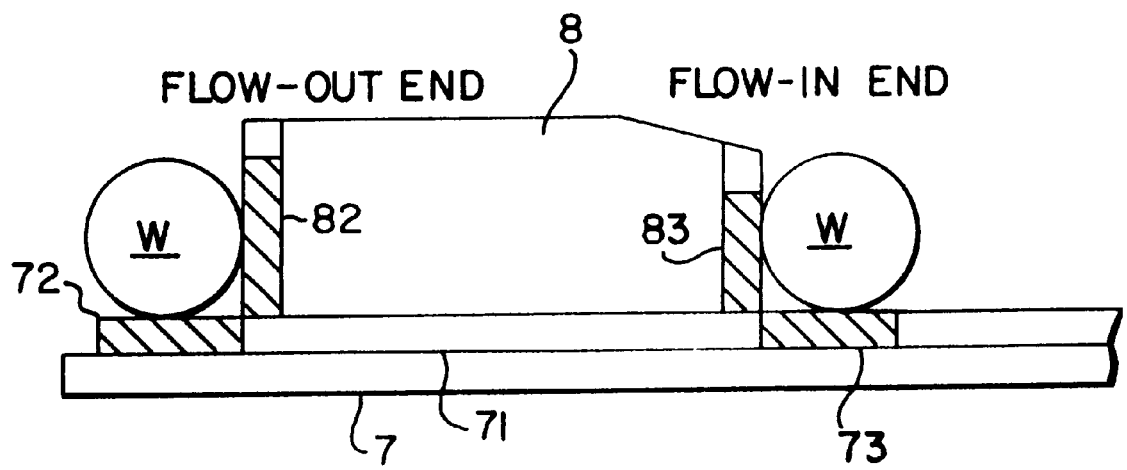

FIG. 55(B) shows a modification of the seventeenth embodiment in which a dummy terminal 83 is provided at the flow-in side of the magnetic head core 8, and a dummy terminal 73 is provided on the wiring pattern 71 of the support plate 7 accordingly. With gold balls W about 0.1 mm in diameter in contact with both gold-plated connector terminals 82 and 72, pressure bonding and ultrasonic bonding are performed by a ball bonder, those connector terminals 82 and 72 are connected together via the gold balls W due to intermetal bonding.

Accordingly, the magnetic head core 8 has both ends connected by the gold balls W to the support plate 7, so that adhesion of the magnetic head core 8 to the support plate 7 is unnecessary and the connection can be made by the ball bonding step alone, further facilitating the assembling.

Although the lead wires are connected to the arm side terminals (see FIG. 54(A)) of the wiring patterns 71 of the support plate 7 before connection to the arm 3-1 in this example, this wiring is easy because the arm 3-1 is relatively large.

(s) Description of Eighteenth Embodiment

FIGS. 56(A–C) are structural diagrams of an eighteenth embodiment of the present invention.

As the structure of the magnetic disk apparatus of the embodiment in FIGS. 56(A–C) is the same as those shown in FIGS. 51 to 53, only the magnetic head assembly is illustrated.

In this embodiment, a thin-film head portion 81 and a pair of core terminal portions 82 are provided at the bottom of the magnetic head core (core slider) 8, with a notch 75 formed between a pair of terminal portions 72 at the tip of the support plate 7.

When the thin-film head portion 81 of the magnetic head core 8 is fitted into the notch 75 of the support plate 7 to cause the terminals 83 to contact the terminals 72, as shown in FIG. 56(B), and ultrasonic waves or heat is applied from the side of the magnetic head core 8 as shown in FIG. 56(C), electrical connection can be provided by the intermetal bonding of the gold-plated portions of both terminals 82 and 72.

With the above structure, as the connector terminals 82 and 72 are provided in advance on the magnetic head core 8 and the support plate 7, respectively, the connection can be made by the positioning between the connector terminals 82 and 72 alone, making the work to connect minute components easier.

Further, the magnetic head core 8 is positioned by the notch 75, the positioning can easily be done.

In this example, the magnetic disk 5-1 is located under the thin-film head 81.

(t) Description of Nineteenth Embodiment

Figure 57A:
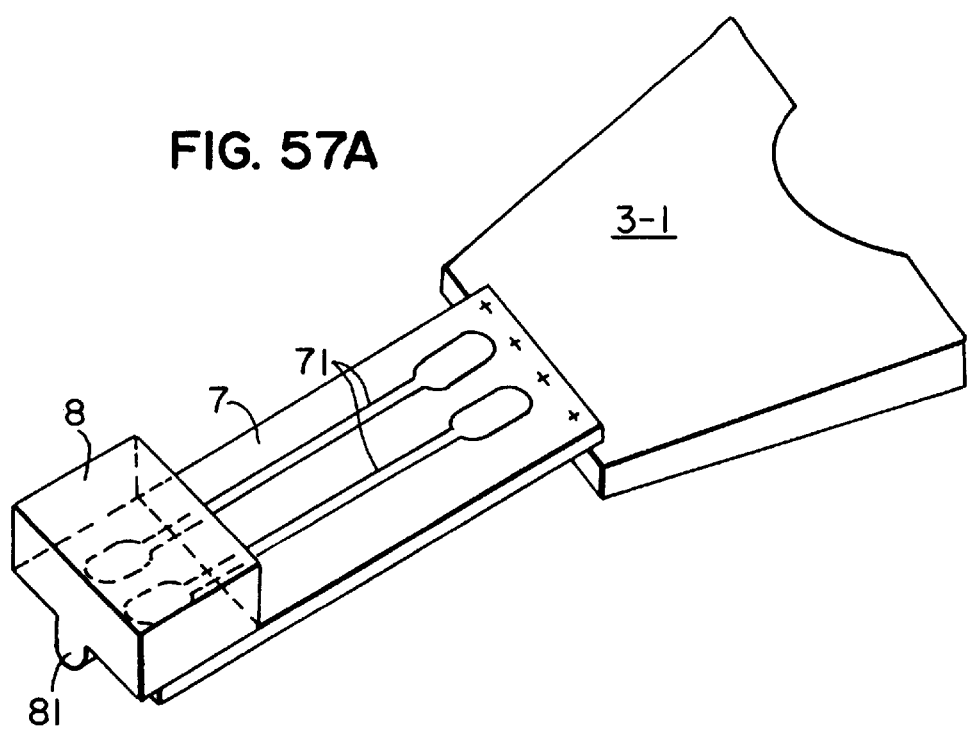
FIGS. 57(A–C) illustrate another connecting mechanism for the magnetic head assembly in FIGS. 56(A–C)
Figure 57B:
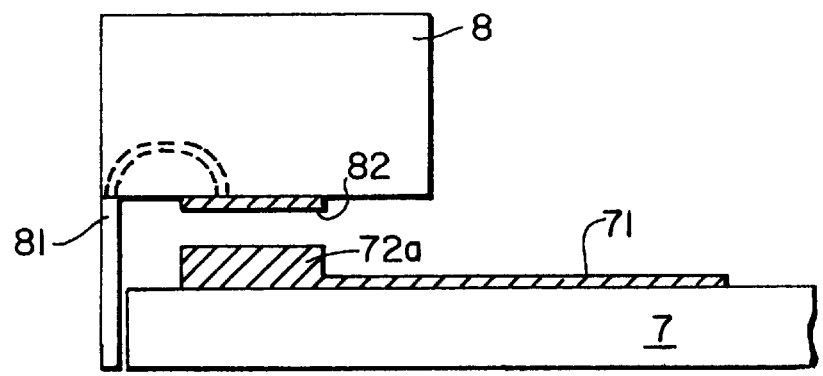

FIGS. 57(A–C) are structural diagrams of a nineteenth embodiment of the present invention.

As the structure of the magnetic disk apparatus of this embodiment in FIGS. 57(A–C) is also the same as those shown in FIGS. 51 to 53, only the magnetic head assembly is illustrated.

Figure 57C:
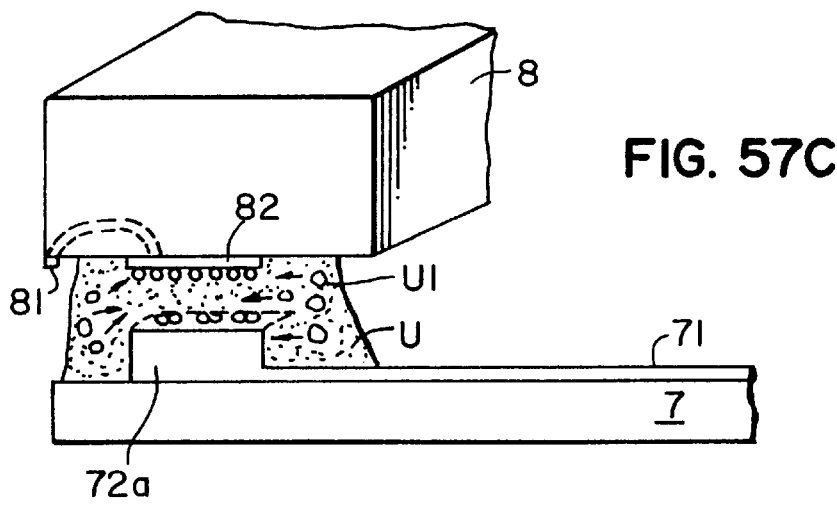

In this embodiment, as shown in FIG. 57(C), connector terminals 72a of the support plate 7 are coated with a conductive adhesive U containing conductive fillers U1, and core terminal portions 82 placed thereon for adhesion in the structure of the embodiment of FIG. 56 in which the thin-film head portion 81 and the pair of core terminal portions 82 are provided at the bottom of the magnetic head core (core slider) 8, with a notch 75 formed between a pair of terminal portions 72 at the tip of the support plate 7.

At this time, when a magnetic field or an electric field is applied in such a way that the conductive fillers U1 of the conductive adhesive U are guided toward the terminals 82 and 72a, the conductive fillers U1 are concentrated between the terminals 82 and 72a, reducing the resistance between the terminals and no conductivity can be seen in other portions than the terminal portions, thereby preventing short-circuiting with an adjoining terminal.

With this structure, the connection can be made only by the coating of the conductive adhesive U, thus facilitating the connecting work for the minute magnetic head core 8.

(u) Description of Twentieth Embodiment

FIGS. 58(A–D) and 59(A–C) present structural diagrams of a twentieth embodiment of the present invention (part 1 and part 2).

As the structure of the magnetic disk apparatus of this embodiment in FIGS. 58 and 59 is also the same as those shown in FIGS. 51 to 53, only the magnetic head assembly is illustrated.

According to this embodiment, holding means 76a and 76b for mechanically holding the magnetic head core 8 on the support plate 7 when the terminals 82 of the magnetic head core 8 are connected to the terminals 72 of the support plate 7 as shown in FIGS. 54 to 57.

In FIG. 58(A), holding plates 76a and 76b for holding the magnetic head core 8 from four directions are provided at the distal end of the support plate 7 to hold the magnetic head core 8 like a socket.

In FIG. 58(B), holding plates 76b for holding the head chip 1 from both sides are provided at the distal end of the support plate 7 to hold the magnetic head core 8.

In FIGS. 58(C) and 58(D), both being modifications of FIG. 58(A), holding plates 76a and 76b for holding the magnetic head core 8 from four directions are provided at the distal end of the support plate 7 to hold the magnetic head core 8 like a socket.

This structure eliminates the need for adhesion of the magnetic head core 8 and facilitates its replacement.

Figure 59B:
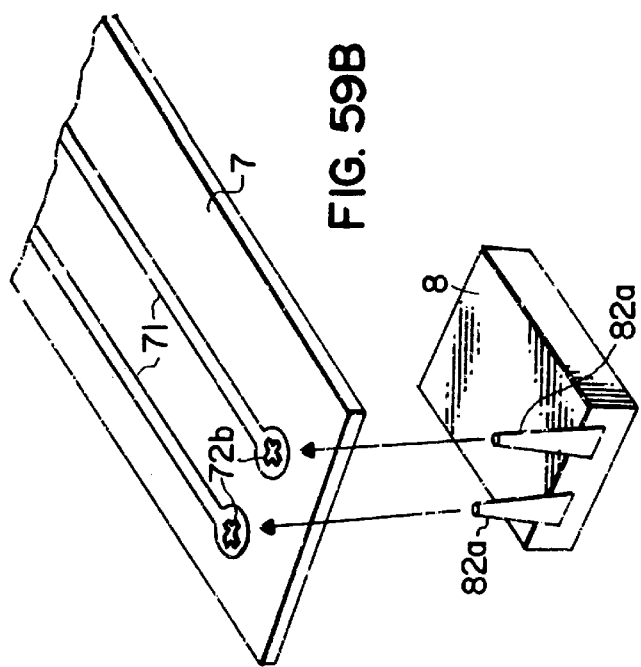
FIGS. 59(A–C) are perspective views of a magnetic head assembly according to a twenty-first embodiment of the present invention.
Figure 59C:
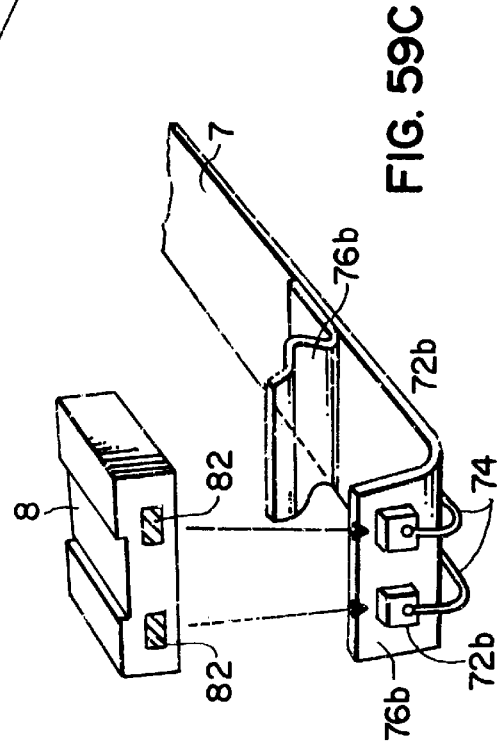
Figure 59A:
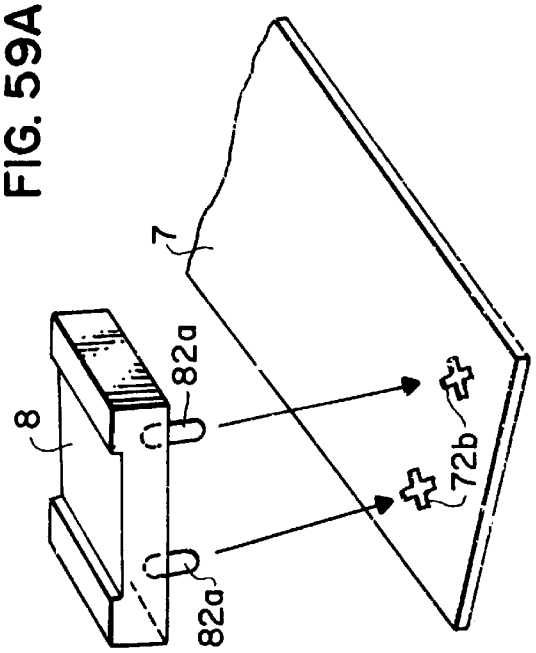

In the examples of FIGS. 59(A) and 59(B), the magnetic head core 8 is provided with terminals 82a, which are to be fitted in caulking terminal portions 72b provided on wiring patterns 71 of the support plate 7, thus ensuring mechanical support and electrical connection.

Further, in the example of FIG. 59(C), one of a pair of holding plates 76b of the support plate 7 is provided with connector terminals 72b that are connected to wiring patterns 74. In addition, the connector terminals 82 are provided on one side of the magnetic head core 8. When the magnetic head core 8 is inserted into the holding plate pair 76b to be secured, the connector terminals 82a of the magnetic head core 8 come in contact with the connector terminals 72b of the holding plate 76b, providing electrical connection.

Although the present invention has been described by way of embodiments, it should be noted that the present invention may be modified in various forms without departing from the spirit or scope of the invention.

Industrial Applicability

As a head portion that is fabricated on a wafer is treated as the smallest part necessary for thin-film formation and the other portion is separately formed as a flexible support body, the number of head chips fabricable on the wafer can significantly increased, and the costs of the head chips and a magnetic disk apparatus using the same can be reduced greatly.

We claim:

1. A magnetic head assembly mounted on an arm, said assembly being utilized in the recording and reproducing of data on and from a recording/reproducing surface of a magnetic disk, said magnetic head assembly comprising:

a support body for connecting the magnetic head assembly to the arm; and a head chip attached to said support body, said head chip including a wafer base and a read/write element for recording/reproducing data from said recording/reproducing surface of said magnetic disk, said read/write element being formed from a plurality of thin film layers superposed upon said wafer base, wherein said head chip is electrically connected to a set of lead wires on said support body by at least one set of fillet-bonds, whereby said at least one set of fillet-bonds also serves to maintain said head chip in a bonded relationship with said support body, and wherein said bonded relationship between said head chip and said support body is also maintained by a second set of fillet-bonds, further wherein said at least one set of fillet-bonds is located on a first side of said head chip and said second set of fillet-bonds is located on a second side of said head chip where said second side of said head chip faces in an opposite direction from said first side of said head chip.

2. The magnetic head assembly of claim 1 further comprising a connection pad for connecting said second set of fillet-bonds to said second side of said head chip, and wherein said second side of said head chip is defined by said wafer base, whereby said connection pad is positioned between said wafer base and said second set of fillet-bonds.

3. A magnetic head assembly mounted on an arm, said assembly being utilized in the recording and reproducing of data on and from a magnetic disk, said magnetic head assembly comprising:

a support body for connecting the magnetic head assembly to the arm; and a head chip bonded to said support body, said head chip being configured and arranged for making sliding contact with a recording/reproducing surface of the magnetic disk, said head chip including a wafer base and a read/write element for recording/reproducing data from said recording/reproducing surface of said magnetic disk, said read/write element being formed from a plurality of thin film layers superposed upon said wafer base, said head chip being electrically connected to a set of lead wires on said support body by a first set of fillet-bonds, whereby said first set of fillet-bonds also serves to maintain said head chip in a bonded relationship with said support body, and wherein said bonded relationship between said head chip and said support body is also maintained by a second set of fillet-bonds, further wherein said first set of fillet-bonds is located on a first side of said head chip and said second set of fillet-bonds is located on a second side of said head chip where said second side of said head chip faces in an opposite direction from said first side of said head chip.

\* \* \* \* \*